(12) United States Patent
Dal Mutto et al.

(10) Patent No.: US 10,579,875 B2
(45) Date of Patent: Mar. 3, 2020

(54) SYSTEMS AND METHODS FOR OBJECT IDENTIFICATION USING A THREE-DIMENSIONAL SCANNING SYSTEM

(71) Applicant: Aquifi, Inc., Palo Alto, CA (US)

(72) Inventors: Carlo Dal Mutto, Sunnyvale, CA (US); Kinh Tieu, Sunnyvale, CA (US); Tony Zuccarino, Saratoga, CA (US); Jason Trachewsky, Menlo Park, CA (US); Abbas Rafii, Palo Alto, CA (US)

(73) Assignee: AQUIFI, INC., Palo Alto, CA (US)

( * ) Notice: Subject to any disclaimer, the term of this patent is extended or adjusted under 35 U.S.C. 154(b) by 0 days.

(21) Appl. No.: 16/158,280

(22) Filed: Oct. 11, 2018

(65) Prior Publication Data

US 2019/0108396 A1    Apr. 11, 2019

Related U.S. Application Data

(60) Provisional application No. 62/571,209, filed on Oct. 11, 2017.

(51) Int. Cl.
*G06K 9/00* (2006.01)
*G06K 9/62* (2006.01)
(Continued)

(52) U.S. Cl.
CPC ....... *G06K 9/00664* (2013.01); *G06K 9/6267* (2013.01); *G06N 3/04* (2013.01);
(Continued)

(58) Field of Classification Search
None
See application file for complete search history.

(56) References Cited

U.S. PATENT DOCUMENTS 6,193,152 B1 * 2/2001 Fernando ........... G06K 9/00154
235/379
6,550,583 B1    4/2003 Brenhouse
(Continued)

FOREIGN PATENT DOCUMENTS

| EP | 3 246 851 A1 | 11/2017 |
|---|---|---|
| WO | WO 2013/134865 A1 | 9/2013 |
| WO | WO 2016/106383 A2 | 6/2016 |

OTHER PUBLICATIONS

Metadata Definition, Wikipedia, Available online at https://en.wikipedia.org/wiki/Metadata, Date Accessed Mar. 8, 2019. (Year: 2019).*

(Continued)

*Primary Examiner* — Tahmina N Ansari
(74) *Attorney, Agent, or Firm* — Lewis Roca Rothgerber Christie LLP

(57) ABSTRACT

A method for identifying and tracking objects includes: capturing one or more 3-D models of one or more objects in a scene using a three-dimensional (3-D) scanning system, the one or more 3-D models including color and geometry information of the one or more objects; and computing, by an analysis agent, one or more descriptors of the one or more 3-D models, each descriptor corresponding to a fixed-length feature vector; and retrieving metadata identifying the one or more objects based on the one or more descriptors.

37 Claims, 28 Drawing Sheets
(3 of 28 Drawing Sheet(s) Filed in Color)

(51) Int. Cl.

| | | |
|---|---|---|
| *G06T 7/174* | (2017.01) | |
| *G06T 7/285* | (2017.01) | |
| *G06T 7/00* | (2017.01) | |
| *G06T 17/00* | (2006.01) | |
| *G07G 1/00* | (2006.01) | |
| *G06N 3/04* | (2006.01) | |
| *G06T 15/10* | (2011.01) | |

(52) U.S. Cl.
CPC ............ *G06T 7/0004* (2013.01); *G06T 7/174* (2017.01); *G06T 7/285* (2017.01); *G06T 15/10* (2013.01); *G06T 17/00* (2013.01); *G07G 1/0063* (2013.01); *G06T 2207/10012* (2013.01); *G06T 2207/10024* (2013.01); *G06T 2207/10048* (2013.01)

(56) References Cited

U.S. PATENT DOCUMENTS

| | | | |
|---|---|---|---|
| 7,308,139 B2* | 12/2007 | Wentland | G01V 1/34 |
| | | | 382/109 |
| 9,317,511 B2 | 4/2016 | Kanfi | |
| 9,392,262 B2 | 7/2016 | Dal Mutto et al. | |
| 9,516,295 B2 | 12/2016 | Dal Mutto et al. | |
| 9,674,504 B1 | 6/2017 | Salvagnini et al. | |
| 9,912,862 B2 | 3/2018 | Peruch et al. | |
| 10,008,028 B2 | 6/2018 | Zuccarino et al. | |
| 10,055,882 B2 | 8/2018 | Marin et al. | |
| 10,204,448 B2 | 2/2019 | Hazeghi et al. | |
| 2004/0083144 A1 | 4/2004 | Venema et al. | |
| 2006/0285755 A1* | 12/2006 | Hager | G06K 9/00208 |
| | | | 382/224 |
| 2007/0174152 A1* | 7/2007 | Bjornberg | G01C 15/00 |
| | | | 705/28 |
| 2008/0010065 A1* | 1/2008 | Bratt | G06K 9/6222 |
| | | | 704/246 |
| 2008/0149710 A1 | 6/2008 | Silverbrook et al. | |
| 2009/0021751 A1 | 1/2009 | Jonasson Bjarang | |
| 2011/0002531 A1* | 1/2011 | Heisele | G06K 9/00208 |
| | | | 382/154 |
| 2011/0254840 A1 | 10/2011 | Halstead | |
| 2012/0226586 A1* | 9/2012 | Paul | G06Q 30/06 |
| | | | 705/26.61 |
| 2013/0056285 A1 | 3/2013 | Meagher | |
| 2013/0223680 A1* | 8/2013 | Sugasawa | G07G 1/0045 |
| | | | 382/103 |
| 2014/0257553 A1 | 9/2014 | Shakes et al. | |
| 2014/0363048 A1 | 12/2014 | Vrcelj et al. | |
| 2015/0023602 A1 | 1/2015 | Wnuk et al. | |
| 2015/0117760 A1 | 4/2015 | Wang et al. | |
| 2015/0220790 A1* | 8/2015 | Gold | G06K 9/00664 |
| | | | 382/103 |
| 2017/0180706 A1 | 6/2017 | Salvagnini et al. | |
| 2017/0186073 A1 | 6/2017 | Bryan et al. | |
| 2017/0372527 A1 | 12/2017 | Murali et al. | |
| 2018/0046649 A1* | 2/2018 | Dal Mutto | G06N 3/02 |
| 2018/0189611 A1 | 7/2018 | Dal Mutto et al. | |
| 2018/0211373 A1 | 7/2018 | Stoppa et al. | |
| 2018/0322623 A1 | 11/2018 | Memo et al. | |

OTHER PUBLICATIONS

Szeliski, R., "Computer Vision: Algorithms and Applications", Springer, 2010 pp. 467-503.

Zanuttigh, P., et al., Time-of-Flight and Structured Light Depth Cameras. 2016, Springer.

Besl, Paul J. et al., "A Method for Registration of 3-D Shapes" IEEE Transactions on Pattern Analysis and Machine Intelligence, vol. 14, No. 2, Feb. 1992, pp. 239-256.

Cignoni, P. et al. "MeshLab: an Open-Source Mesh Processing Tool", Eurographics Italian Chapter Conference (2008), 8 pages.

Gao, Y., & Dai, Q. (2014). View-based 3-D object retrieval: challenges and approaches. IEEE MultiMedia, 3(21), 52-57.

Furuya, T., & Ohbuchi, R. (Jul. 2009). Dense sampling and fast encoding for 3-D model retrieval using bag-of-visual features. In Proceedings of the ACM international conference on image and video retrieval (8 pages). ACM.

Su, H., Maji, S., Kalogerakis, E., & Learned-Miller, E. (2015). Multi-view convolutional neural networks for 3-D shape recognition. In Proceedings of the IEEE International Conference on Computer Vision (pp. 945-953).

LeCun, Y., & Bengio, Y. (1995). Convolutional networks for images, speech, and time series. The handbook of brain theory and neural networks, 3361(10), 14 pages.

Chatfield, K. et al. 2014, Return of the devil in the details: Delving deep into convolutional nets. arXiv preprint arXiv:1405.3531, 11 sheets.

Boureau, Y. L. et al. (2010) a theoretical analysis of feature pooling in visual recognition. In Proceedings of the 27th international conference on machine learning (ICML-10), pp. 111-118.

Song, S., et al. (2015) Sun rgb-d: A rgb-d scene understanding benchmark suite. In Proceedings of the IEEE Conference on Computer Vision and Pattern Recognition, pp. 567-576.

Wu, Zhirong, et al. "3d shapenets: A deep representation for volumetric shapes." Proceedings of the IEEE conference on computer vision and pattern recognition. 2015.

Yang, B., et al. (2018) "Dense 3D Object Reconstruction from a Single Depth View." arXiv preprint arXiv:1802.00411v1.

Goodfellow, I., et al. (2014) "Generative adversarial nets." Advances in neural information processing systems, pp. 2672-2680.

Hirose, N. et al. (2018) "GONet: A Semi-Supervised Deep Learning Approach for Traversability Estimation." arXiv preprint arXiv:1803.03254, 8 sheets.

Redmon, J. et al. (2016) "You only look once: Unified, real-time object detection." Proceedings of the IEEE conference on computer vision and pattern recognition, pp. 779-788.

Liu, W. et al. (Oct. 2016) "Ssd: Single shot multibox detector." European conference on computer vision. Springer, Cham, pp. 21-37.

Manevitz, L.M. et al. (2001) One-class SVMs for document classification. Journal of Machine Learning Research, 2 (Dec), pp. 139-154.

Bishop, C.M. (2006) Pattern recognition and Machine Learning, pp. 1-58 and 124-128.

Chopra, S. et al. (Jun. 2005) Learning a similarity metric discriminatively, with application to face verification. In Computer Vision and Pattern Recognition, 2005, CVPR 2005 IEEE Computer Society Conference on (vol. 1, pp. 539-546.) IEEE.

Weinberger, K.Q., et al. (2006). Distance metric learning for large margin nearest neighbor classification. Advances in neural information processing systems, pp. 1473-1480.

Newcombe, R.A., et al. (Oct. 2011) KinectFusion: Real-time dense surface mapping and tracking in Mixed and augmented reality (ISMAR), 2011 10th IEEE international symposium on, pp. 127-136.

International Search Report and Written Opinion for International Application No. PCT/US2018/055520, dated Jan. 16, 2019, 15 pages.

* cited by examiner

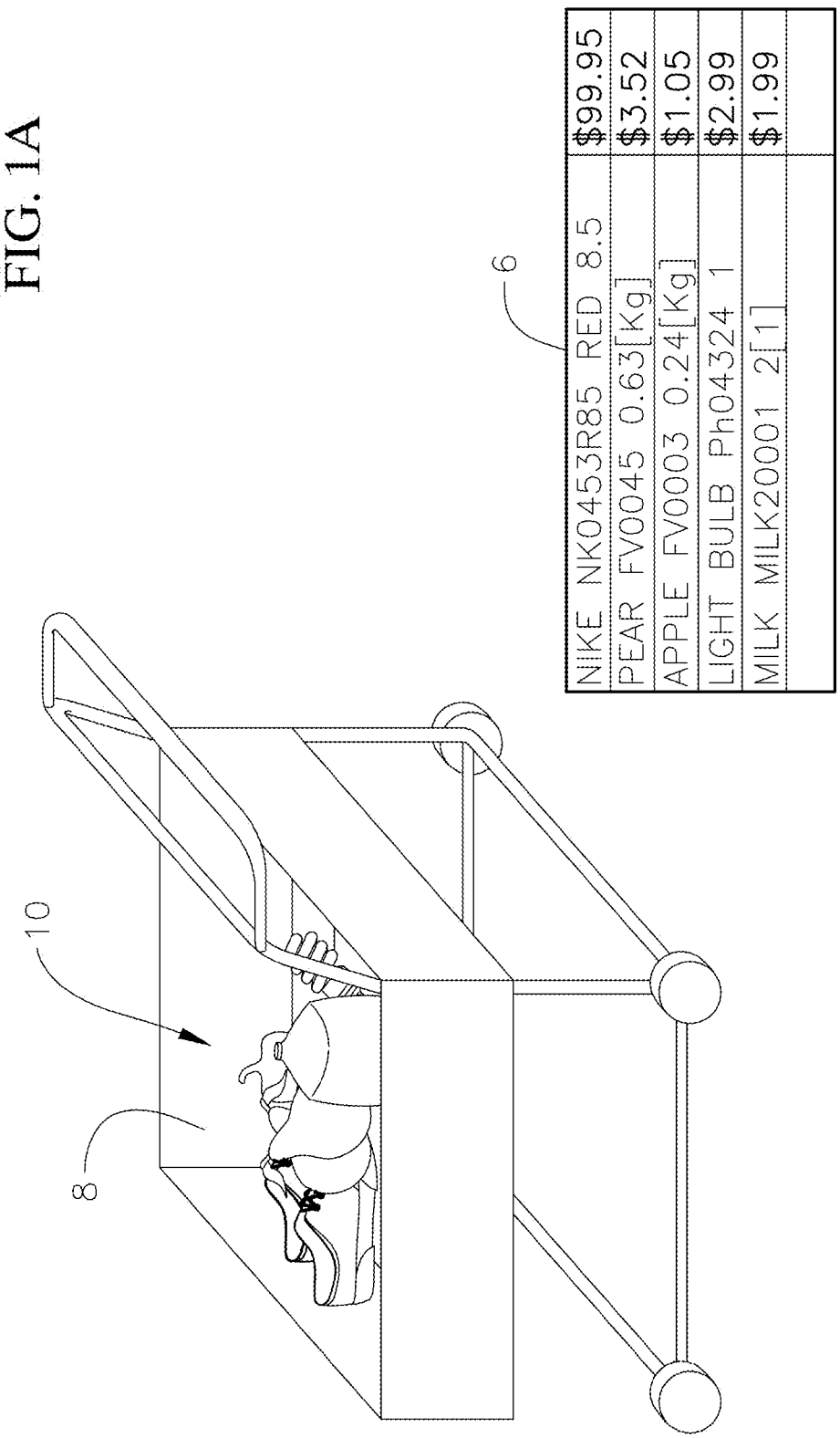

| | | |
|---|---|---|
| — | — | — |
| — | LIGHT BULB Ph04324 1 $2.99 | APPLE FV0003 0.24[Kg] $99.95 |
| NIKE NK0453R85 RED, 8.5 $99.95 | PEAR FV0045 0.32[Kg] $1.82 | — |

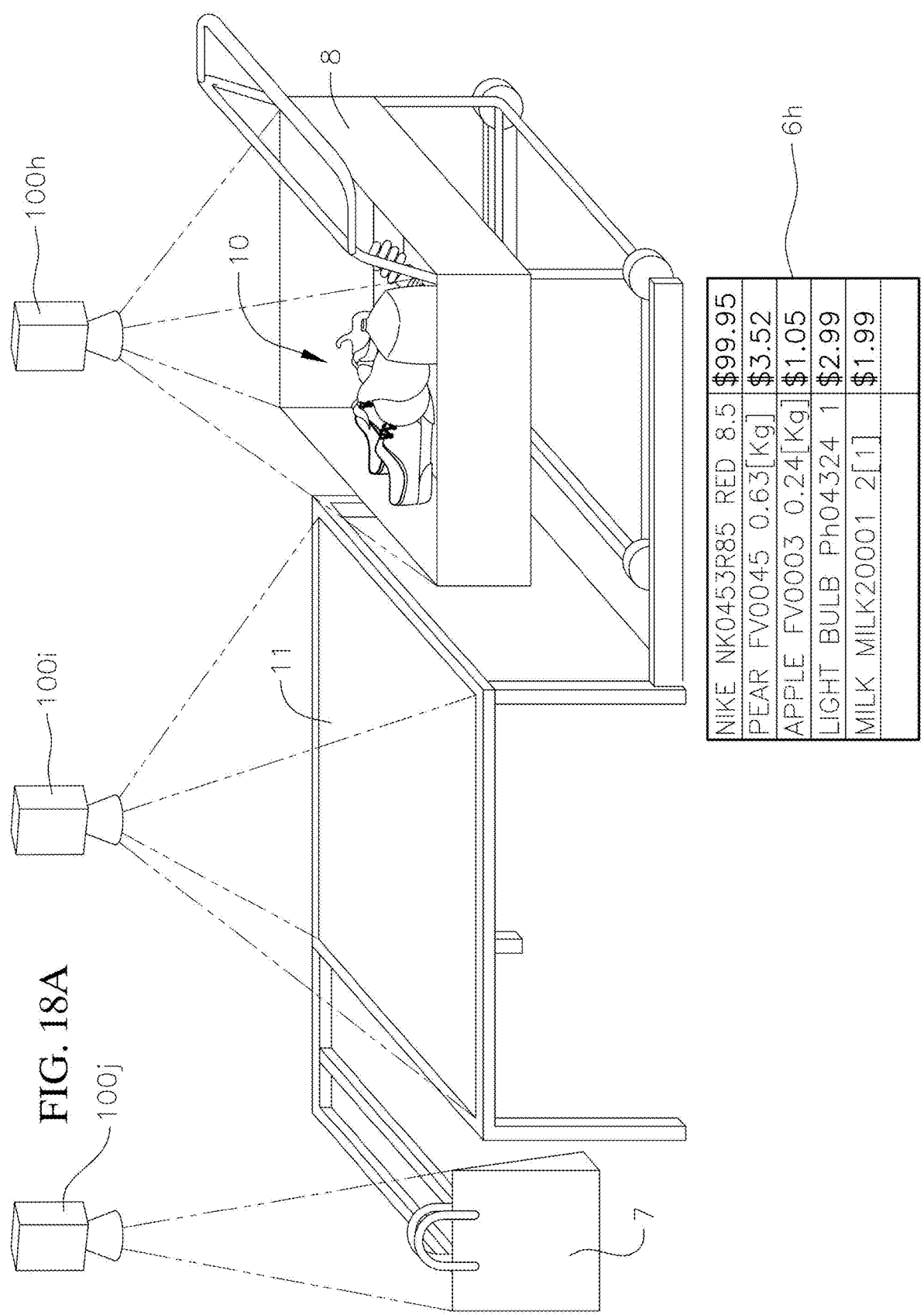

SYSTEMS AND METHODS FOR OBJECT IDENTIFICATION USING A THREE-DIMENSIONAL SCANNING SYSTEM

CROSS-REFERENCE TO RELATED APPLICATION(S)

This application claims the benefit of U.S. Provisional Patent Application No. 62/571,209, filed Oct. 11, 2017, entitled "SYSTEMS AND METHODS FOR GOODS IDENTIFICATION IN RETAIL APPLICATIONS," the entire disclosure of which is incorporated by reference herein.

FIELD

Aspects of embodiments of the present invention relate to the field of computer vision, and including systems and methods for the automatic identification of objects.

BACKGROUND

The identification of items within a collection is frequently performed in a variety of contexts. As one example, retail checkout typically involves a customer's handing the goods that they would like to purchase to a cashier at a checkout register, either by placing them on a conveyor belt or by leaving them on the cart/basket, and by a cashier manually separating all the goods and pricing them, either by manually typing the prices of the goods into the register or by manually using a barcode detector. Both manually-inputting the price and scanning the barcode on the product involve the identification of the goods being checked out. The automation of identification allows for a streamlined checkout experience. In some retail outlets, self-checkout processes allow a customer to identify items themselves (e.g., by scanning the items on a barcode scanner).

Other examples of circumstances involving the identification of items includes picking and packing orders to be shipped from a warehouse (e.g., verifying that a box has been packed with the contents listed on a packing list), kitting for manufacturing (e.g., ensuring that a particular container of components to be assembled contains all of the necessary components), and surgical counting (e.g., ensuring that all of the tools that were inserted into a patient over the course of a surgical procedure were removed from the patient before the completion of the procedure).

SUMMARY

Aspects of embodiments of the present invention relate to systems and methods for the automatic identification and tracking of objects in a variety of settings based on a physical shape, geometry, and appearance of the object. Some aspects of embodiments of the present invention relate to the use of depth camera systems configured to capture depth maps of scenes and to automatically generate three-dimensional (3-D) models of scenes in order to automatically detect and identify objects within the scene and to track the locations of the objects within the scene.

According to one embodiment of the present invention, an object identification and tracking system includes: a three-dimensional (3-D) scanning system configured to capture one or more 3-D models of one or more objects in a scene, the one or more 3-D models including color and geometry information of the one or more objects; and an analysis agent including a processor and memory, the memory storing instructions that, when executed by the processor, cause the processor to: receive the one or more 3-D models from the 3-D scanning system; compute one or more descriptors of the one or more 3-D models, each descriptor corresponding to a fixed-length feature vector; and retrieve metadata identifying the one or more objects based on the one or more descriptors.

The 3-D scanning system may include one or more 3-D scanners, and each 3-D scanner may include: a time-of-flight depth camera; a structured light depth camera; or a stereo depth camera including: at least two infrared cameras; an infrared projector; and a color camera.

The 3-D scanning system may be mounted on a basket containing the one or more objects.

The additions and removals of objects to and from the basket may be computed frequently based on low level visual information acquired by the 3-D scanning system and stored as images.

The memory of the analysis agent may further store instructions that, when executed by the processor of the analysis agent, causes the processor to compute each of the one or more descriptors using a forward evaluation of a convolutional neural network.

Each of the one or more descriptors may be computed by: rendering a plurality of 2-D views of a 3-D model of the one or more 3-D models; computing a plurality of feature vectors, each of the feature vectors corresponding to one of the 2-D views, by supplying each of the 2-D views of the 3-D model to the convolutional neural network; and pooling the feature vectors to generate a descriptor of the one or more descriptors, the descriptor corresponding to one of the one or more objects.

At least one of the one or more 3-D models may include at least two objects, and the memory of the analysis agent may further store instructions that, when executed by the processor, cause the processor to: segment the at least one 3-D model into a plurality of segments; and compute a descriptor for each of the segments.

The metadata may include one or more defect detection models, and the memory may further store instructions that, when executed by the processor, cause the processor to: supply the one or more 3-D models to the one or more defect detection models; and classify the one or more 3-D models as being abnormal or clean.

The memory may further store instructions that, when executed by the processor, cause the processor to retrieve metadata by searching a database for one or more entries that are nearest-neighbors of the one or more descriptors.

The one or more objects may be located in a basket, the basket may include a divider separating the basket into a plurality of bins, the 3-D scanning system may be configured to scan the plurality of bins, and the analysis agent may be configured to identify at most one object in each of the bins.

The system may further include a check-in system configured to associate an identity of a customer with a basket including the one or more objects.

The check-in system may include: a badge reader; a biometric identification system; a Bluetooth transceiver; a WiFi transceiver; a radio frequency identification (RFID) transceiver; or a near field communication (NFC) transceiver.

The metadata may be associated with the one or more objects are matched to one or more marketing promotions, and the customer may be notified of the one or more marketing promotions in response to detecting the one or more objects in the basket.

The one or more objects may be components of a manufacturing kit, and the memory of the analysis agent further stores instructions that, when executed by the processor, cause the processor to: retrieve a list of expected components of the manufacturing kit; compare the metadata identifying the one or more objects to the list of expected components; and detect differences between the list of expected components and the metadata of the one or more objects.

The one or more objects may be components of an order to be shipped, and the memory of the analysis agent may further store instructions that, when executed by the processor, cause the processor to: retrieve a shipping manifest including a list of one or more items expected to be included in the order to be shipped; compare the metadata identifying the one or more objects to the list of one or more items of the shipping manifest; and detect differences between the list of expected components and the metadata of the one or more objects.

The memory of the analysis agent may further store instructions that, when executed by the processor, cause the processor to generate a notification in response to detecting at least one difference between the list of expected components and the metadata of the one or more objects.

The retrieved metadata may include one or more keys, and the memory of the analysis agent may further store instructions that, when executed by the processor, cause the processor to query a database using the one or more keys associated with the retrieved metadata identifying the one or more objects.

According to one embodiment of the present invention, a retail checkout system includes: a first three-dimensional (3-D) scanning system configured to scan color and geometry of one or more goods in a shopping basket to generate one or more first 3-D models; a second 3-D scanning system configured to scan color and geometry of one or more goods in a shopping bag to generate one or more second 3-D models; a first analysis agent including a first processor and first memory, the first memory storing instructions that, when executed by the first processor, cause the first processor to receive the one or more first 3-D models from the first 3-D scanning system; compute one or more first descriptors of the one or more first 3-D models; and identify the one or more goods in the shopping basket based on the one or more first descriptors of the one or more first 3-D models; a second analysis agent including a second processor and second memory, the second memory storing instructions that, when executed by the second processor, cause the second processor to: receive the one or more second 3-D models from the second 3-D scanning system; compute one or more second descriptors of the one or more second 3-D models; and identify the one or more goods in the shopping bag based on the one or more second descriptors of the one or more second 3-D models; and a check-out controller system including a third processor and a third memory, the third memory storing instructions that, when executed by the third processor, cause the third processor to monitor movement of the one or more goods from the shopping basket into the shopping bag.

According to one embodiment of the present invention, a method for identifying and tracking objects includes: capturing one or more 3-D models of one or more objects in a scene using a three-dimensional (3-D) scanning system, the one or more 3-D models including color and geometry information of the one or more objects; and computing, by an analysis agent, one or more descriptors of the one or more 3-D models, each descriptor corresponding to a fixed-length feature vector; and retrieving metadata identifying the one or more objects based on the one or more descriptors.

The 3-D scanning system may include one or more 3-D scanners, and each 3-D scanner may include: a time-of-flight depth camera; a structured light depth camera; or a stereo depth camera including: at least two infrared cameras; an infrared projector; and a color camera.

The 3-D scanning system may be mounted on a basket containing the one or more objects.

Additions and removals of objects to and from the basket may be computed frequently based on low level visual information acquired by the 3-D scanning system and stored as images.

The method may further include computing each of the one or more descriptors using a forward evaluation of a convolutional neural network.

Each of the one or more descriptors may be computed by: rendering a plurality of 2-D views of a 3-D model of the one or more 3-D models; computing a plurality of feature vectors, each of the feature vectors corresponding to one of the 2-D views, by supplying each of the 2-D views of the 3-D model to the convolutional neural network; and pooling the feature vectors to generate a descriptor of the one or more descriptors, the descriptor corresponding to one of the one or more objects.

At least one of the one or more 3-D models may include at least two objects, and the method may further include: segmenting the at least one 3-D model into a plurality of segments; and computing a descriptor for each of the segments.

The metadata may include one or more defect detection models, and the method may further include: supplying the one or more 3-D models to the one or more defect detection models; and classifying the one or more 3-D models as being abnormal or clean.

The method may further include searching a database for one or more entries that are nearest-neighbors of the one or more descriptors.

The one or more objects may be located in a basket, the basket including a divider separating the basket into a plurality of bins, the 3-D scanning system may be configured to scan the plurality of bins, and the analysis agent may be configured to identify at most one object in each of the bins.

The method may further include associating an identity of a customer with a basket including the one or more objects using a check-in system.

The check-in system may include: a badge reader; a biometric identification system; a Bluetooth transceiver; a WiFi transceiver; a radio frequency identification (RFID) transceiver; or a near field communication (NFC) transceiver.

The metadata associated with the one or more objects may be matched to one or more marketing promotions, and the customer may be notified of the one or more marketing promotions in response to detecting the one or more objects in the basket.

The one or more objects may be components of a manufacturing kit, and the method may further include: retrieving a list of expected components of the manufacturing kit; comparing the metadata identifying the one or more objects to the list of expected components; and detecting differences between the list of expected components and the metadata of the one or more objects.

The one or more objects may be components of an order to be shipped, and the method may further include: retrieving a shipping manifest including a list of one or more items expected to be included in the order to be shipped; comparing the metadata identifying the one or more objects to the list of one or more items of the shipping manifest; and detecting differences between the list of expected components and the metadata of the one or more objects.

The method may further include generating a notification in response to detecting at least one difference between the list of expected components and the metadata of the one or more objects.

The retrieved metadata may include one or more keys, and the method may further include querying a database using the one or more keys associated with the retrieved metadata identifying the one or more objects.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

The accompanying drawings, together with the specification, illustrate exemplary embodiments of the present invention, and, together with the description, serve to explain the principles of the present invention.

FIG. 1A depicts a shopping cart containing items that have been selected for purchase at a combination supermarket and department store.

FIGS. 18A, 18B, and 18C depict a checkout system using indirect singulation according to one embodiment of the present invention.

DETAILED DESCRIPTION

Figure 1B:
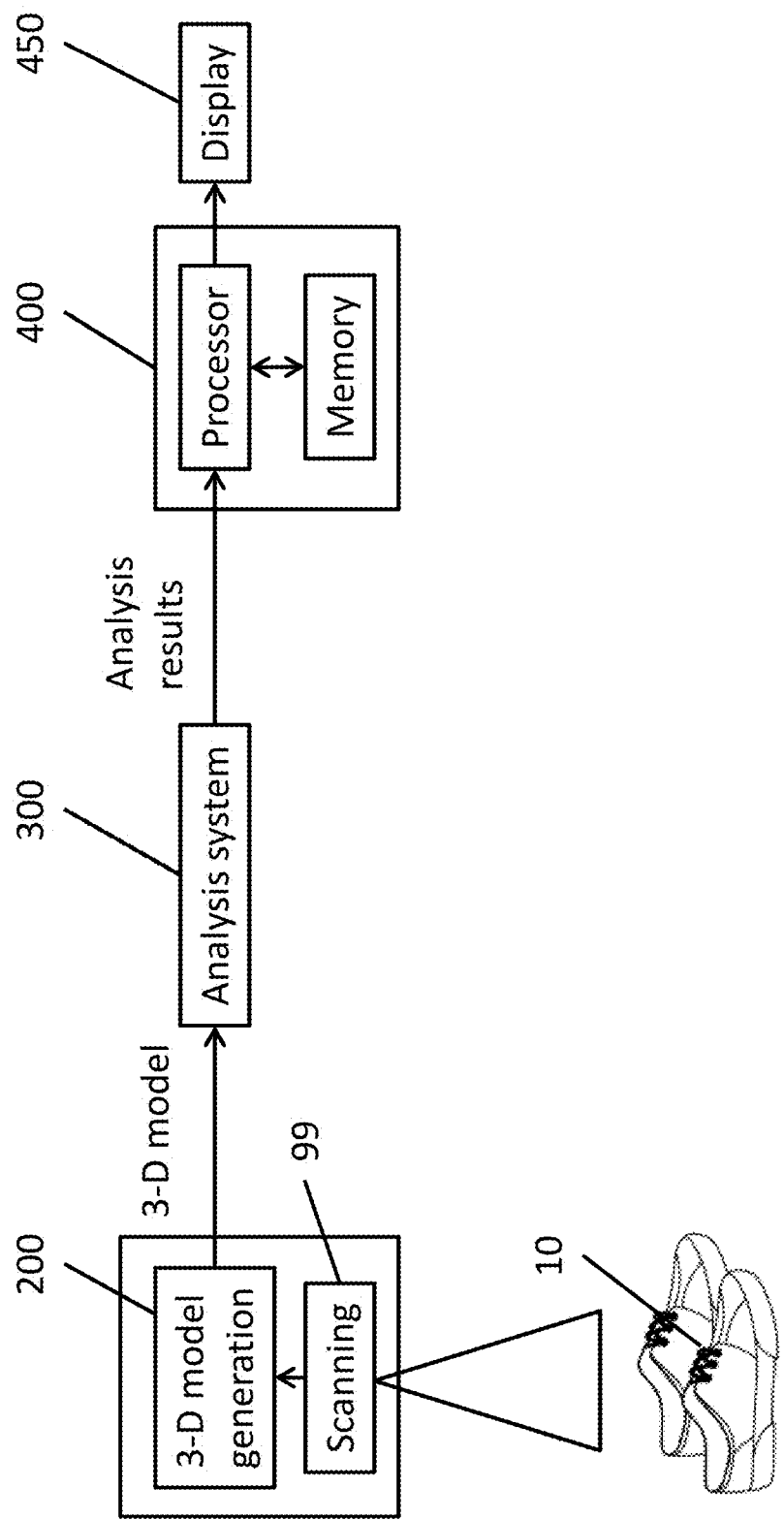
FIG. 1B is a schematic block diagram of a system for scanning and identifying objects according to one embodiment of the present invention.

In the following detailed description, only certain exemplary embodiments of the present invention are shown and described, by way of illustration. As those skilled in the art would recognize, the invention may be embodied in many different forms and should not be construed as being limited to the embodiments set forth herein. Like reference numerals designate like elements throughout the specification.

Aspects of embodiments of the present invention are directed to systems and methods for automatically identifying objects in variable environments and conditions. In such variable environments and conditions, views of objects may be inconsistent or partially occluded by other objects.

Some embodiments of the present invention relate to automatically identifying objects in a retail environment in order to automate at least portions of a process of checkout, including identifying the products that the customer wishes to purchase. In some embodiments of the present invention, the identification of an object corresponds to identifying the barcode or universal product code (UPC) associated with the object, where the identification may be performed using a scan of the 3-D model of the object. However, no actual scanning or reading of a barcode is necessary, thereby avoiding the need to rotate or position the object in a particular orientation to meet the requirements of a barcode scanner, and thereby also allowing identification of goods that do not have barcodes. Automated retail checkout provides two fundamental benefits with respect to the classic cashier checkout: on one hand it allows for cost savings in a reduction of human intensive labor and also allows for improvement of the customer experience by reducing, if not completely eliminating, the checkout wait time. In addition, a 3-D scanning system captures scale information, such that the volume of any given object can also be computed. This, in turn, allows for estimation of the weight or mass of an item based on its volume and based on a known expected density of the item, which may be automatically retrieved once the object is identified based on its appearance.

Embodiments of the present invention may also be applied in environments other than retail settings. Examples of applications include "kitting" in a manufacturing environment (where the items in a kit are expected to match a list of expected components), order picking in a warehouse environment (where the items packed in an order to be shipped are expected to match a list of items in a shipping manifest), and item counting in a surgical environment. These additional examples will be described in more detail below. However, for the sake of convenience, aspects of embodiments of the present invention will be described in the context of retail environments, but are not limited thereto.

FIG. 1A depicts a shopping cart or basket 8 containing items 10 that have been selected for purchase at a combination supermarket and department store (sometimes referred to as a "hypermarket"). For the sake of convenience, as used herein, the term "basket" will be used herein to refer to a container for holding one or more objects to be identified in accordance with embodiments of the present invention. FIG. 1A also depicts a list 6 of items, along with their prices, that are contained in the basket and that are therefore associated with the customer (the customer may be registered with a particular cart through a "check-in" process described in more detail below). The list includes a pair of red shoes ($99.95), a pear ($3.52), an apple ($1.05), a light bulb ($2.99), and a gallon of milk ($1.99).

In a retail environment, misclassification of one or more items in a checkout process generally leads to disputes and low customer satisfaction. As such, a reliable visual recognition system is an important component of automated checkout systems for retail stores. While recognizing items as they are picked by a customer from the shelves may appear initially to be a viable choice for a "self-checkout" scheme, such systems may result in overly-complicated systems. For instance, during high-traffic times, some items may be occluded from the views of all of the cameras in the area, thereby resulting in an underestimate of the customers' total purchases. While adding more cameras to increase coverage can reduce the risk that items will be removed from shelves without detection, this may require a very high-density of cameras in a store (e.g., placed overhead). Even with a high density of overhead cameras, it is possible for small children to be occluded by taller adults and for items to be picked by children and placed in a shopping bag without being counted.

Accordingly, to reach a higher level of accuracy to enable a satisfactory shopping experience, in some embodiments of the present invention, a more traditional shopping cart or basket (which may be placed on the floor without losing items due to the amorphous nature of the shopping bag(s) a shopper may carry into the store) is integrated with an item detection and identification system. When items are moved from the shopping basket or cart, they are naturally "singulated" (e.g., separated or isolated from other items) by the shopper (or eventually singulated during the checkout process), as it can be challenging to move more than one item at a time. These items may be readily captured by a camera system (e.g., a 2-D camera system, a 3-D camera system, or combination thereof, as described in more detail below) as the items are moved (e.g., one at a time) from a shopping cart or basket into one or more shopping bags during the checkout process. In addition, as described in more detail below, the use of scanning systems in accordance with embodiments of the present invention enable classification with high accuracy.

Figure 1C:
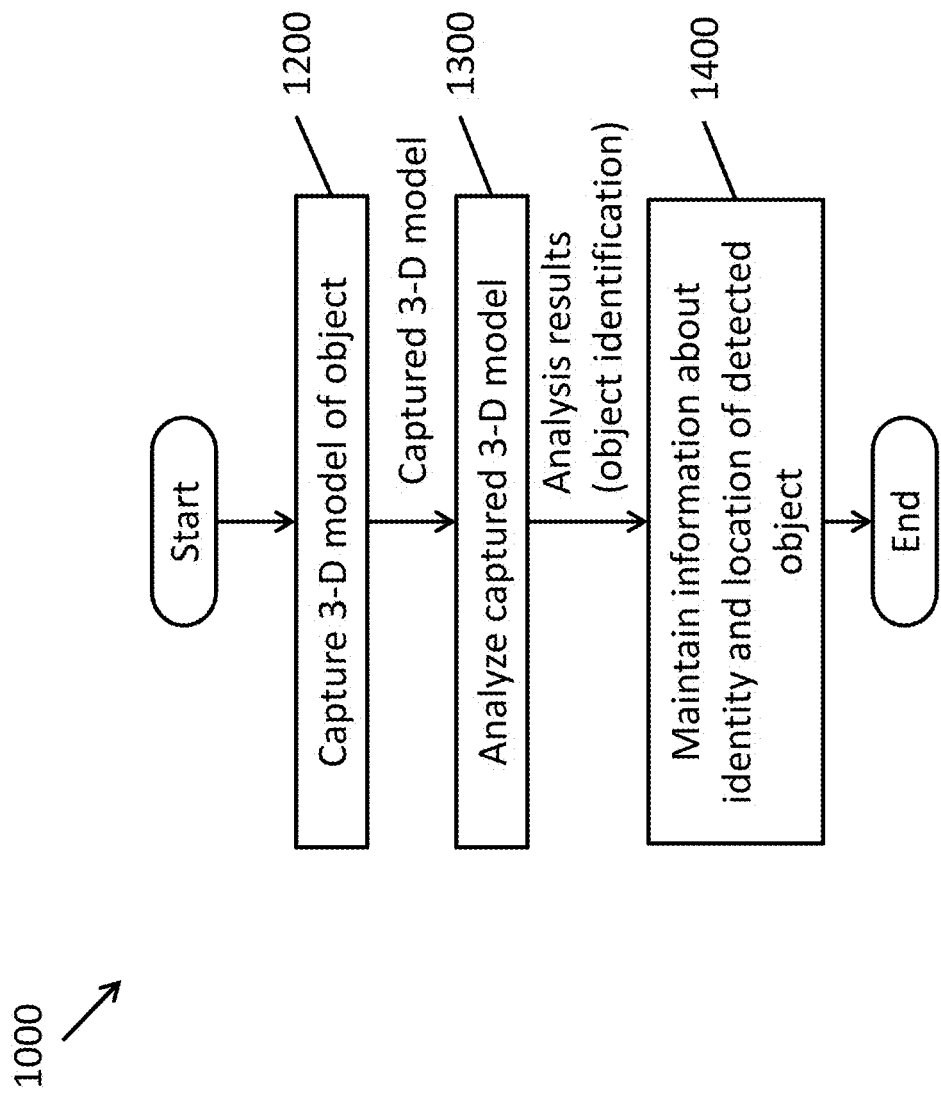
FIG. 1C is a flowchart of a method for scanning an object and displaying identification results according to one embodiment of the present invention.

FIG. 1B is a schematic block diagram of a system for scanning and identifying objects according to one embodiment of the present invention. FIG. 1C is a flowchart of a method for scanning an object and displaying identification results according to one embodiment of the present invention.

As shown in FIGS. 1B and 1C, the system includes a 3-D scanner 100, which is configured to capture images of an object 10 and a 3-D model generation system 200 configured to generate a 3-D model of the object from the images captured by the scanner 100 in operation 1200. An analysis agent 300 identifies the object based on the captured 3-D model in operation 1300 and, in some embodiments, may perform further analysis of the object based on the captured model.

The analysis results generated by the analysis agent 300, including an object identification are stored by an object tracking system 400 in operation 1400. In some embodiments of the present invention, the object tracking system 400 is configured to maintain information (e.g., lists) regarding the particular object that is scanned, such as the identity of the object and an association between the scanned object and a particular shopping cart (e.g., tracking that the scanned object is now in the shopping cart) and/or associated with a particular customer. The object tracking system 400 may also be used to control a display device 450, which may display information to a user. As one example, the shopping cart or basket 8 may include a display panel 450 that is configured to display the current list 6 of items that are detected to be the shopping cart. As another example, the display device 450 may be an end user computing device (e.g., a smartphone) of the user and the current list 6 may be displayed in a web page or an application running on the end user computing device.

In some embodiments of the present invention, as items are added to and removed from the shopping cart or basket 8, the 3-D scanner 100 captures images of the object (operation 1200) and the object tracking system 400 tracks (operation 1400) which items are in the shopping cart or basket 8 and which items are out of the shopping cart or basket 8. Tracking the addition and removal of objects allows for counting of objects. Furthermore, accurate identification of the objects may allow the calculation of an expected volume of the items 10 in the basket 8. By capturing images of the contents of the cart and computing a depth map of the scene of the basket 8, the object tracking system 400 can also estimate the volume of items in the cart and determine whether the estimate volume is approximately in line with the expected volume (e.g., noting that occlusion due to stacking of objects and hidden empty spaces may increase the estimated volume of the items in the cart).

As such, aspects of embodiments of the present invention relate to the automatic detection of items 10 and the automatic generation of a list (or "inventory") of items associated with a cart or associated with a particular customer.

In some embodiments of the present invention, an automated visual item recognition system (e.g., an array of 2-D and/or 3-D cameras) may also be placed overhead for an application that does not require high classification and detection or counting accuracy. In these applications, items are recognized merely to create bundle promotions. For example, if a customer picks marshmallows off a shelf, they may be offered a discount on chocolate bars and/or graham crackers. The visual inspection data may be fused (e.g., combined) with other knowledge about a customer's preferences or temporal information (e.g., knowing that the original item was picked two days before a holiday weekend). In this application, misclassification may simply result in an ineffective promotion being offered to a customer, and a missed detection may mean a discount is not offered when one could have been offered.

Scanning Systems

Aspects of embodiments of the present invention are well suited for, but not limited to, circumstances in which the items to be identified may be characterized by their surface colors and geometry, including the size of the object (although there might be some variation between different instances of the same item or good). In many embodiments of the present invention, this type color and shape of information can be used to automate the identification of different items (e.g., identifying retail goods during checkout). One component of automated object identification systems is a 3-D scanning system that is able to acquire geometry and color information. Because of the volumetric nature of common goods, in some embodiments, the 3-D scanning is performed by aggregating information from a multitude of 3-D scanners 100 at different vantage-points. Therefore, a 3-D scanning system 99 may include one or more 3-D scanners or depth cameras 100.

Some aspects of embodiments of the present invention relate to gathering geometric (shape) and/or color information about the object itself, possibly from multiple different vantage points (poses) with respect to the object. Collecting these views of the object can provide the data for performing a comprehensive inspection of the underlying objects. This procedure of capturing views of an object is sometimes referred to as three-dimensional scanning or three-dimensional modeling and can be effectively accomplished using a 3-D modeling system, which can include one or more 3-D scanners, each of which may include one or more depth cameras.

A three-dimensional scanner is a system that is able to acquire a 3-D model of a scene from visual information in the form of one or more streams of images. In one embodiment, a three-dimensional scanner includes one or more depth cameras, where a depth camera may include one or more color cameras, which acquire the color information about an object, and one or more Infra-Red (IR) cameras which may be used in conjunction with an IR structured-light illuminator to capture geometry information about the object. The special case in which there are two IR cameras and an IR structured-light illuminator is called active stereo, and allows for simultaneous scanning from multiple depth cameras with overlapping fields-of-view. The color and the infrared cameras are synchronized and geometrically calibrated, allowing these cameras to capture sequences of frames that are constituted by color images and depth-maps, for which it is possible to provide geometrical alignment.

One example of a depth camera including two IR cameras, an IR structured light illuminator, and one color camera is described in U.S. Pat. No. 9,674,504, "DEPTH PERCEPTIVE TRINOCULAR CAMERA SYSTEM," issued by the United States Patent and Trademark Office on Jun. 6, 2017, the entire disclosure of which is incorporated by reference herein.

In some embodiments of the present invention, the range cameras 100, also known as "depth cameras," include at least two standard two-dimensional cameras that have overlapping fields of view. In more detail, these two-dimensional (2-D) cameras may each include a digital image sensor such as a complementary metal oxide semiconductor (CMOS) image sensor or a charge coupled device (CCD) image sensor and an optical system (e.g., one or more lenses) configured to focus light onto the image sensor. The optical axes of the optical systems of the 2-D cameras may be substantially parallel such that the two cameras image substantially the same scene, albeit from slightly different perspectives. Accordingly, due to parallax, portions of a scene that are farther from the cameras will appear in substantially the same place in the images captured by the two cameras, whereas portions of a scene that are closer to the cameras will appear in different positions.

Using a geometrically calibrated depth camera, it is possible to identify the 3-D locations of all visible points on the surface of the object with respect to a reference coordinate system (e.g., a coordinate system having its origin at the depth camera). Thus, a range image or depth image captured by a range camera 100 can be represented as a "cloud" of 3-D points, which can be used to describe the portion of the surface of the object (as well as other surfaces within the field of view of the depth camera).

Figure 2:
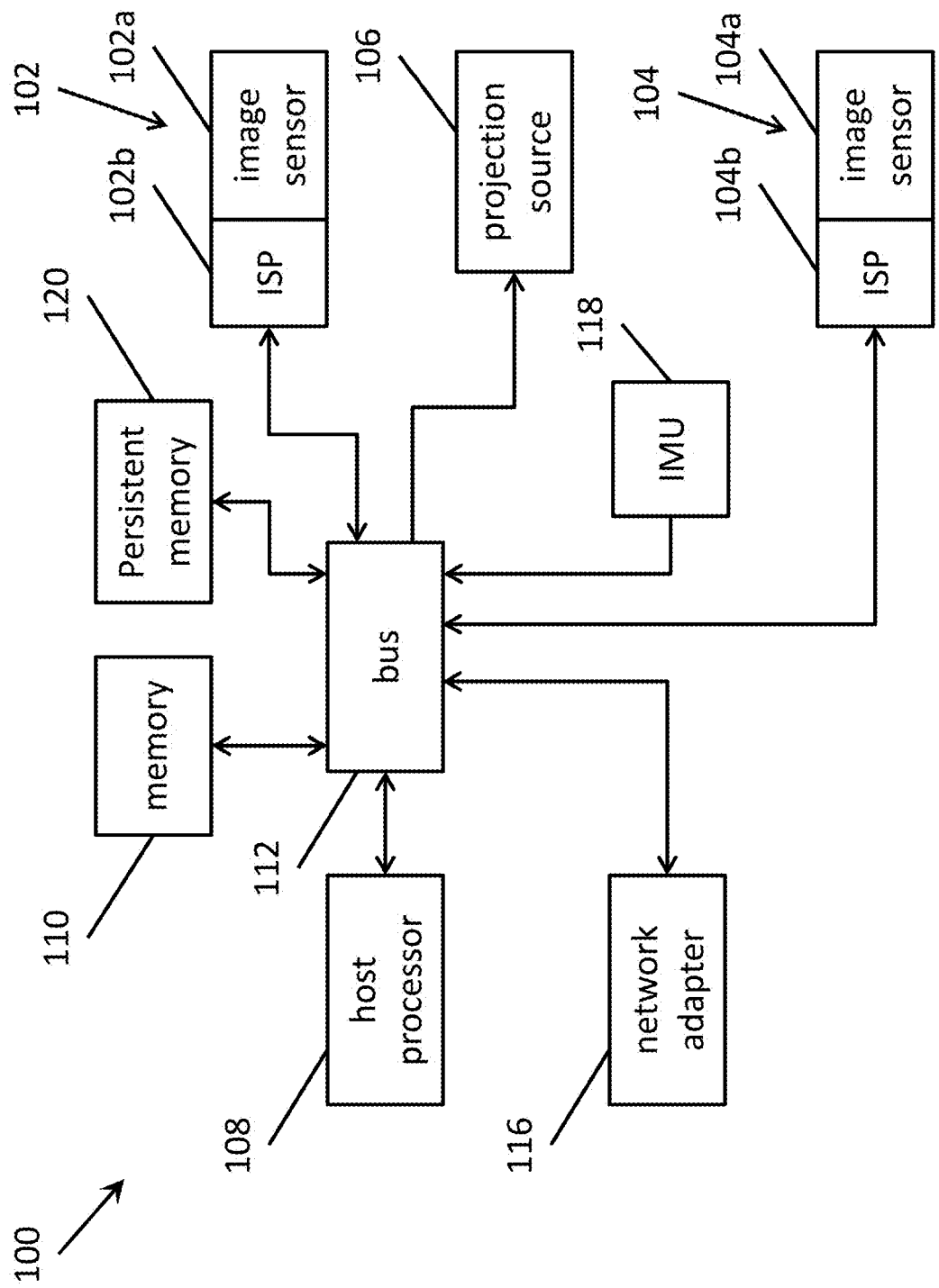
FIG. 2 is a block diagram of a depth camera system according to one embodiment of the present invention.

FIG. 2 is a block diagram of a stereo depth camera system according to one embodiment of the present invention. The depth camera system 100 shown in FIG. 2 includes a first camera 102, a second camera 104, a projection source 106 (or illumination source or active projection system), and a host processor 108 and memory 110, wherein the host processor may be, for example, a graphics processing unit (GPU), a more general purpose processor (CPU), an appropriately configured field programmable gate array (FPGA), or an application specific integrated circuit (ASIC). The first camera 102 and the second camera 104 may be rigidly attached, e.g., on a frame, such that their relative positions and orientations are substantially fixed. The first camera 102 and the second camera 104 may be referred to together as a "depth camera." The first camera 102 and the second camera 104 include corresponding image sensors 102a and 104a, and may also include corresponding image signal processors (ISP) 102b and 104b. The various components may communicate with one another over a system bus 112. The depth camera system 100 may include additional components such as a network adapter 116 to communicate with other devices, an inertial measurement unit (IMU) 118 such as a gyroscope to detect acceleration of the depth camera 100 (e.g., detecting the direction of gravity to determine orientation), and persistent memory 120 such as NAND flash memory for storing data collected and processed by the depth camera system 100. The IMU 118 may be of the type commonly found in many modern smartphones. The image capture system may also include other communication components, such as a universal serial bus (USB) interface controller.

Although the block diagram shown in FIG. 2 depicts a depth camera 100 as including two cameras 102 and 104 coupled to a host processor 108, memory 110, network adapter 116, IMU 118, and persistent memory 120, embodiments of the present invention are not limited thereto. For example, the three depth cameras 100 shown in FIG. 6 (described in more detail below) may each merely include cameras 102 and 104, projection source 106, and a communication component (e.g., a USB connection or a network adapter 116), and processing the two-dimensional images captured by the cameras 102 and 104 of the three depth cameras 100 may be performed by a shared processor or shared collection of processors in communication with the depth cameras 100 using their respective communication components or network adapters 116.

In some embodiments, the image sensors 102a and 104a of the cameras 102 and 104 are RGB-IR image sensors. Image sensors that are capable of detecting visible light (e.g., red-green-blue, or RGB) and invisible light (e.g., infrared or IR) information may be, for example, charged coupled device (CCD) or complementary metal oxide semiconductor (CMOS) sensors. Generally, a conventional RGB camera sensor includes pixels arranged in a "Bayer layout" or "RGBG layout," which is 50% green, 25% red, and 25% blue. Band pass filters (or "micro filters") are placed in front of individual photodiodes (e.g., between the photodiode and the optics associated with the camera) for each of the green, red, and blue wavelengths in accordance with the Bayer layout. Generally, a conventional RGB camera sensor also includes an infrared (IR) filter or IR cut-off filter (formed, e.g., as part of the lens or as a coating on the entire image sensor chip) which further blocks signals in an IR portion of electromagnetic spectrum.

An RGB-IR sensor is substantially similar to a conventional RGB sensor, but may include different color filters. For example, in an RGB-IR sensor, one of the green filters in every group of four photodiodes is replaced with an IR band-pass filter (or micro filter) to create a layout that is 25% green, 25% red, 25% blue, and 25% infrared, where the infrared pixels are intermingled among the visible light pixels. In addition, the IR cut-off filter may be omitted from the RGB-IR sensor, the IR cut-off filter may be located only over the pixels that detect red, green, and blue light, or the IR filter can be designed to pass visible light as well as light in a particular wavelength interval (e.g., 840-860 nm). An image sensor capable of capturing light in multiple portions or bands or spectral bands of the electromagnetic spectrum (e.g., red, blue, green, and infrared light) will be referred to herein as a "multi-channel" image sensor.

In some embodiments of the present invention, the image sensors 102a and 104a are conventional visible light sensors. In some embodiments of the present invention, the system includes one or more visible light cameras (e.g., RGB cameras) and, separately, one or more invisible light cameras (e.g., infrared cameras, where an IR band-pass filter is located across all over the pixels). In other embodiments of the present invention, the image sensors 102a and 104a are infrared (IR) light sensors.

In some embodiments in which the depth cameras 100 include color image sensors (e.g., RGB sensors or RGB-IR sensors), the color image data collected by the depth cameras 100 may supplement the color image data captured by the color cameras 150. In addition, in some embodiments in which the depth cameras 100 include color image sensors (e.g., RGB sensors or RGB-IR sensors), the color cameras 150 may be omitted from the system.

Generally speaking, a stereoscopic depth camera system includes at least two cameras that are spaced apart from each other and rigidly mounted to a shared structure such as a rigid frame. The cameras are oriented in substantially the same direction (e.g., the optical axes of the cameras may be substantially parallel) and have overlapping fields of view. These individual cameras can be implemented using, for example, a complementary metal oxide semiconductor (CMOS) or a charge coupled device (CCD) image sensor with an optical system (e.g., including one or more lenses) configured to direct or focus light onto the image sensor. The optical system can determine the field of view of the camera, e.g., based on whether the optical system is implements a "wide angle" lens, a "telephoto" lens, or something in between.

In the following discussion, the image acquisition system of the depth camera system may be referred to as having at least two cameras, which may be referred to as a "master" camera and one or more "slave" cameras. Generally speaking, the estimated depth or disparity maps computed from the point of view of the master camera, but any of the cameras may be used as the master camera. As used herein, terms such as master/slave, left/right, above/below, first/second, and CAM1/CAM2 are used interchangeably unless noted. In other words, any one of the cameras may be master or a slave camera, and considerations for a camera on a left side with respect to a camera on its right may also apply, by symmetry, in the other direction. In addition, while the considerations presented below may be valid for various numbers of cameras, for the sake of convenience, they will generally be described in the context of a system that includes two cameras. For example, a depth camera system may include three cameras. In such systems, two of the cameras may be invisible light (infrared) cameras and the third camera may be a visible light (e.g., a red/blue/green color camera) camera. All three cameras may be optically registered (e.g., calibrated) with respect to one another. One example of a depth camera system including three cameras is described in U.S. patent application Ser. No. 15/147,879 "Depth Perceptive Trinocular Camera System" filed in the United States Patent and Trademark Office on May 5, 2016, the entire disclosure of which is incorporated by reference herein.

To detect the depth of a feature in a scene imaged by the cameras, the depth camera system determines the pixel location of the feature in each of the images captured by the cameras. The distance between the features in the two images is referred to as the disparity, which is inversely related to the distance or depth of the object. (This is the effect when comparing how much an object "shifts" when viewing the object with one eye at a time—the size of the shift depends on how far the object is from the viewer's eyes, where closer objects make a larger shift and farther objects make a smaller shift and objects in the distance may have little to no detectable shift.) Techniques for computing depth using disparity are described, for example, in R. Szeliski. "Computer Vision: Algorithms and Applications", Springer, 2010 pp. 467 et seq.

The magnitude of the disparity between the master and slave cameras depends on physical characteristics of the depth camera system, such as the pixel resolution of cameras, distance between the cameras and the fields of view of the cameras. Therefore, to generate accurate depth measurements, the depth camera system (or depth perceptive depth camera system) is calibrated based on these physical characteristics.

In some depth camera systems, the cameras may be arranged such that horizontal rows of the pixels of the image sensors of the cameras are substantially parallel. Image rectification techniques can be used to accommodate distortions to the images due to the shapes of the lenses of the cameras and variations of the orientations of the cameras.

In more detail, camera calibration information can provide information to rectify input images so that epipolar lines of the equivalent camera system are aligned with the scanlines of the rectified image. In such a case, a 3-D point in the scene projects onto the same scanline index in the master and in the slave image. Let $u_m$ and $u_s$ be the coordinates on the scanline of the image of the same 3-D point p in the master and slave equivalent cameras, respectively, where in each camera these coordinates refer to an axis system centered at the principal point (the intersection of the optical axis with the focal plane) and with horizontal axis parallel to the scanlines of the rectified image. The difference $u_s - u_m$ is called disparity and denoted by d; it is inversely proportional to the orthogonal distance of the 3-D point with respect to the rectified cameras (that is, the length of the orthogonal projection of the point onto the optical axis of either camera).

Stereoscopic algorithms exploit this property of the disparity. These algorithms achieve 3-D reconstruction by matching points (or features) detected in the left and right views, which is equivalent to estimating disparities. Block matching (BM) is a commonly used stereoscopic algorithm. Given a pixel in the master camera image, the algorithm computes the costs to match this pixel to any other pixel in the slave camera image. This cost function is defined as the dissimilarity between the image content within a small window surrounding the pixel in the master image and the pixel in the slave image. The optimal disparity at point is finally estimated as the argument of the minimum matching cost. This procedure is commonly addressed as Winner-Takes-All (WTA). These techniques are described in more detail, for example, in R. Szeliski. "Computer Vision: Algorithms and Applications", Springer, 2010. Since stereo algorithms like BM rely on appearance similarity, disparity computation becomes challenging if more than one pixel in the slave image have the same local appearance, as all of these pixels may be similar to the same pixel in the master image, resulting in ambiguous disparity estimation. A typical situation in which this may occur is when visualizing a scene with constant brightness, such as a flat wall.

Methods exist that provide additional illumination by projecting a pattern that is designed to improve or optimize the performance of block matching algorithm that can capture small 3-D details such as the one described in U.S. Pat. No. 9,392,262 "System and Method for 3-D Reconstruction Using Multiple Multi-Channel Cameras," issued on Jul. 12, 2016, the entire disclosure of which is incorporated herein by reference. Another approach projects a pattern that is purely used to provide a texture to the scene and particularly improve the depth estimation of texture-less regions by disambiguating portions of the scene that would otherwise appear the same.

The projection source 106 according to embodiments of the present invention may be configured to emit visible light (e.g., light within the spectrum visible to humans and/or other animals) or invisible light (e.g., infrared light) toward the scene imaged by the cameras 102 and 104. In other words, the projection source may have an optical axis substantially parallel to the optical axes of the cameras 102 and 104 and may be configured to emit light in the direction of the fields of view of the cameras 102 and 104. In some embodiments, the projection source 106 may include multiple separate illuminators, each having an optical axis spaced apart from the optical axis (or axes) of the other illuminator (or illuminators), and spaced apart from the optical axes of the cameras 102 and 104.

An invisible light projection source may be better suited to for situations where the subjects are people (such as in a videoconferencing system) because invisible light would not interfere with the subject's ability to see, whereas a visible light projection source may shine uncomfortably into the subject's eyes or may undesirably affect the experience by adding patterns to the scene. Examples of systems that include invisible light projection sources are described, for example, in U.S. patent application Ser. No. 14/788,078 "Systems and Methods for Multi-Channel Imaging Based on Multiple Exposure Settings," filed in the United States Patent and Trademark Office on Jun. 30, 2015, the entire disclosure of which is herein incorporated by reference.

Active projection sources can also be classified as projecting static patterns, e.g., patterns that do not change over time, and dynamic patterns, e.g., patterns that do change over time. In both cases, one aspect of the pattern is the illumination level of the projected pattern. This may be relevant because it can influence the depth dynamic range of the depth camera system. For example, if the optical illumination is at a high level, then depth measurements can be made of distant objects (e.g., to overcome the diminishing of the optical illumination over the distance to the object, by a factor proportional to the inverse square of the distance) and under bright ambient light conditions. However, a high optical illumination level may cause saturation of parts of the scene that are close-up. On the other hand, a low optical illumination level can allow the measurement of close objects, but not distant objects.

Although embodiments of the present invention are described herein with respect to stereo depth camera systems, embodiments of the present invention are not limited thereto and may also be used with other depth camera systems such as structured light time of flight cameras and LIDAR cameras.

Depending on the choice of camera, different techniques may be used to generate the 3-D model. For example, Dense Tracking and Mapping in Real Time (DTAM) uses color cues for scanning and Simultaneous Localization and Mapping (SLAM) uses depth data (or a combination of depth and color data) to generate the 3-D model.

Figure 3:
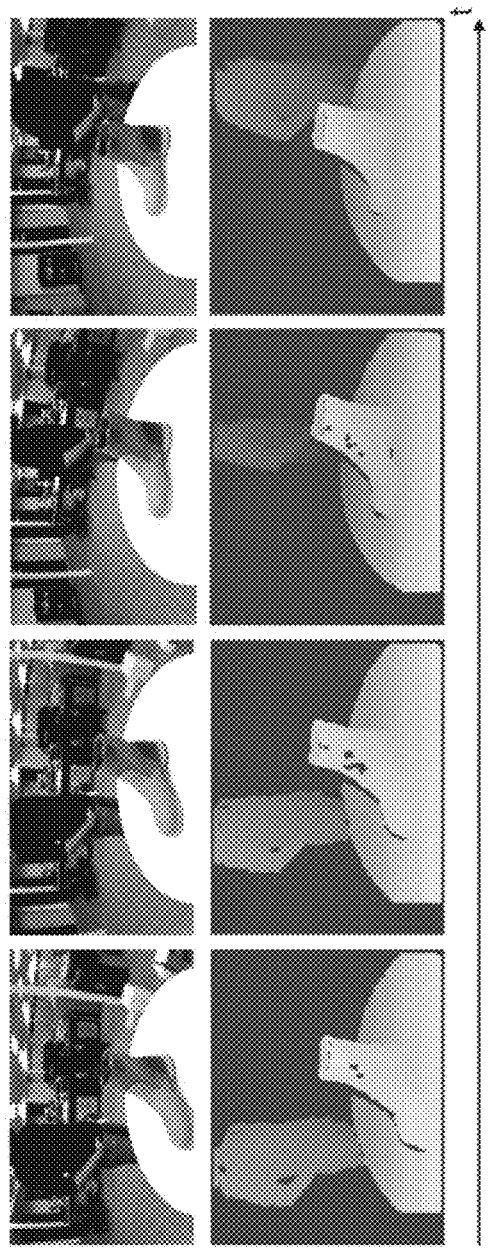
FIG. 3 is an example of a sequence of frames including depth maps and color images acquired by a depth camera that includes active stereo and at least one color camera.

FIG. 3 is an example of a sequence of frames including depth maps and color images acquired by a depth camera that includes active stereo and at least one color camera. As shown in FIG. 3, the upper row shows four color images of a boot on a table, while the lower row shows the depth maps corresponding to (e.g., captured contemporaneously or concurrently or substantially simultaneously with) the color images. As shown in the bottom row, portions of the scene that are closer to the depth camera are shown in yellow and portions of the scene that are farther away are shown in blue. Accordingly, the boot and the table are shown generally in yellow, while the background, including a person standing in the background, are shown in shades of blue. The object of interest can be separated from the background by removing pixels that have a depth greater than a threshold (e.g., removing the blue pixels in the images shown in the bottom row of FIG. 3) and by also removing the planar surface at the bottom of the remaining model.

The depth images captured at the various angles (e.g., the different columns of FIG. 3) can be combined to generate a 3-D model of the object through techniques such as iterative closest point (ICP) and structure from motion (SfM). The 3-D models may be represented as a point cloud (e.g., a collection of three-dimensional points having x, y, and z coordinates) and/or as a mesh (e.g., a collection of triangles).

Figure 4B:
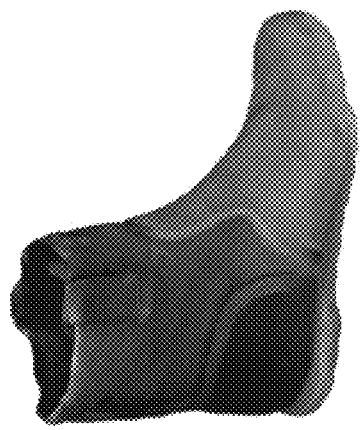
FIG. 4B is a 2-D view of an example of a 3-D mesh model captured using one or more depth cameras.
Figure 4A:
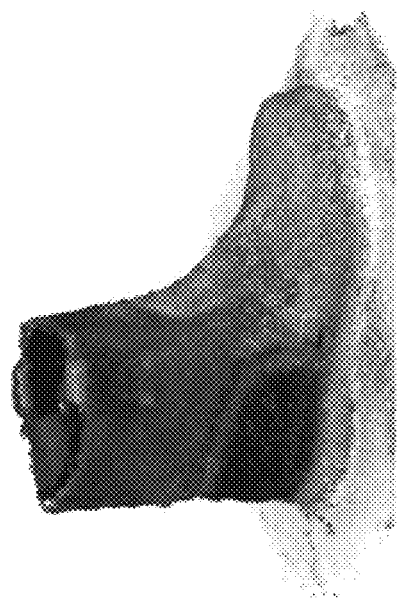
FIG. 4A is a 2-D view of an example of a 3-D point cloud model.

FIG. 4A is a 2-D view of an example of a 3-D point cloud model, and FIG. 4B is a 2-D view of an example of a 3-D mesh model captured using one or more depth cameras. Examples of systems and methods for scanning are described in, for example, U.S. patent application Ser. No. 15/382,210, "3D SCANNING APPARATUS INCLUDING SCANNING SENSOR DETACHABLE FROM SCREEN," filed in the United States Patent and Trademark Office on Dec. 16, 2016; U.S. patent application Ser. No. 15/445,735, "ASSISTED SCANNING," filed in the United States Patent and Trademark Office on Feb. 28, 2017; and U.S. patent application Ser. No. 15/630,715, "SYSTEM AND METHODS FOR A COMPLETE 3D OBJECT SCAN," filed in the United States Patent and Trademark Office on Jun. 22, 2017; the entire disclosures of which are incorporated by reference herein.

To capture a full 3-D model of an object (e.g., of substantially all non-occluded surfaces of the object), it is necessary to acquire frames from an ensemble of different vantage points, such that all the locations on the surface of the object being scanned are framed from at least one of such frames. In some circumstances, it may be impractical to capture images of the bottom surface of the object (e.g., the surface of the object resting on a support such as a conveyor belt) and therefore, without limitation thereto, the term "full 3-D model" will be assumed to include circumstances where the bottom surface of the object is not captured. Capturing such information from an ensemble of viewpoints is generally a bottleneck of 3-D modeling systems, especially in the case of objects moving on a conveyor belt on a manufacturing line. Gathering such a large amount of data from a single scanner it would generally require a relatively long amount of time and the exploitation of moving components that are able to move the scanner to account for the motion of the conveyor belt. Accordingly, some embodiments of the present invention relate to aggregating data coming from multiple depth cameras (or multiple 3-D scanners), as shown in FIGS. 5A, 5B, and 6.

Figure 5B:
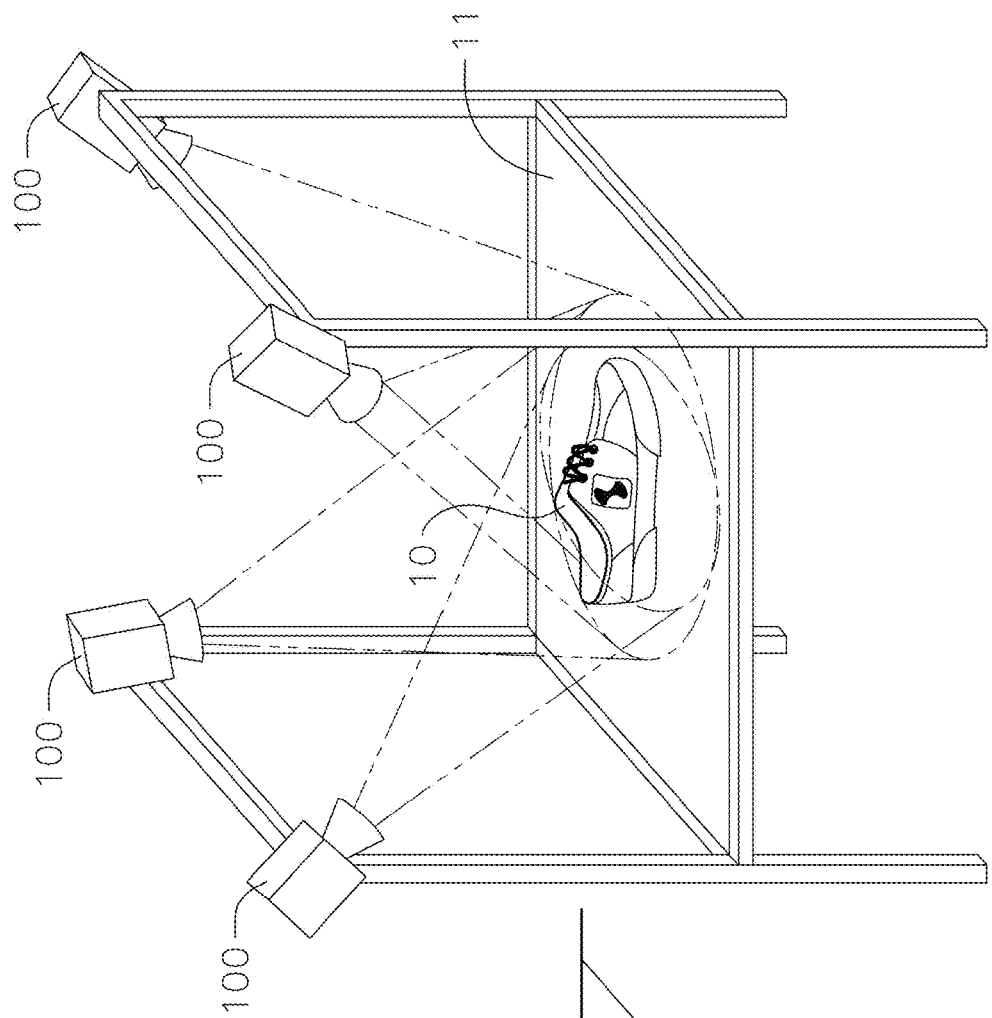
FIG. 5B is a schematic diagram of a scanning system according to one embodiment of the present invention configured to scan stationary objects (e.g., on a table).
Figure 5A:
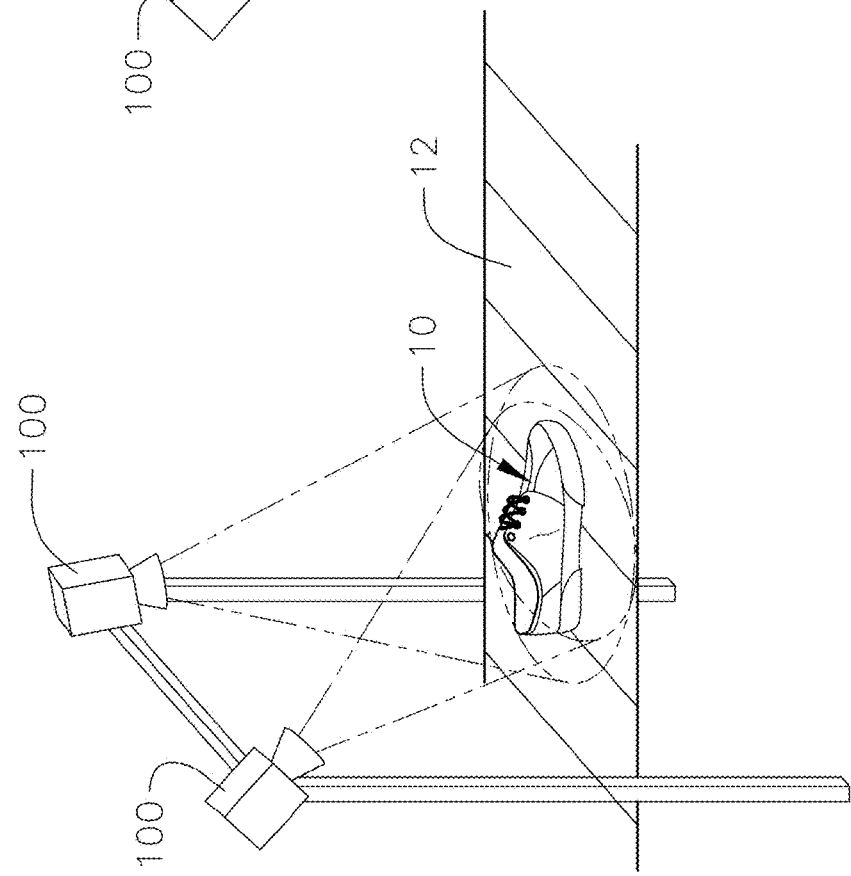
FIG. 5A is a schematic diagram of a scanning system configured to scan objects on a conveyor belt according to one embodiment of the present invention.

FIG. 5A is a schematic diagram of a scanning system 99 configured to scan objects on a conveyor belt according to one embodiment of the present invention. FIG. 5B is a schematic diagram of a scanning system according to one embodiment of the present invention configured to scan stationary objects (e.g., on a table).

Figure 6:
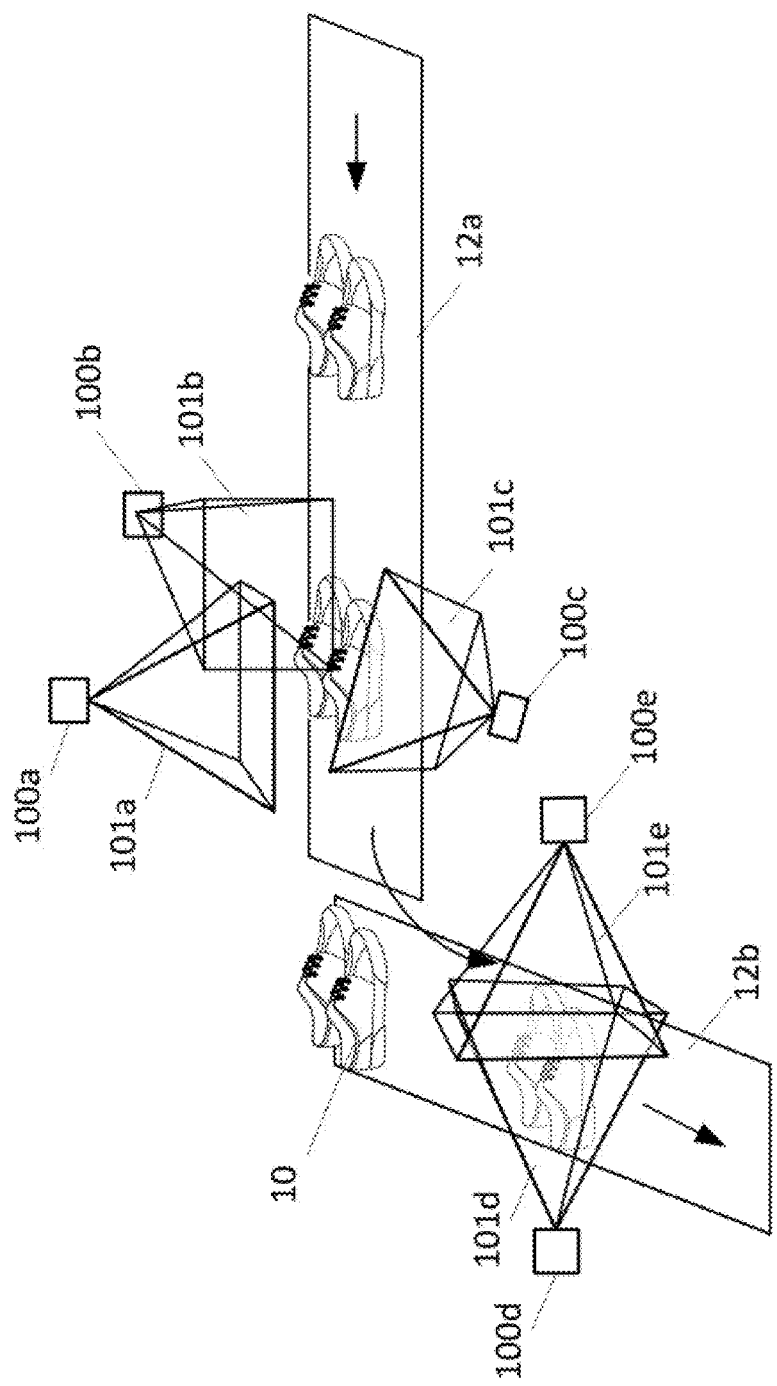
FIG. 6 is a schematic depiction of an object (depicted as a pair of shoes) traveling on a conveyor belt having two portions, where the first portion moves the object along a first direction and the second portion moves the object along a second direction that is orthogonal to the first direction in accordance with one embodiment of the present invention.

As shown in FIGS. 5A, 5B, and 6, a scanning system 99 may include multiple depth cameras 100. Each of the depth cameras 100 is calibrated at manufacturing, obtaining an estimate of the intrinsic parameters of its (2-D) camera sensors and an estimate of the intra-scanner extrinsic parameters (e.g. the rotation and translation between all the sensors, such as image sensors 102a and 104a of FIG. 2, of a single depth camera 100). An overview of standard multi-camera calibration procedures can be found in Zanuttigh, P., et al., Time-of-Flight and Structured Light Depth Cameras. 2016, Springer.

As one example of an arrangement of cameras, FIG. 6 is a schematic depiction of an object 10 (depicted as a pair of shoes) traveling on a conveyor belt 12 having two portions, where the first portion moves the object 10 along a first direction and the second portion moves the object 10 along a second direction that is orthogonal to the first direction in accordance with one embodiment of the present invention. When the object 10 travels along the first portion 12a of the conveyor belt 12, a first camera 100a images the top surface of the object 10 from above, while second and third cameras 100b and 100c image the sides of the object 10. In this arrangement, it may be difficult to image the ends of the object 10 because doing so would require placing the cameras along the direction of movement of the conveyor belt and therefore may obstruct the movement of the objects 10. As such, the object 10 may transition to the second portion 12b of the conveyor belt 12, where, after the transition, the end of the object 10 are now visible to cameras 100d and 100e located on the sides of the second portion 12b of the conveyor belt 12. As such, FIG. 6 illustrates an example of an arrangement of cameras that allows coverage of the entire visible surface of the object 10.

In some embodiments, the extrinsic parameters of the depth cameras 100 (e.g., relative poses) are estimated through another calibration step, in which a calibration target (e.g., an object of known size with identifiable and precisely detectable features, such as a black-and-white 2-D checkerboard) is acquired by all the depth cameras, in order to detect the relative rotation and translation between each of the scanner composing the 3-D modeling system. Accordingly, the extrinsic parameters can be used to compute or to estimate the transformations that may be applied to the separate depth maps (e.g., 3-D point clouds) captured by the different depth cameras in order to merge the depth maps to generate the captured 3-D model of the object.

Examples of systems and methods for three-dimensional scanning are described in more detail in U.S. patent application Ser. No. 15/866,217, "SYSTEMS AND METHODS FOR DEFECT DETECTION," filed in the United States Patent and Trademark Office on Jan. 9, 2018 and U.S. patent application Ser. No. 15/974,595, "SYSTEMS AND METHODS FOR INSPECTION AND DEFECT DETECTION USING 3-D SCANNING," filed in the United States Patent and Trademark Office on May 8, 2018, the entire disclosures of which are incorporated by reference herein.

Generation of 3-D Models

If depth images are captured by the depth cameras 100 at different poses (e.g., different locations with respect to the target object 10), then it is possible to acquire data regarding the shape of a larger portion of the surface of the target object 10 than could be acquired by a single depth camera through a point cloud merging module 210 (see FIG. 7) of a 3-D model generation module 200 that merges the separate depth images (represented as point clouds) 14 into a merged point cloud 220. For example, opposite surfaces of an object (e.g., the medial and lateral sides of the boot shown in FIG. 7) can both be acquired, whereas a single camera at a single pose could only acquire a depth image of one side of the target object at a time. The multiple depth images can be captured by moving a single depth camera over multiple different poses or by using multiple depth cameras located at different positions. Merging the depth images (or point clouds) requires additional computation and can be achieved using techniques such as an Iterative Closest Point (ICP) technique (see, e.g., Besl, Paul J., and Neil D. McKay. "Method for registration of 3-D shapes." Robotics-DL tentative. International Society for Optics and Photonics, 1992), which can automatically compute the relative poses of the depth cameras by optimizing (e.g., minimizing) a particular alignment metric. The ICP process can be accelerated by providing approximate initial relative poses of the cameras, which may be available if the cameras are "registered" (e.g., if the poses of the cameras are already known and substantially fixed in that their poses do not change between a calibration step and runtime operation). Systems and methods for capturing substantially all visible surfaces of an object are described, for example, in U.S. patent application Ser. No. 15/866,217, "Systems and Methods for Defect Detection," filed in the United States Patent and Trademark Office on Jan. 9, 2018, the entire disclosure of which is incorporated by reference herein.

A point cloud, which may be obtained by merging multiple aligned individual point clouds (individual depth images) can be processed to remove "outlier" points due to erroneous measurements (e.g., measurement noise) or to remove structures that are not of interest, such as surfaces corresponding to background objects (e.g., by removing points having a depth greater than a particular threshold depth) and the surface (or "ground plane") that the object is resting upon (e.g., by detecting a bottommost plane of points).

In some embodiments, the system further includes a plurality of color cameras 150 configured to capture texture (color) data 16 of the query object. As noted above, in some embodiments of the present invention, the depth cameras may use RBG-IR sensors which capture both infrared data and color camera data, such that the depth cameras 100 provide color data 166 instead of using separate color cameras 150. The texture data may include the color, shading, and patterns on the surface of the object that are not present or evident in the physical shape of the object. In some circumstances, the materials of the target object may be reflective (e.g., glossy). As a result, texture information may be lost due to the presence of glare and the captured color information may include artifacts, such as the reflection of light sources within the scene. As such, some aspects of embodiments of the present invention are directed to the removal of glare in order to capture the actual color data of the surfaces. In some embodiments, this is achieved by imaging the same portion (or "patch") of the surface of the target object from multiple poses, where the glare may only be visible from a small fraction of those poses. As a result, the actual color of the patch can be determined by computing a color vector associated with the patch for each of the color cameras, and computing a color vector having minimum magnitude from among the color vectors. This technique is described in more detail in U.S. patent application Ser. No. 15/678,075, "System and Method for Three-Dimensional Scanning and for Capturing a Bidirectional Reflectance Distribution Function," filed in the United States Patent and Trademark Office on Aug. 15, 2017, the entire disclosure of which is incorporated by reference herein.

Figure 7:
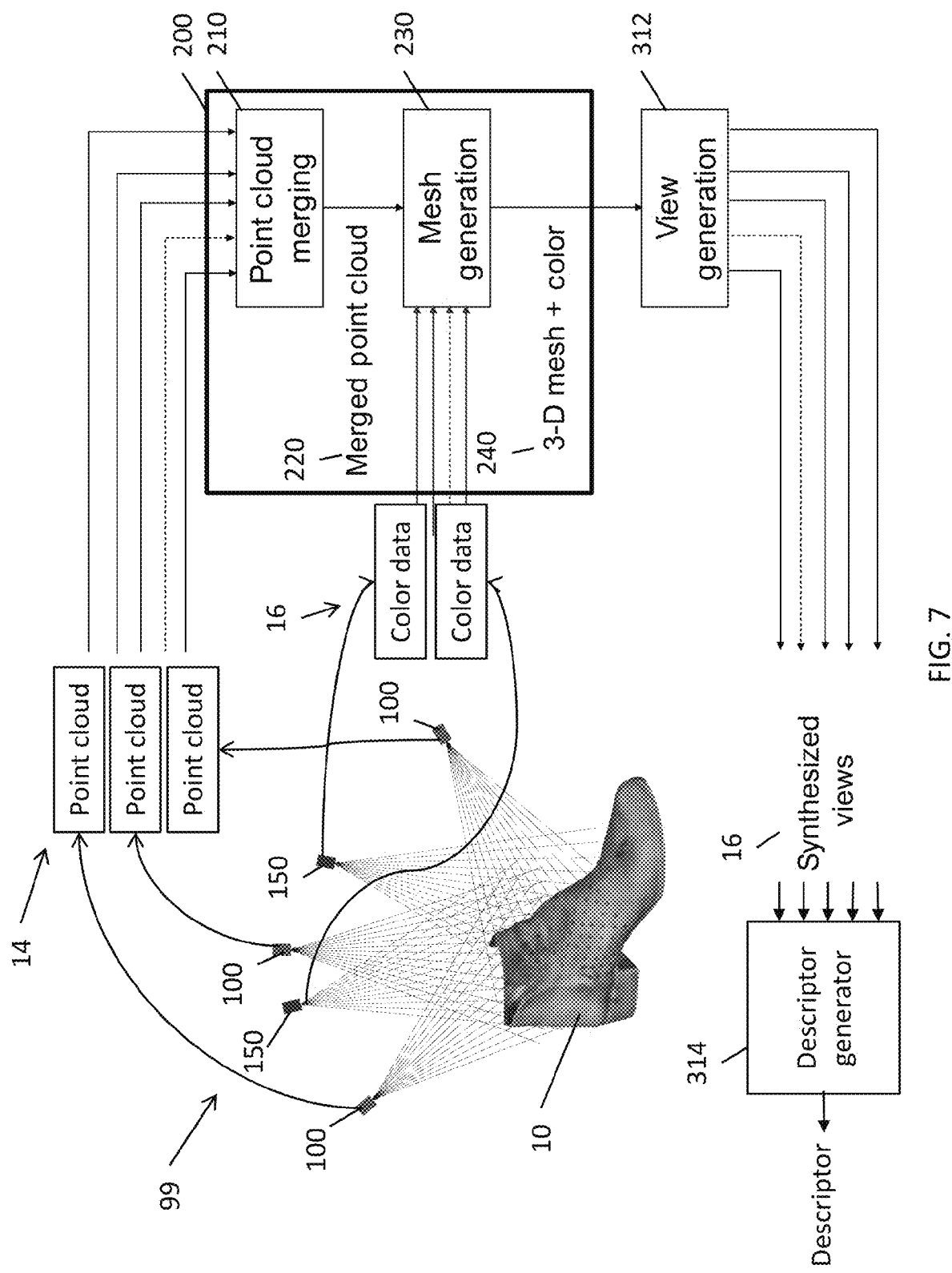
FIG. 7 is a schematic block diagram illustrating a process for capturing images of a target object and generating a descriptor for the target object according to one embodiment of the present invention.

In some embodiments, the point clouds are combined to generate a 3-D model. FIG. 7 is a schematic block diagram illustrating a process for capturing images of a target object and generating a descriptor for the target object according to one embodiment of the present invention. For example, the separate point clouds 14 are merged by a point cloud merging module 210 to generate a merged point cloud 220 (e.g., by using ICP to align and merge the point clouds and also by removing extraneous or spurious points to reduce noise and to manage the size of the point cloud 3-D model). In some embodiments, a mesh generation module 230 computes a 3-D mesh 240 from the merged point cloud using techniques such as Delaunay triangulation and alpha shapes and software tools such as MeshLab (see, e.g., P. Cignoni, M. Callieri, M. Corsini, M. Dellepiane, F. Ganovelli, G. Ranzuglia MeshLab: an Open-Source Mesh Processing Tool Sixth Eurographics Italian Chapter Conference, pages 129-136, 2008.). The 3-D model (whether a 3-D point cloud model 220 or a 3-D mesh model 240) can be combined with color information 16 from the color cameras 150 about the color of the surface of the object at various points, and this color information may be applied to the 3-D point cloud or 3-D mesh model as a texture map (e.g., information about the color of the surface of the model).

Analysis Agent

Referring back to the block diagram of FIG. 1B, in some embodiments of the present invention, the 3-D model acquired by the one or more 3-D scanners 100 can be supplied to an analysis agent or inspection system 300, which analyzes the input data (e.g., the 3-D model and, in some instances, a subset of the acquired frames) in operation 1300, in order to infer properties about the object itself.

Figure 8:
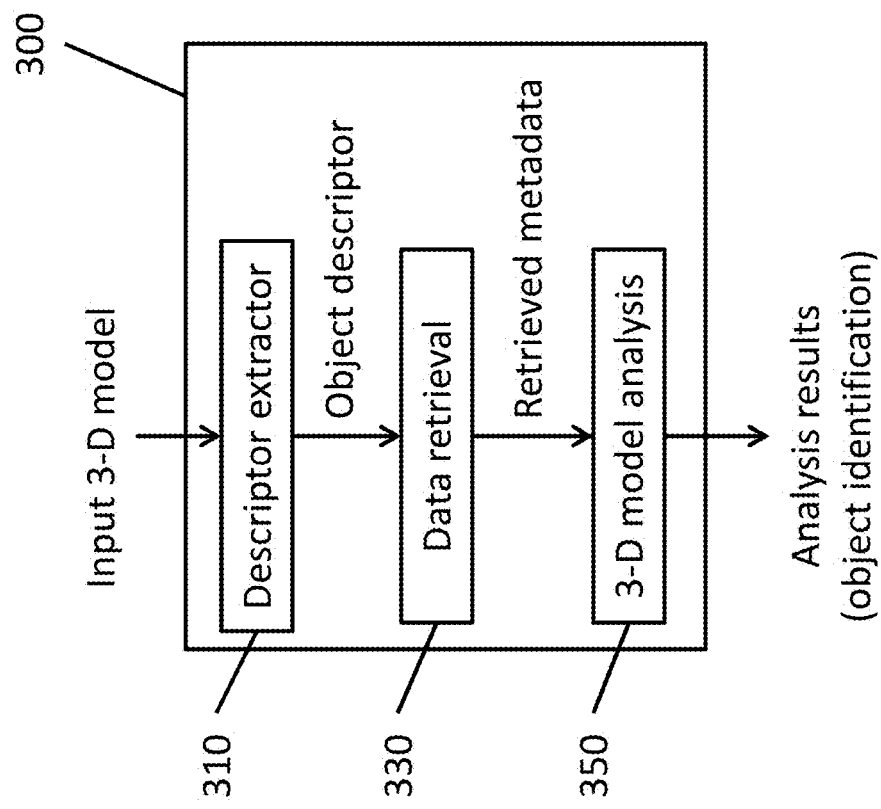
FIG. 8 is a block diagram of an analysis system according to one embodiment of the present invention.
Figure 9:
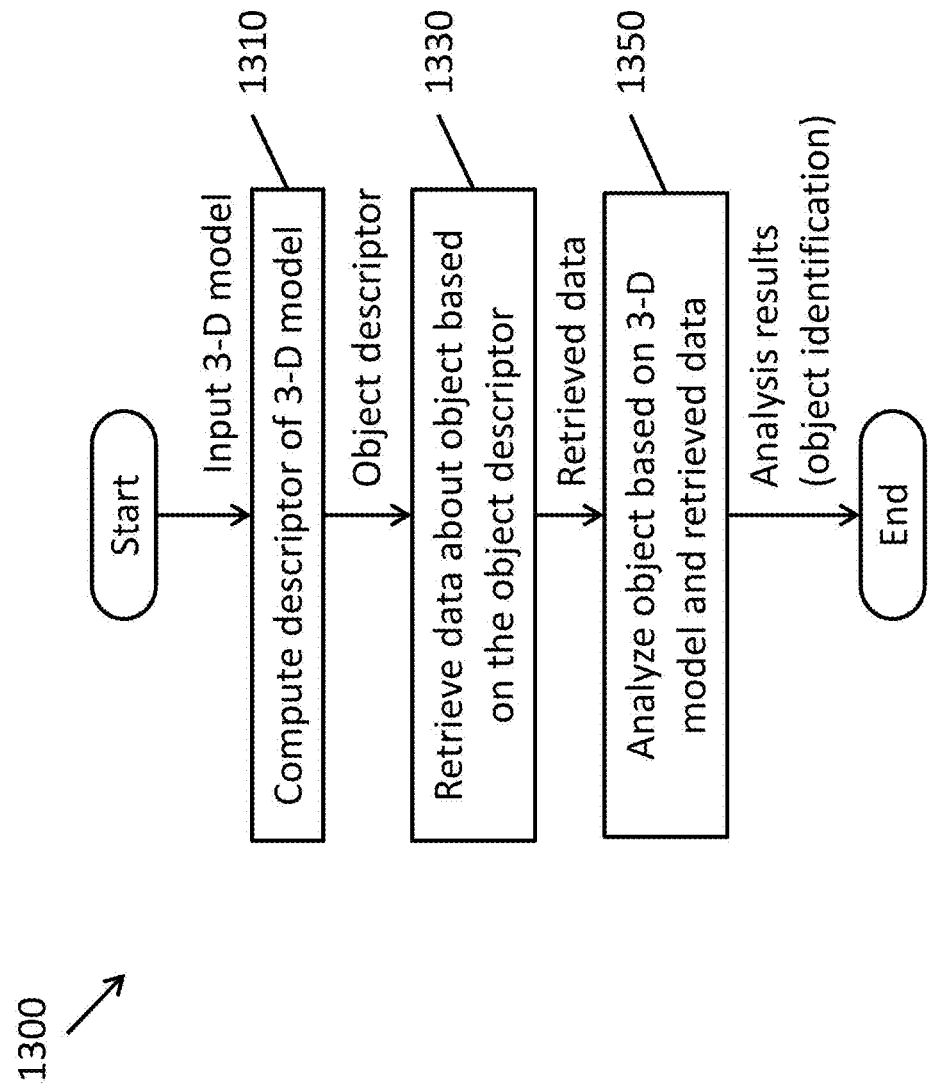
FIG. 9 is a flowchart of a method for analyzing a 3-D model of an object using an analysis system according to one embodiment of the present invention.

FIG. 8 is a block diagram of an analysis system according to one embodiment of the present invention. FIG. 9 is a flowchart of a method for analyzing a 3-D model of an object using an analysis system according to one embodiment of the present invention. The analysis agent 300 may be implemented using a computer system, which may include a processor and memory, where the memory stores instructions that cause the processor to execute various portions of methods according to embodiments of the present invention. As shown in FIG. 8, the analysis system 300 may include a descriptor extractor module 310, a data retrieval module 330 and a 3-D model analysis module 350. In operation 1310, the descriptor extractor module 310 generates an object descriptor from an input 3-D module, and the data retrieval module 330 retrieves, in operation 1330, metadata (e.g., from a database) corresponding to the object based on the object descriptor. The 3-D model analysis module 350 uses the retrieved data to analyze the input 3-D model in operation 1350 and to generate analysis results. (In some embodiments of the present invention, the 3-D model analysis module 350 and operation 1350 are omitted, such as in circumstances object identification is sufficient. These may include circumstances where further instance-specific analysis is not required, such as where defects or abnormalities in the objects are not expected or otherwise acceptable.)

Various computational portions of embodiments of the present invention may be implemented through purpose-specific computer instructions executed by a computer system. The computer system may include one or more processors, including one or more central processing units (CPUs), one or more graphics processing units (GPUs), one or more field programmable gate arrays (FPGAs), one or more digital signal processors (DSPs), and/or one or more application specific integrated circuits (ASICs) such as neuromorphic processors and other processing units configured to implement neural networks such as "tensor processing units" (TPUs), vector processors, and the like.

The computer system may also include peripherals such as communications devices (e.g., network adapters, serial or parallel data bus adapters, graphics adapters) for transmitting and/or receiving data to and from other devices such as 3-D scanning systems, data storage systems (e.g., databases), display devices, and other computer systems. The computations may be distributed across multiple separate computer systems, some of which may be local to the scanning of the query objects (e.g., on-site and connected directly to the depth and color cameras, or connected to the depth and color cameras over a local area network), and some of which may be remote (e.g., off-site, "cloud" based computing resources connected to the depth and color cameras through a wide area network such as the Internet).

In some embodiments of the present invention, the processing is performed at the camera (e.g., in one or more processors and memory of the scanners 100), and object analysis results (e.g., object identifications) and/or "descriptors" (described in more detail below) may be computed by the scanners 100. In some embodiments of the present invention, the individual outputs of the different scanners (e.g., the different descriptors) may be combined together and analyzed together to compute an overall object identification. In some embodiments of the present invention, a group of cameras may share one or more local processors (e.g., multiple scanners 100 mounted on a single cart or basket) to compute analysis results based on the images captured by the different scanners 100 of the group. In some embodiments of the present invention, by performing the data analysis locally, the amount of data transferred over a network is reduced (e.g., transmitting analysis results is generally less bandwidth intensive than transmitting depth maps or 3-D models), thereby allowing for a greater number of cameras to be distributed throughout an environment without requiring a large investment in networking equipment to provide sufficient bandwidth. Some considerations and systems for distributing a computation between a local processing device and a remote (or "offline") processing device are described, for example, in U.S. patent application Ser. No. 15/805,107 "SYSTEM AND METHOD FOR PORTABLE ACTIVE 3D SCANNING," filed in the United States Patent and Trademark Office on Nov. 6, 2017, the entire disclosure of which is incorporated by reference herein.

For the sake of convenience, the computer systems configured using particular computer instructions to perform purpose specific operations for inspecting target objects based on captured images of the target objects are referred to herein as parts of inspection agents or inspection systems.

Object Identification

According to some embodiments of the present invention, the analysis agent 300 identifies an object based on its 3-D model. In various embodiments of the present invention, identification of the object is used to obtain metadata about the object. For example, in a retail store context, the identity of the object may be used to retrieve its current price and/or to retrieve deals or special offers associated with the product (e.g., the identity of the object may be associated with a key for another database such as an inventory database or a special offers database).

In some embodiments, the retrieved metadata may also include information about the expected size and shape of the object, or may retrieve trained models configured to detect defects associated with the object, such that defective or abnormal objects can be detected and to notify the user of the defect or abnormality. For example, in the case of a retail environment, notifying a customer of defects or abnormalities at the time of purchase can prompt the customer to choose another instance of the item, in order to avoid discovering the defect for themselves later on, and thereby requiring a costly exchange process. In the case of a manufacturing environment, identifying defects in objects added to a kit can improve the quality of the kit by checking that each of the objects meets specification, thereby increasing the likelihood that the full kit of objects can be used correctly (e.g., assembled without needing to replace defective parts).

Figure 10:
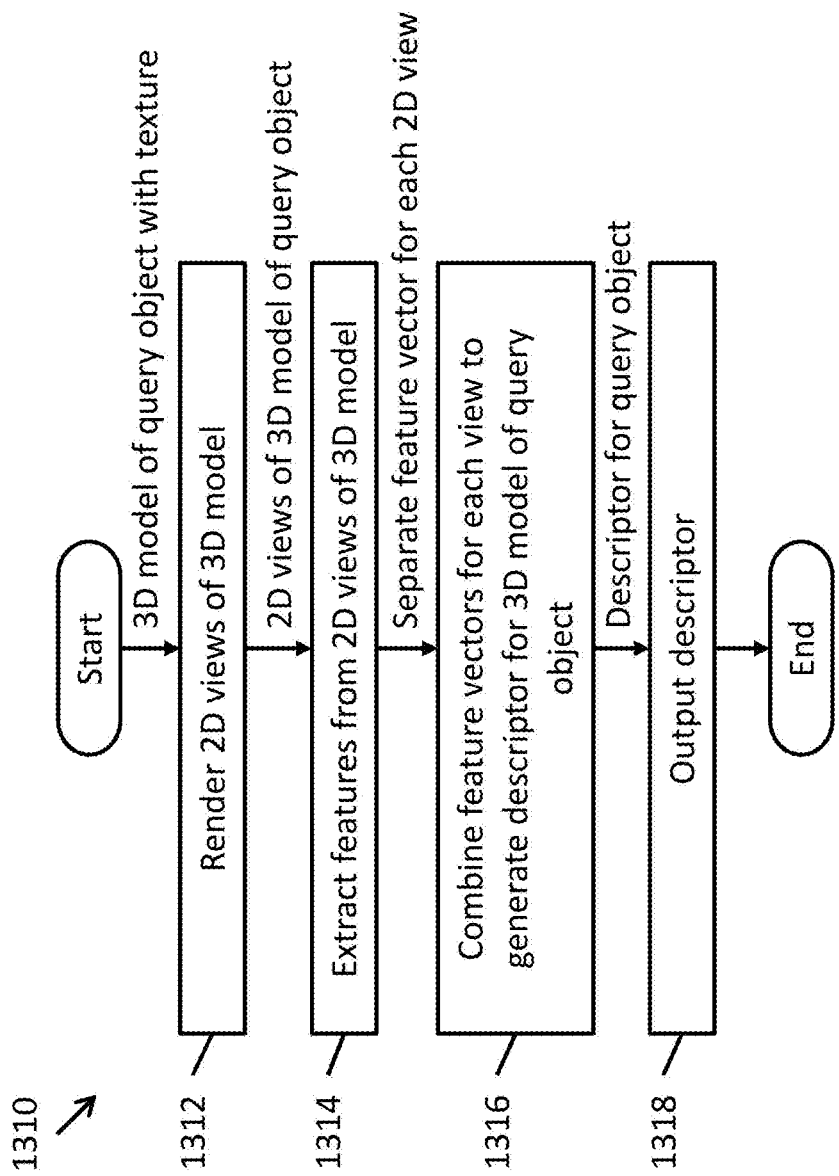
FIG. 10 is a flowchart of a method for computing a descriptor of a query object from a 3-D model of the query object according to one embodiment of the present invention.
Figure 11:
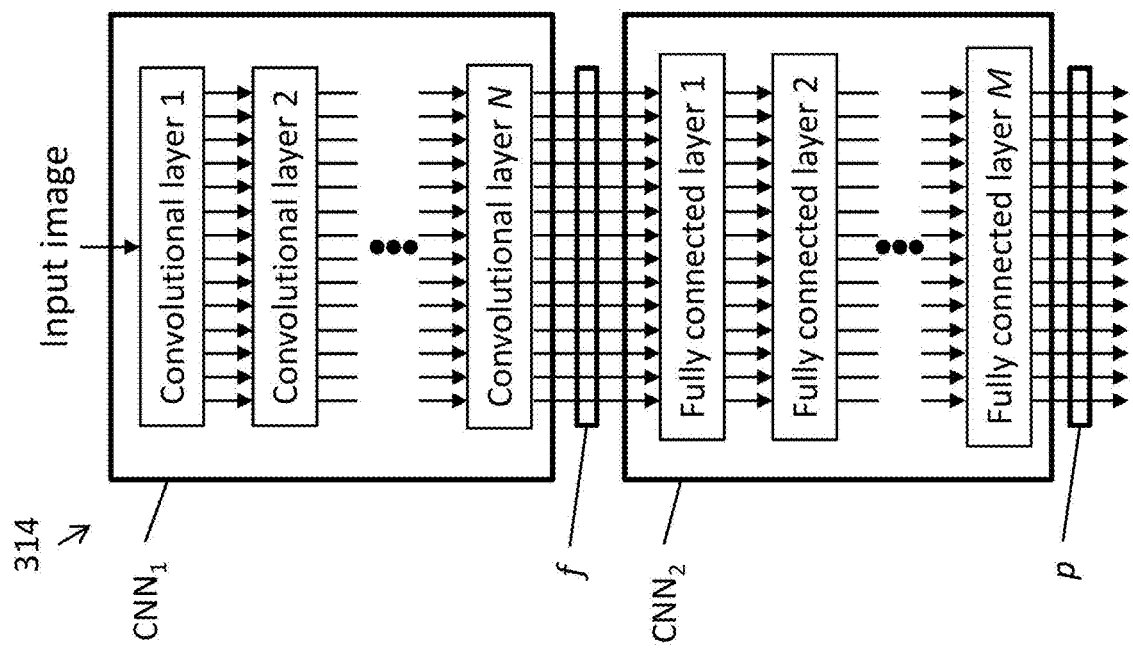
FIG. 11 is a block diagram of a convolutional neural network based classification system according to one embodiment of the present invention.

Referring to FIG. 9, in operation 1310, the analysis system 300 computes a descriptor of the 3-D model. FIG. 10 is a flowchart of a method for computing a descriptor of a query object from a 3-D model of the query object according to one embodiment of the present invention. FIG. 11 is a block diagram of a convolutional neural network based classification system according to one embodiment of the present invention.

Figure 12:
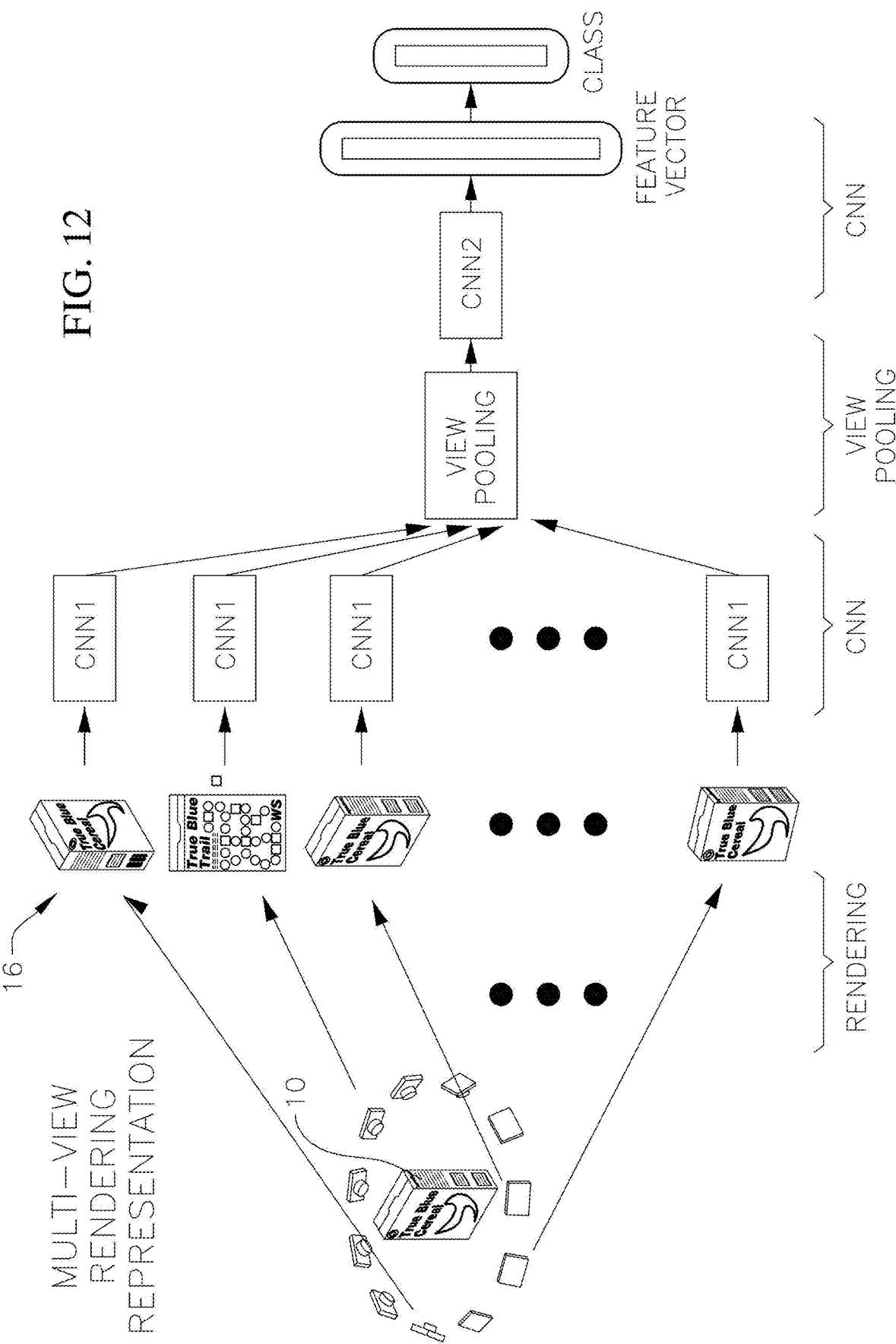
FIGS. 12 and 13 are illustration of max-pooling according to one embodiment of the present invention.

In some embodiments of the present invention, the object identification is performed by computing a descriptor of the 3-D model of the object, where the descriptor is a multi-dimensional vector having a fixed length (e.g., having a dimensionality of 16 or 4096). Techniques for computing a descriptor of a 3-D model are based on a forward evaluation of a Multi-View Convolutional Neural Network (MV-CNN) or by a Volumetric Convolutional Neural Network (V-CNN). Such networks are usually trained for object classification, and, in some embodiments, the output of the penultimate layer of the network is used as the descriptor, as shown in FIG. 12 (described in more detail below).

In particular, in the embodiment shown in FIG. 7, the descriptor is computed from 2-D views 16 of the 3-D model 240, as rendered by the view generation module 312 in operation 1312. In operation 1314, the synthesized 2-D views are supplied to a descriptor generator 314 to extract a descriptor or feature vector for each view. In operation 1316, the feature vectors for each view are combined (e.g., using max pooling, as described in more detail below) to generate a descriptor for the 3-D model and to classify the object based on the descriptor. This feature vector may contain salient and characteristic aspects of the object's shape, and is used for subsequent classification or retrieval steps. The generated descriptor may be output in operation 1318.

Generally, the task of classifying a shape s into one of a set C of given classes (also called categories or labels) is distinguished from the task of retrieving from a database the shape that is most similar (under a specific metric) to a given shape. For the sake of convenience herein, shape retrieval will be considered as a special case of classification, in which each shape in the database represents a class in itself, and a shape s is classified with the label of the most similar shape in the database. This approach is sometimes referred to as nearest neighbor classification in the pattern recognition literature.

Several techniques for retrieval and classification from view-based representations of shapes are known in the literature. See, for example, Gao, Y., & Dai, Q. (2014). View-based 3-D object retrieval: challenges and approaches. IEEE MultiMedia, 3(21), 52-57. for a survey of such relevant techniques. For example, one approach (described in Furuya, T., & Ohbuchi, R. (2009, July). Dense sampling and fast encoding for 3-D model retrieval using bag-of-visual features. In Proceedings of the ACM international conference on image and video retrieval (p. 26). ACM.) [00134] expands on the concept of "bags of words," a classic method for object recognition in images, to the case of multi-view object recognition. As another example, convolutional neural networks (CNNs) may be used for multi-view object classification (see, e.g., Su, H., Maji, S., Kalogerakis, E., & Learned-Miller, E. (2015). Multi-view convolutional neural networks for 3-D shape recognition. In Proceedings of the IEEE International Conference on Computer Vision (pp. 945-953).).

According to some embodiments of the present invention, a convolutional neural network (CNN) is used to process the synthesized 2-D views to generate the classification of the object. FIG. 11 is a schematic diagram of a descriptor generator 314 according to one embodiment of the present invention implemented as a deep convolutional neural network (CNN). Generally, a deep CNN processes an image by passing the input image data (e.g., a synthesized 2-D view) through a cascade of layers. These layers can be grouped into multiple stages. The deep convolutional neural network shown in FIG. 11 includes two stages, a first stage $CNN_1$ made up of N layers (or sub-processes) and a second stage $CNN_2$ made up of M layers. In one embodiment, each of the N layers of the first stage $CNN_1$ includes a bank of linear convolution layers, followed by a point non-linearity layer and a non-linear data reduction layer. In contrast, each of the M layers of the second stage $CNN_2$ is a fully connected layer. The output p of the second stage is a class-assignment probability distribution. For example, if the entire CNN is trained to assign input images to one of k different classes, then the output of the second stage $CNN_2$ is a vector p that includes k different values, each value representing the probability (or "confidence") that the input image should be assigned the corresponding class.

As noted above, embodiments of the present invention may be implemented on suitable general purpose computing platforms, such as general purpose computer processors and application specific computer processors. For example, graphical processing units (GPUs) and other vector processors (e.g., single instruction multiple data or SIMD instruction sets of general purpose processors) are often well suited to performing the training and operation of neural networks.

In some embodiments, the neural network is trained based on training data, which may include a set of 3-D models of objects and their corresponding labels (e.g., the correct classifications of the objects). A portion of this training data may be reserved as cross-validation data to further adjust the parameters of during the training process, and a portion may also be reserved as a test data to confirm that the network is properly trained.

The parameters of the neural network (e.g., the weights of the connections between the layers) can be used using standard processes for training neural network such as backpropagation and gradient descent (see, e.g., LeCun, Y., & Bengio, Y. (1995). Convolutional networks for images, speech, and time series. The handbook of brain theory and neural networks, 3361(10), 1995.). In addition, the training process may be initialized using parameters from a pre-trained general-purpose image classification neural network (see, e.g., Chatfield, K., Simonyan, K., Vedaldi, A., & Zisserman, A. (2014). Return of the devil in the details: Delving deep into convolutional nets. arXiv preprint arXiv: 1405.3531.).

As shown in FIG. 11, the values computed by the first stage $CNN_1$ (the convolutional stage) and supplied to the second stage $CNN_2$ (the fully connected stage) are referred to herein as a descriptor (or feature vector) f. The feature vector or descriptor may be a vector of data having a fixed size (e.g., 4,096 entries) which condenses or summarizes the main characteristics of the input image. As such, the first stage $CNN_1$ may be referred to as a feature extraction stage of the classification system 270.

The architecture of a classifier 270 described above with respect to FIG. 11 can be applied to classifying multi-view shape representations of 3-D objects based on n different 2-D views of the object. For example, the first stage $CNN_1$ can be applied independently to each of the n 2-D views used to represent the 3-D shape, thereby computing a set of n feature vectors (one for each of the 2-D views). Aspects of this technique are described in more detail in, for example, Su, H., Maji, S., Kalogerakis, E., & Learned-Miller, E. (2015). Multi-view convolutional neural networks for 3-D shape recognition. In Proceedings of the IEEE International Conference on Computer Vision (pp. 945-953). In some embodiments, the n separate feature vectors are combined using, for example, max pooling (see, e.g., Boureau, Y. L., Ponce, J., & LeCun, Y. (2010). A theoretical analysis of feature pooling in visual recognition. In Proceedings of the 27th international conference on machine learning (ICML-10) (pp. 111-118).).

Figure 13:
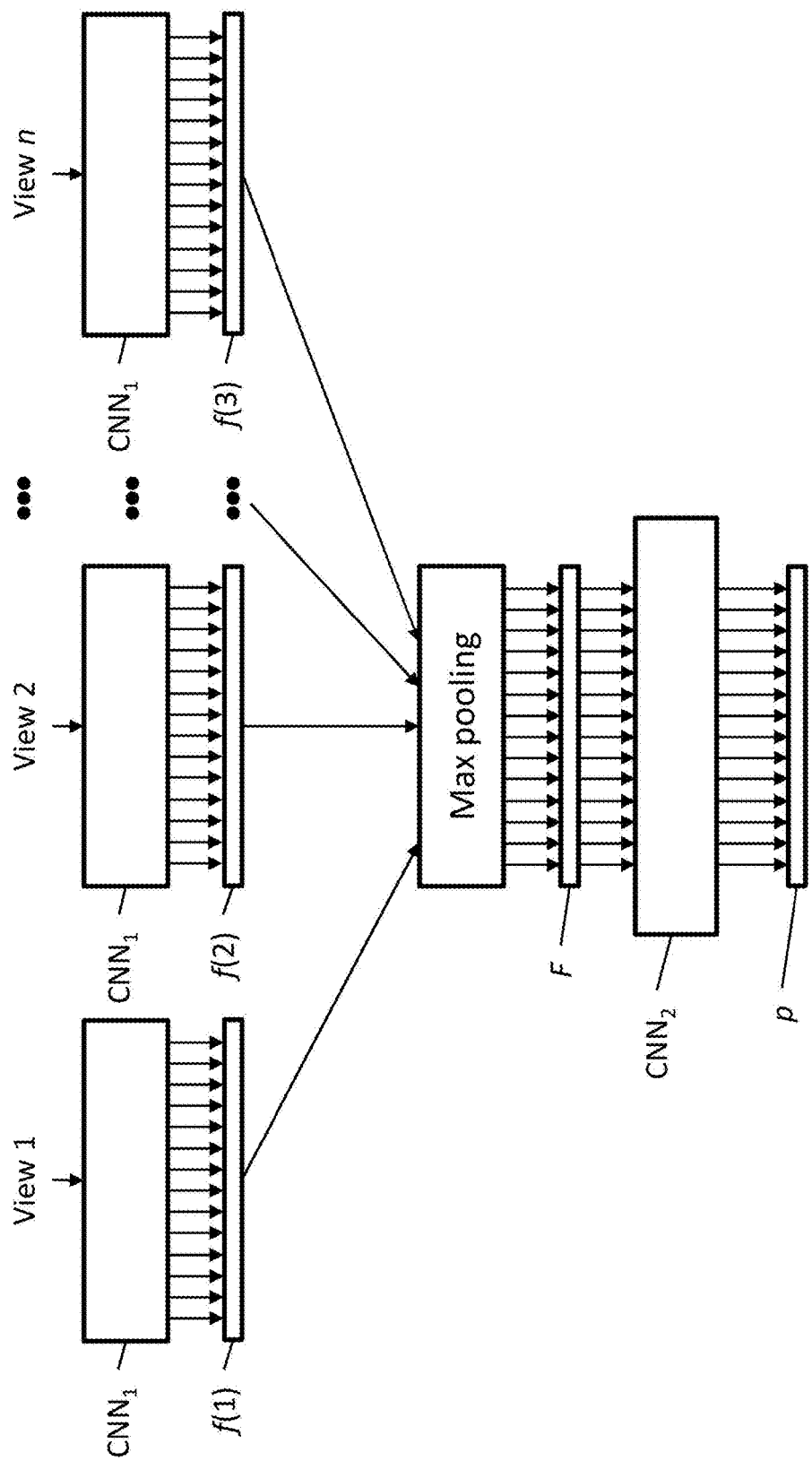

FIGS. 12 and 13 are illustration of max-pooling according to one embodiment of the present invention. As shown in FIG. 13, each of the n views is supplied to the first stage $CNN_1$ of the descriptor generator 314 to generate n feature vectors. In max-pooling, the n feature vectors f are combined to generate a single combined feature vector or descriptor F, where the j-th entry of the descriptor F is equal to the maximum among the j-th entries among the n feature vectors f. The resulting descriptor F has the same length (or rank) as the n feature vectors f and therefore descriptor F can also be supplied as input to the second stage $CNN_2$ to compute a classification of the object.

In some embodiments of the present invention, the selection of particular poses of the virtual cameras, e.g., the selection of which particular 2-D views to render, results in a descriptor F having properties that are substantially invariant. For example, considering a configuration where all the virtual cameras are located on a sphere (e.g., all arranged at poses that are at the same distance from the center of the 3-D model or a particular point p on the ground plane, and all having optical axes that intersect at the center of the 3-D model or at the particular point p on the ground plane). Another example of an arrangement with similar properties includes all of the virtual cameras located at the same elevation above the ground plane of the 3-D model, oriented toward the 3-D model (e.g., having optical axes intersecting with the center of the 3-D model), and at the same distance from the 3-D model, in which case any rotation of the object around a vertical axis (e.g., perpendicular to the ground plane) extending through the center of the 3-D model will result in essentially the same vector or descriptor F (assuming that the cameras are placed at closely spaced locations).

Figure 14:
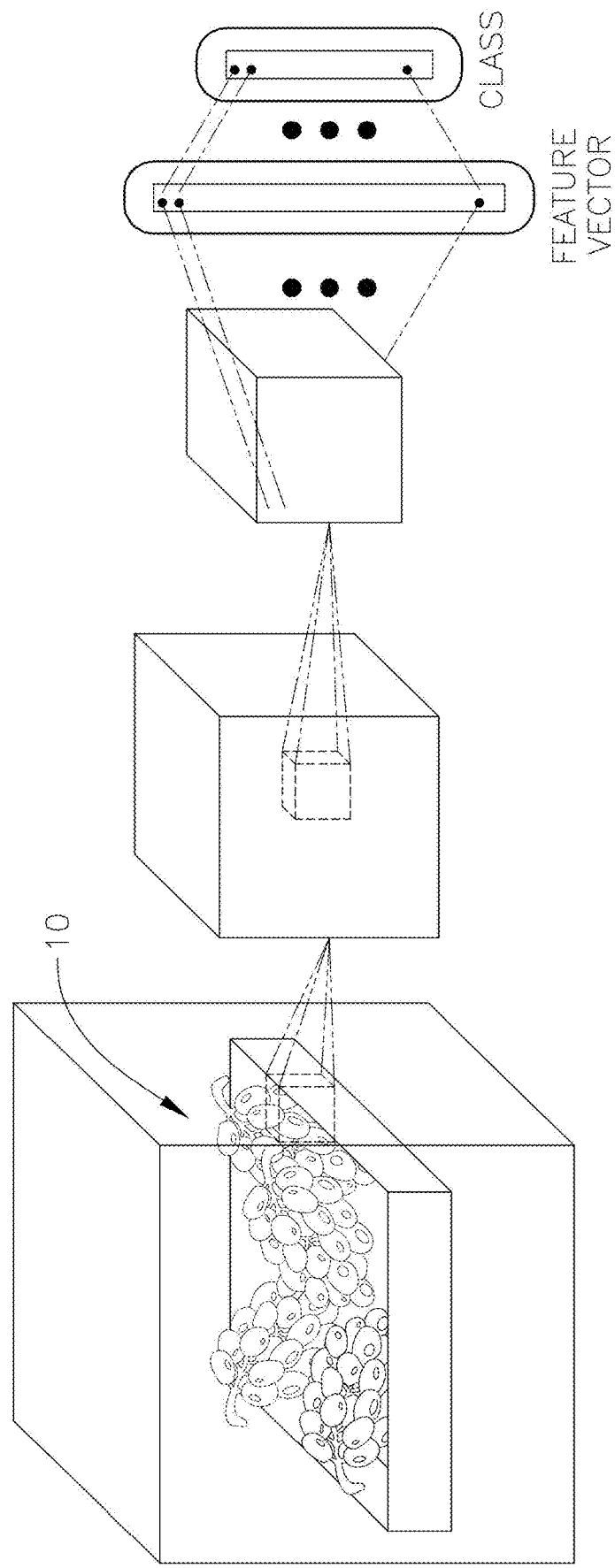
FIG. 14 is a schematic diagram illustrating the analysis of a volumetric representation of a feature vector according to one embodiment of the present invention.

Some embodiments of the present invention may also use a voxelization approach to generate a feature vector from a volumetric representation of the 3-D model. FIG. 14 is a schematic diagram illustrating the analysis of a volumetric representation of a feature vector according to one embodiment of the present invention, where a convolutional neural network is supplied with feature vectors that correspond to volumes that intersect with the surface of the 3-D model (shown in FIG. 14 as a model of a few bunches of grapes), where the volumes have a size and shape corresponding to a volumetric 3-D convolutional kernel (rather than 2-D patches of the 2-D view corresponding to the size of the 2-D convolutional kernel).

The extracted feature vector can then be supplied to a classifier to classify the object as being a member of one of a particular set of k different classes C, thereby resulting in classification of the query object 10. This can be done, for example, by supplying the descriptor F to the second stage $CNN_2$, resulting in the vector p of normalized positive numbers representing the class-assignment probability distribution. The index of the largest entry of this vector p is the most likely class for the given shape, with the associated maximum value representing the confidence of this classification. As such, the second stage $CNN_2$ may be referred to as a classification stage of the convolutional neural network.

In some embodiments of the present invention, the descriptor vector is used to query a database of objects for which are associated with descriptors that were previously computed using the same technique. This database of objects constitutes a set of known objects, and a known object corresponding to the current object (e.g., the scanned object or "query object") can be identified by searching for the closest (e.g. most similar) descriptor in the multi-dimensional space of descriptors, with respect to the descriptor of the current object.

In more detail, in some embodiments of the present invention, the classifier $CNN_2$ classifies the target object 10 by using the descriptor F of the target object to retrieve a most similar shape in a data set, rather than by supplying the descriptor F to the second stage $CNN_2$. In more detail, all of the objects in the training set may be supplied to the first stage $CNN_1$ to generate a set of known descriptors $\{F_{ds}(m)\}$, where the index m indicates a particular labeled shape in the training data. A similarity metric is defined to measure the distance between any two given descriptors (vectors) F and $F_{ds}(m)$. Some simple examples of similarity metrics are a Euclidean vector distance and a Mahalanobis vector distance. In other embodiments of the present invention a similarity metric is learned using a metric learning algorithm (see, e.g., Boureau, Y. L., Ponce, J., & LeCun, Y. (2010). A theoretical analysis of feature pooling in visual recognition. In Proceedings of the 27th international conference on machine learning (ICML-10) (pp. 111-118).). A metric learning algorithm may learn a linear or non-linear transformation of feature vector space that minimizes the average distance between vector pairs belonging to the same class (as measured from examples in the training data) and maximizes the average distance between vector pairs belonging to different classes.

In one embodiment of the present invention, the inspection agent 300 performs object identification using a multi-view CNN that has been pre-retrained on generic object classification, in order to obtain a "black box" that is able to provide a uniquely identifiable signature (which may also be referred to as a "feature vector") for a given 3-D model. This feature vector is then fed into a nearest neighbor classifier that performs nearest neighbor search within a database of features vectors of possible identities to be retrieved. Optionally dimensionality reduction approaches can be considered, such as Large Margin Nearest Neighbor metric learning and Principal Components Analysis (PCA).

According to some embodiments of the present invention, the training set of known objects is selected based on the particular objects that are expected to be observed in the particular environment in which the object identification system will operate. For example, in a retail environment such as a supermarket, the convolutional neural network may be trained on products that are typically found in a supermarket, whereas in a department store, the convolutional neural network may be trained based on, for example, the various items of clothing, accessories, and skin care products expected to be found in such a store. In other environments such as kitting for manufacturing, the system may be trained on the types of parts expected to be in a kit (e.g., screws, printed circuit boards, connectors, insulation tape, housings, and the like). However, as discussed in more detail below, in some embodiments of the present invention, adding additional items for identification does not necessarily require a full retraining of a neural network, and techniques such as transfer learning and fine tuning can be used to improve the quality of the training. In some embodiments of the present invention, the training data are generated by scanning the barcodes of the items using a standard barcode scanner to load associated metadata from a database and also scanning the object using a 3-D scanning system, such as the system with the conveyor belts as depicted in FIGS. 5A and 6 or with a stationary scanning system such as that shown in FIG. 5B in order to associate the metadata with the scanned 3-D model of an example of an object.

When adding more items to a database of known objects, one or more 3-D models of the new object may be captured by a scanning system and the resulting one or more 3-D models may be supplied to the first stage $CNN_1$ to generate a descriptor. This descriptor can then be registered directly in the database of objects and associated with the metadata, without requiring retraining of the first stage $CNN_1$ or the second stage $CNN_2$.

Some examples of systems and methods for identifying objects are described, for example, in U.S. patent application Ser. No. 15/675,684, "SYSTEMS AND METHODS FOR 3D MODELS GENERATION WITH AUTOMATIC METADATA," filed in the United States Patent and Trademark Office on Aug. 11, 2017 and U.S. patent application Ser. No. 15/862,512, "SHAPE-BASED OBJECT RETRIEVAL AND CLASSIFICATION," filed in the United States Patent and Trademark Office on Jan. 4, 2018 the entire disclosures of which are incorporated by reference herein. Other techniques such as dimensionality reduction, principal component analysis (PCA), metric learning and support vector machines (SVM) may also be used to improve identification results either in terms of identification performances or in terms of computational resources.

Once the query object has been classified, data about the identified class may be retrieved from, for example, a database of metadata about the objects. The retrieved class data may include, for example, the expected dimensions of objects of the given class (e.g., size, shape, color), a reference 3-D model (e.g., a 3-D model of a canonical instance of the class (e.g., the expected shape of a manufactured part)), one or more defect detection models (e.g., models, such as convolutional neural networks, trained to detect defects in the object based on the captured 3-D model) and the like.

Object Singulation

In the above discussion, the objects being scanned were "singulated," in that the 3-D models captured by the scanning system 99 include only a single object, or the objects in the captured 3D model are not overlapping or occluding each other with respect to the 3-D scanners 100 of the scanning system 99. This assumption greatly simplifies the problem of object identification. However, in many environments, such as retail applications, the items or goods generally are not singulated, and they may be overlapping and/or partially-occluded in the views of the 3-D scanners 100, such that the scanning system 99 can acquire only partial information about the different items in the scene (e.g., in a shopping basket or cart).

Therefore, some aspects of embodiments of the present invention relate to identifying objects together with other objects. In more detail, when dealing with partial information (e.g., only part of an object is present in a 3-D model generated by the scanning system due to occlusion), the object identification task is more complex, and performing the object identification can take different forms in different embodiments of the present invention, based, in part, on the different types of desired output. In some embodiments, segmentation of the acquired information about the scene is performed (e.g., segmenting the captured 3-D model into segments), and then perform object recognition is performed independently for each segment, where each segment is a 3-D model corresponding to one object or where multiple segments may be automatically joined by matching the shape and color of the objects and (e.g., attempting to identify the segments individually and combined based on shape and color to identify which of the resulting descriptors is closer to a known object in the database). Accordingly, some embodiments of the present invention relate to identifying objects placed together in a scene ("cluttered" objects or identifying objects in clutter) in order to generate a set of identities of all of the objects in the scene and, in some embodiments, the spatial locations (e.g., three dimensional positions) of the objects. FIG. 1A is an example of objects 10 in a cluttered scene within a cart 8.

In some embodiments of the present invention, different objects in the scene are jointly identified and classified. In a third embodiment, pixel-wise segmentation and classification are performed jointly on the objects in the scene (e.g., in view of the scanning system) at the same time. The term "semantic segmentation" may be used to refer to assigning an object class (or type) to each pixel in a scene. For example, in a scene that includes different types of fruit, some pixels may be labeled with an "apple" class, where those pixels are determined to represent a part of an apple, while other pixels that are determined to be a part of an orange may be labeled with an "orange" class. In some embodiments, pixel-accurate image segmentation and semantic classification are performed based on a framework based on Fully Convolutional Neural Networks (FCNNs) and described in Song, S., S. P. Lichtenberg, and J. Xiao. Sun RGB-D: A RGB-D scene understanding benchmark suite. In Proceedings of the IEEE Conference on Computer Vision and Pattern Recognition. 2015. In more detail, in one embodiment, a training set is generated by randomly placing a set of 3-D models on a surface (e.g., using physics modeling engines to make sure that they respect fundamental physical properties such as gravity and to ensure that the objects do not interpenetrate or "clip" through each other), and then rendering such 3D models from multiple points of view, saving which class (e.g., which object or the type of the object) each pixel in the rendered image belongs to. This is called semantic segmentation and can be solved with Fully Convolutional Networks (FCNs). FCNs are usually obtained by modification of traditional convolutional neural networks (CNNs) for classification through two classical techniques: "convolutionalization" of the final fully connected layers of the CNN and by the introduction of skip layers. The same operation can be applied to a Multi-View classification CNN or to a CNN obtained by considering only one layer of such a CNN.

In some embodiments of the present invention, generative models can be used to reconstruct the portions of an object that are occluded by other objects in the scene. In more detail, a generative model can be trained to generate a full 3-D model of a known object based on being supplied a view of a portion of the object. Examples of techniques for implementing generative models are described, for example, in Wu, Zhirong, et al. "3d shapenets: A deep representation for volumetric shapes." Proceedings of the IEEE conference on computer vision and pattern recognition. 2015 and in Yang, Bo, et al. "Dense 3D object reconstruction from a single depth view." IEEE transactions on pattern analysis and machine intelligence (2018). Once the 3-D model of the 3-D object has been reconstructed by the GAN, the reconstructed 3-D model may then be used for identifying the object, as described above.

While these techniques allow the exploitation the partial information about objects in order to perform their identification, generally this is a much harder problem than one in which singulated objects are identified, because identification may only be possible for objects that are visible (or at least where a sufficiently large portion of the object is visible) from at least one of the 3D scanners in the 3D modeling system. (The sufficiency of the size of the portion of the object may depend on the particular object and its uniqueness within the range of possible objects in the database. For example, objects having globally unique shades of colors or surface textures may be identifiable even if only a small portion of the object is visible.) Accordingly, the expected quality of object identification for the case of non-singulated objects is generally lower than (or not better than) that of singulated objects, hence it is possible to think about physical configurations that enforce singulation in a direct or indirect way.

Nevertheless, some useful processing is still possible, even in the case of potential occlusion of objects in a cart. For example, objects are naturally singulated as when they are added to and removed from the cart 8, thereby allowing embodiments of the present invention to track which objects are expected to be present in the cart 8. Accordingly, the total volume of the objects 10 in the cart 8 should be approximately equal to the sum of the expected volumes of the individual items (where the expected volumes may be loaded from metadata in operation 1330) and therefore the presence of all of the items may be tracked over time based on the measured volume of the items at any given point.

Figure 15:
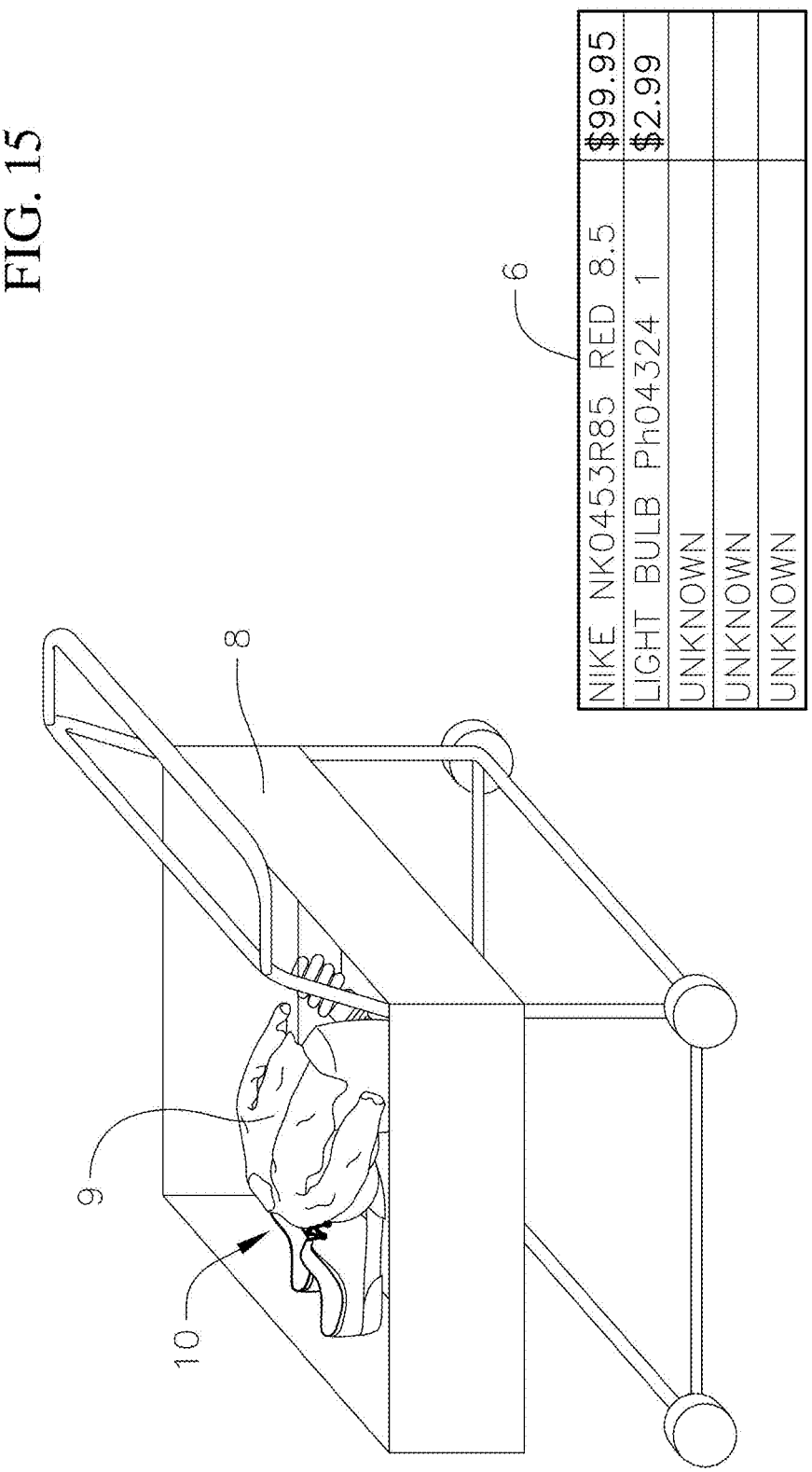
FIG. 15 is a schematic diagram of a cart in which some of the object are obscured by a sweater.

FIG. 15 is a schematic diagram of a cart in which some of the object 10 are obscured by a sweater 9. While a partial view of some objects 10, including the shoes and the light bulb may be available, the sweater obscures the other objects (e.g., the milk, the apple, and the pear, as shown in FIG. 1A). Nevertheless, volume estimation through scanning the cart 8 with a scanning system 99 may be used to determine that there may be other "unknown" items in the cart 8. In the example shown in FIG. 15, the sweater 9 does not appear in the list 6 of items because the sweater 9 is not a registered item in the store (e.g., it may be owned by the customer).

Some aspects of embodiments of the present invention relate to arrangements of the 3-D scanners 100 of a scanning system 99. While, in some embodiments, the underlying methods for object identification and tracking may remain the same between different arrangements of scanners, particular arrangement can result in different deployment costs (e.g., based on the number of scanners 100 deployed and their locations) or different levels of accuracy (e.g., based on the amount of data that can be collected about the scene).

Figure 16:
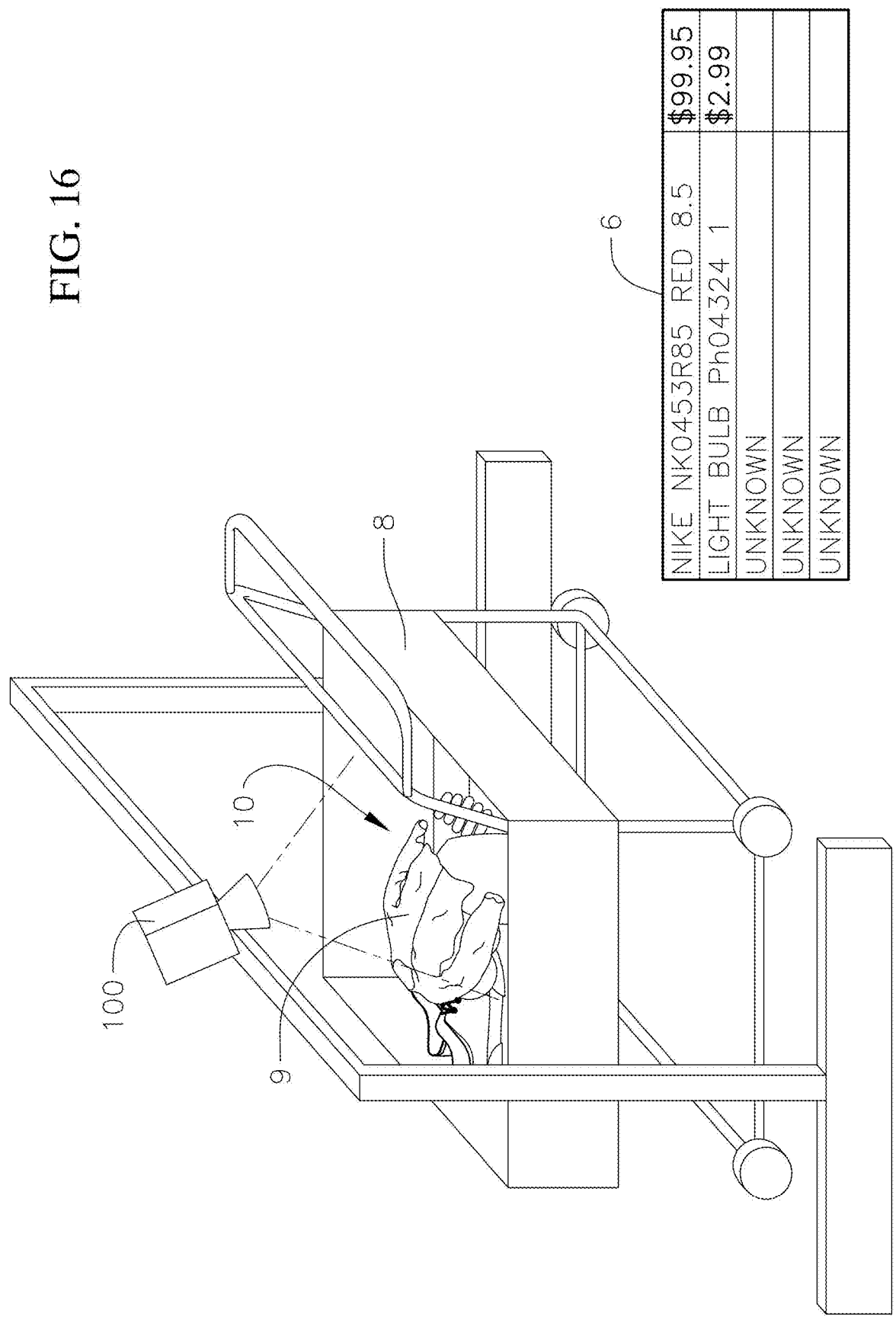
FIG. 16 depicts an arrangement of a scanning system according to one embodiment of the present invention in which a scanner is mounted on an overhead frame that is configured to capture overhead images of a cart as it passes under the scanner.

FIG. 16 depicts an arrangement of a scanning system 99 according to one embodiment of the present invention in which a scanner 100 is mounted on an overhead frame that is configured to capture overhead images of a cart 8 as it passes under the scanner 100. As a concrete example, one or more 3-D scanners 100 may be mounted in the aisles of retail stores (e.g., in a supermarket, under the hanging signs that describe the types of goods located in an aisle or at the ends of aisles), or near the checkout registers (e.g., in an automatic checkout lane).

Figure 17:
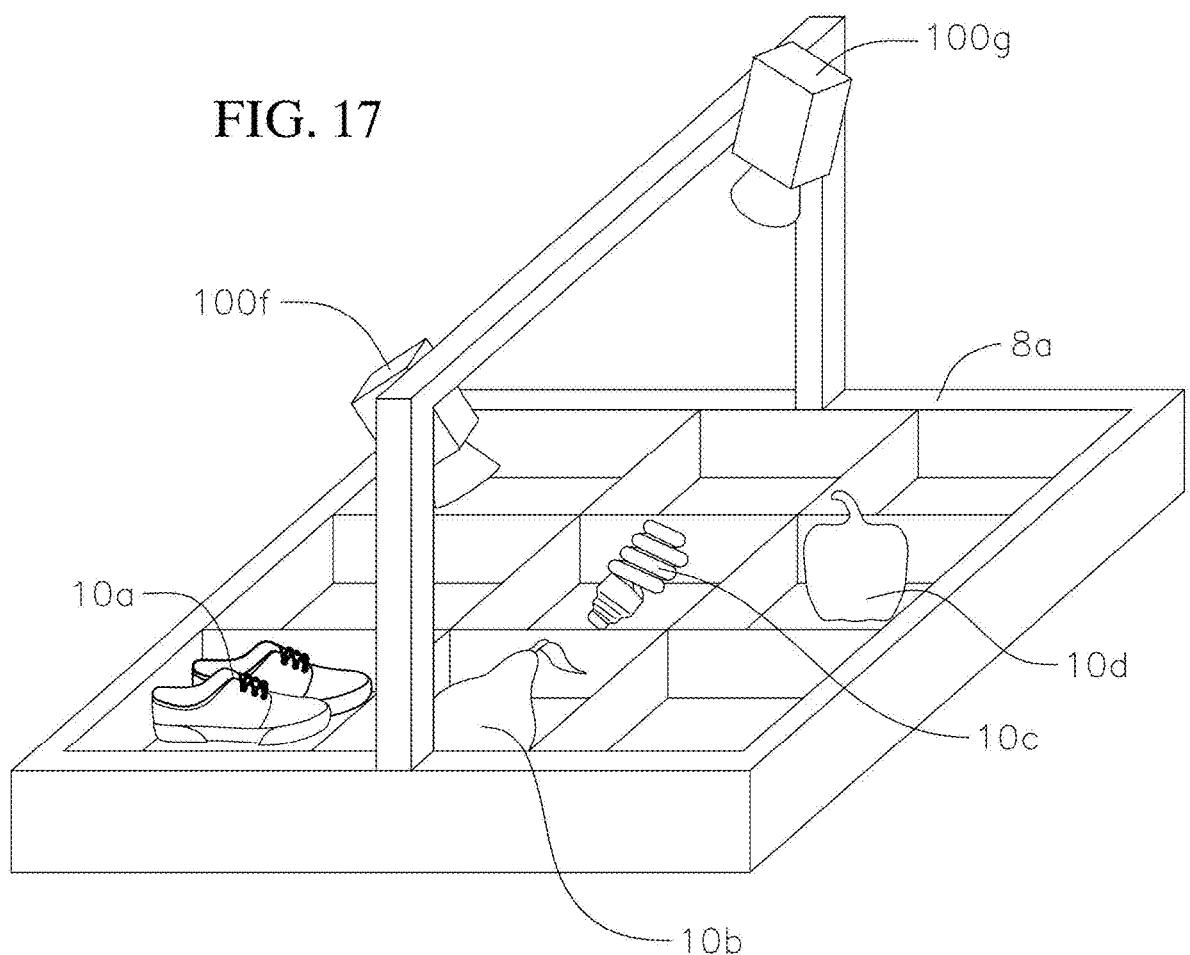
FIG. 17 is a diagram illustrating one example of singulation through the use of a cart or basket having physical dividers according to one embodiment of the present invention.

FIG. 17 is a diagram illustrating one example of singulation through the use of a cart or basket having physical dividers according to one embodiment of the present invention. In the embodiment shown in FIG. 17, goods separators are built into the cart/basket, leading to explicit definition of bins, where the customer or user is allowed to place a single item per bin, and the items are restricted up to a maximum size (dimensions), so that they can fit into the bins. In the example of FIG. 17, there are nine bins, and goods that include multiple parts, such as shoes that sold in a pair, are considered as single items. This type of cart or basket may be referred to as a singulation cart or singulation basket, and it is meant to enable experiences similar to the "fast checkout lane" at supermarkets, in which customers are entitled to access a fast checkout process if they are purchasing fewer than a particular number of items. In a similar way, rules within the retail environment may allow a customer to access a fast checkout line if they agree to use a singulation cart or singulation basket to make their purchases.

In the embodiments shown in FIG. 17, the 3-D scanners 100 are shown as integrated into the singulation cart or basket 8a (e.g., built into the handle of the basket). However, embodiments of the present invention making use of a singulation cart or basket 8a are not limited thereto. For example, in some embodiments, the singulation cart or basket 8a does not include any 3-D scanners and, instead, the 3-D scanners 100 may be located at a checkout station, where the user can place the singulation cart or singulation basket 8a under the 3-D scanner for scanning. As shown in FIG. 17, the shoes 10a, pear 10b, light bulb 10c, and apple 10d are located in different bins of a singulation basket 8a and metadata associated with each of these objects (e.g., name, size, inventory code, and price), as retrieved by the analysis system 300. Because it is assumed that each bin includes, at most, one item, the analysis system 300 assigns, at most, one identity to each bin (e.g., no bin is assigned two different identities, because it is assumed that there is only one object in each bin, and empty bins may be assigned no identity, because empty bins contain no objects).

In a similar manner, singulation bins may also be used in other environments to ensure the correct arrangement of parts. For example, in the case of kitting for manufacturing, the kit may be located on a singulation basket (or singulation tray) that has bins designed to hold the particular components of the particular kit. As such, an object identification system according to embodiments of the present invention can scan the tray containing the components and verify that all of the correct expected components are located on the tray (e.g., no missing components). In some embodiments, defect detection (described in more detail below) may be applied by the analysis system 300 to identify defective or abnormal components of the kit and thereby trigger a notification to a user to replace the improper or anomalous component or to automatically replace the component (e.g., using a robot picking system).

Given the singulated nature of objects in this case, the object identification result can be very accurate (e.g., in the order of 99.99% accuracy, based on experimental tests with a prototype system). The identification results can be computed independently for each bin of the singulation cart or singulation basket 8a, with the object identification methodology presented above, where the results of the identification can stored as a list or of a table, with one identification result for each bin. This list or table is updated regularly or based on events, such as the detection of a new item present in the cart or basket or the positioning of the basket in the checkout station. This detection can be performed by exploiting the visual information acquired by the 3-D scanning system 99 including the 3-D scanners 100, and its results can be presented to the customers on a display device 450 (e.g., a display device 450 located at the checkout register or built into the cart).

Retail Environment Systems

As noted above, in a retail environment, it may be beneficial to associate a particular customer with a particular cart or basket of items using a "check-in" system configured to detect which particular user (e.g., customer) is associated with a particular cart or basket. In some embodiments of the present invention, an identification mechanism is embedded in the cart or basket 8. This operation can be performed by tapping a loyalty card on a cart or basket to pair (e.g., via 13 MHz Near Field Communication (NFC), 900 MHz Radio Frequency Identification (RFID), wireless networking (WiFi) or Bluetooth/Bluetooth Low Energy (BLE)). The same operation can be performed with a phone using an application, for instance via Bluetooth or BLE 4.0 pairing, through the scanning of a code displayed on the cart or basket, or by a biometric identification system configured to perform biometric identification techniques (e.g., fingerprint or face scanning). In some embodiments, the cart or basket may include a beacon for tracking the movement of the user or customer through the store. (In other embodiments, such as in an industrial setting such as in manufacturing or logistics, a particular user or employee may check-in using a "badge," such as a badge worn or carried by an employee, and the check-in system may include a badge reader.)

Associating a customer with a particular cart or basket also associates the customer with the goods contained in the basket. This information may be applied to a variety of purposes, such as automatic payment at checkout (e.g., by charging an account associated with the customer for the items that are in the cart or basket), loyalty program benefits (e.g., offering discounts based on historical purchases), and promotions (e.g., encouraging the purchase of particular goods based on the customer's buying habits, such as offering a coupon on a higher-end cheese than the customer's typical purchase after detecting that the customer has put pizza dough to the cart or basket). Because the scanning of the basket can occur during the customer's movement through the store (e.g., through scanners 100 attached to the basket or cart, deployed overhead, or deployed elsewhere in the store with a view of the baskets), potential promotions can be continually updated and presented to the customer based on their actions.

Moreover, the same information can be used in order to provide prior information to the object identification system in order to improve the identification performance in terms of accuracy or speed. For instance, in the case of goods identification by descriptor computation and nearest neighbor association, it is possible to perform a nearest neighbor search by first considering the goods that are purchased more often than the others and eventually stopping the search if a high level of similarity has been met for one of the considered target goods identity.

Still referring to a retail setting, some aspects of embodiments of the present invention relate to systems and methods for performing check-out of goods at the time of payment.

According to some embodiments of the present invention, the retail checkout operation is performed by recognition and counting of all of the items at bagging time (e.g., when the goods are moved from the basket or cart 8 into a customer's bags or bags to be taken home). These operations can be performed by applying the identification techniques described above. Because recognition and counting are directly used in order to drive a monetary transaction, and because feedback from the user is generally hard to obtain, high recognition and counting accuracy can improve the confidence of customers and businesses in the system. In order to obtain higher levels of accuracy, in some embodiments, the goods to be identified are singulated, either directly by means of a singulation cart or singulation basket 8a or indirectly by exploiting the differential information that can be obtained at bagging or check-out time.

Some embodiments of the present invention relate to the use of a singulation cart or singulation basket 8a as described above. In such embodiments, because the goods are already singulated, they may be scanned directly by a scanning system 99 to identify the objects 10 in the singulation cart or singulation basket 8a.

In some embodiments, the 3D modeling system is directly mounted on the singulation cart or singulation basket 8a, thereby enabling a seamless checkout process. In more detail, the 3-D scanning system 99 can acquire 3-D models, and the analysis agent 300 can compute the identities of the different items in the singulation cart or singulation basket 8*a* at any time during the shopping process.

In various embodiments of the present invention, different approaches may be adopted, such as continuous identification of objects at video rate (e.g., 24 frames per second, 30 frames per second, 60 frames per second, etc.), incremental identification (e.g., only identifying objects for which low-level visual information has been subject to changes), and discrete identification at specific or regular places within the store or at times during the shopping experience (e.g., triggered by passing wireless beacons at particular locations within the store). One particular example is triggering identification at the exit door of the retail store, thereby allowing for seamless checkout that can be triggered by the exiting of the cart or basket from the store. In one embodiment, a monetary transaction is performed when a cart or basket crosses a line in the proximity of the exit door of the retail in order to charge the account that has been associated with the cart during check-in.

In another embodiment of the present invention, the 3-D scanning system 99 (or 3-D scanners 100) is mounted at various locations in the store, and the customer triggers the object identification operation by placing the cart or basket in view of the 3-D scanning system 99 at the particular location. In some embodiments, a wireless transmission from the cart to the 3-D scanning system triggers the identification step by virtue of proximity (measured signal strength or other functions of distance, such as through triangulation using multiple receivers). In other embodiments of the present invention, the 3-D scanning system 99 initiates a scanning process when it detects the presence of a cart in its view (e.g., a change in the scene identify an object that is closer to the overhead 3-D scanning system than the floor).

Embodiments of the present invention may include both stateless and state-ful transaction approaches. In the case of stateless transactions, the transaction is triggered directly after the identification, while in the case of a state-ful transaction, there is a state (in the form of a list or of a table) that contains the identities of the items in the cart or basket 8, as well as the account that has been associated with the cart or basket 8 at check-in, and the final identification of objects and the monetary transaction are performed when the cart crosses a line in the proximity of the exit door of the retail.

Figure 18B:
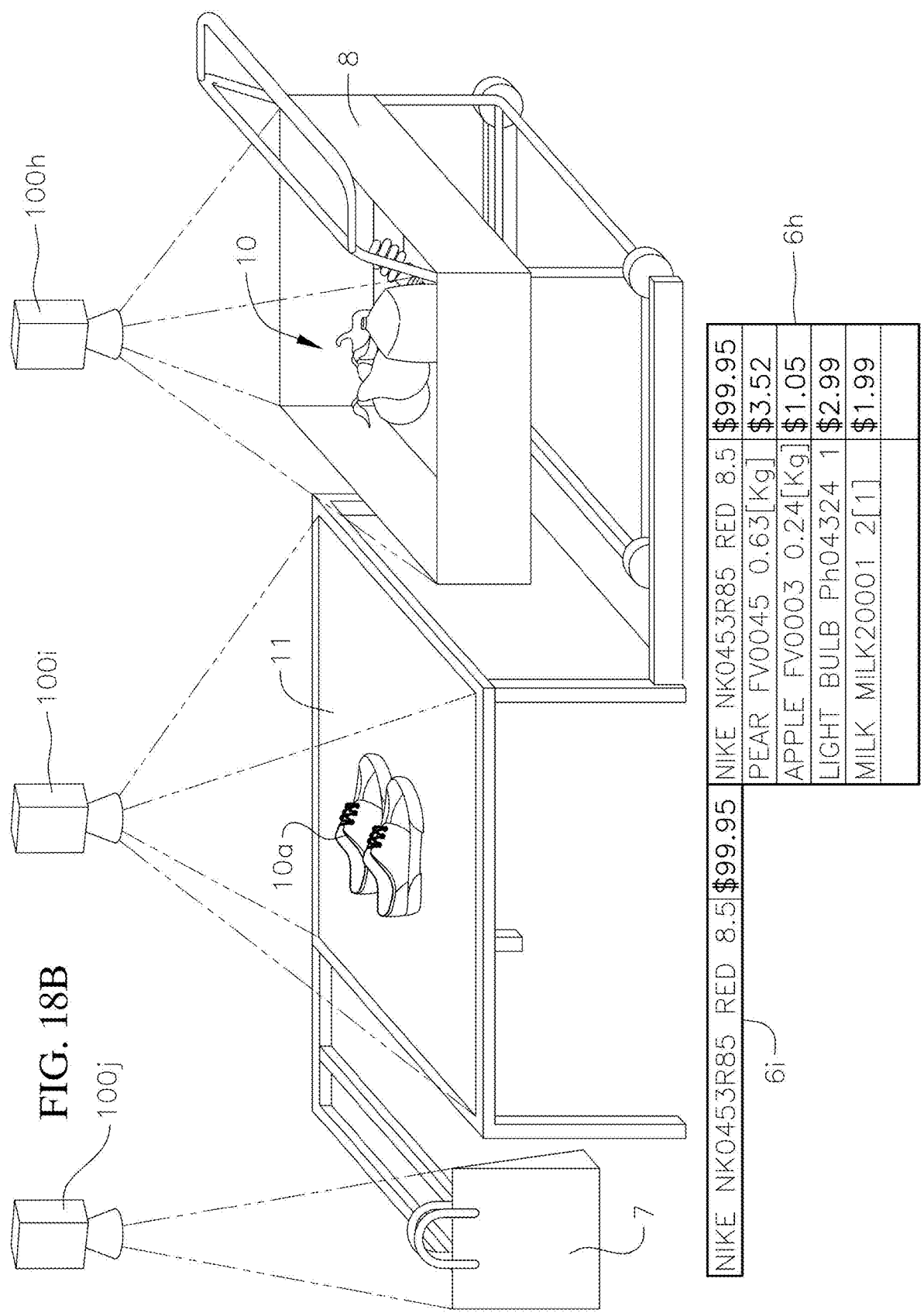
Figure 18C:
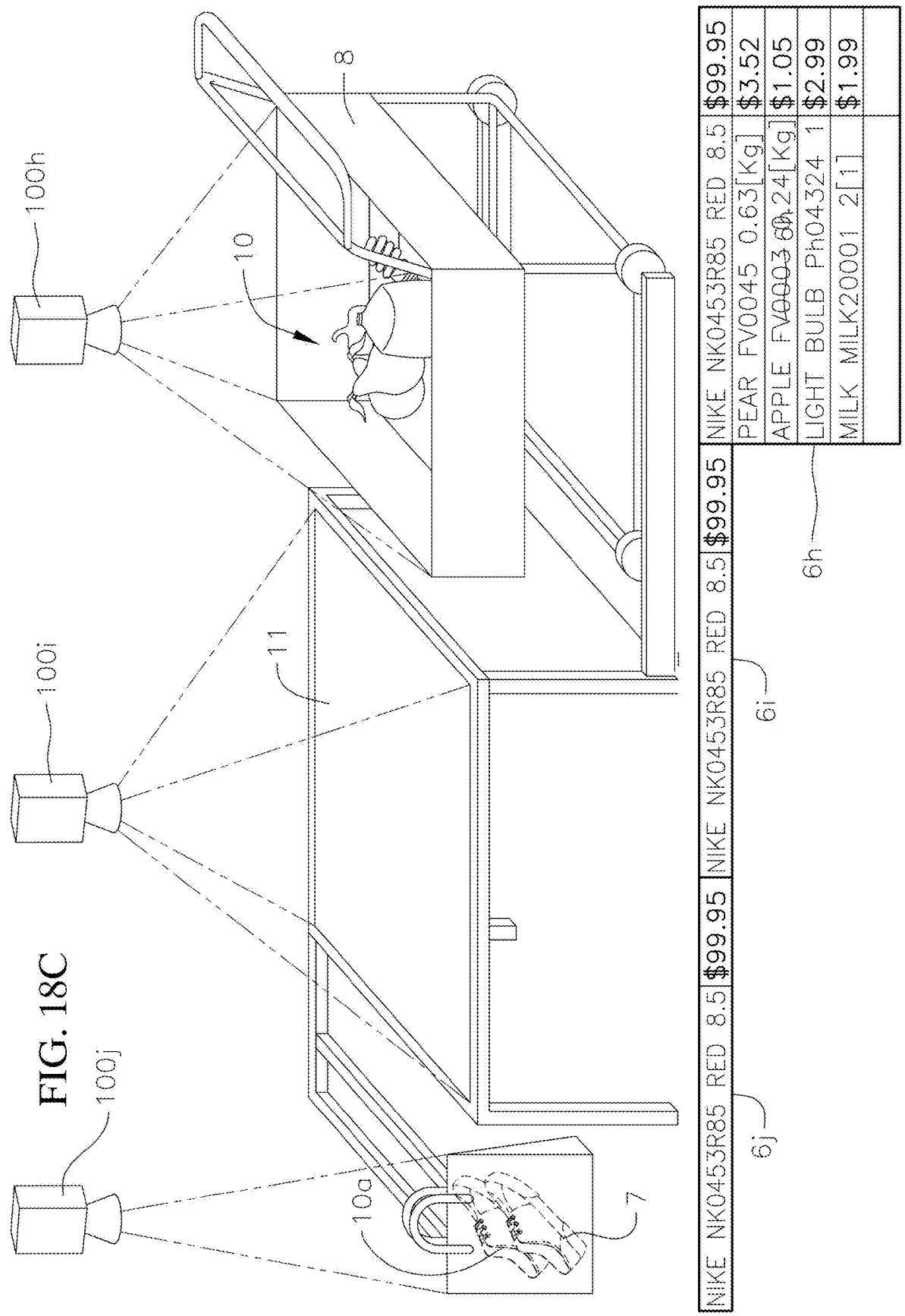

In another embodiment of the present invention, singulation is performed indirectly at checkout time, and the presence of a singulation cart/basket is not required. In this case, the customer brings the cart/basket at specific checkout stations or regions, in which a standard bagging operation is performed. FIGS. 18A, 18B, and 18C depict a checkout system using indirect singulation according to one embodiment of the present invention. As shown in FIG. 18A, in a typical bagging operation, the customer (or a robot) picks the 10 goods from the cart 8 one at the time, places them on a table 11 (or a conveyor belt 12), and then places them in a shopping bag 7. In particular, FIG. 8A shows a first scanner 100*h* configured to scan the contents of the cart 8 (where all of the objects 10 are located in FIG. 18A), a second scanner 100*i* configured to capture scans of objects placed on the table 11, and a third scanner 100*j* configured to capture scans of object placed into the one or more shopping bags 7.

During this checkout and bagging operation it is possible to create a list of goods associated with each one of the three positions: the goods that are currently in the cart 8, the good or item that is on the table 11, and the contents of the shopping bag or bags 7. At each time, each of the lists 6*ih*, 6*i*, and 6*j* contains a list of the items that are (or were most recently present) at each locus, and the joint information is used to track the movement of the items from the cart 8 to the shopping bags 7 (e.g., which items have been purchased by the customer). Referring to FIG. 18B, the shoes 10*a* are moved from the cart 8 onto the table 11 and thus are scanned by the second scanner 100*i* and recognized as a pair of shoes, and thus added to the list 6*i* of items that have been scanned at the table 11. Likewise, when the shoes 10*a* are bagged (placed into shopping bag 7), the are also scanned by the third scanner 100*j* and added to a third list 6*j* of items that have been bagged.

Accordingly, one aspect of embodiments of the present invention relates to identifying and tracking the items that are being selected for purchase by singulating and scanning the objects 10 during a bagging process.

Because the situation in this case is not as constrained as in the case of a singulation cart/basket, the precision of object identification at each of the loci may not be as accurate as otherwise possible. Accordingly, in some embodiments of the present invention, a fusion of their information is considered in order to boost the identification performances. The fusion of information may include, for example, the different views of the object as scanned by the first, second, and third scanners 100*h*, 100*i*, and 100*j*, as well as other sensors (e.g., a scale built in to the table 11 or conveyor belt 12 to weigh the items 10).

In some embodiments of the present invention, in order to obtain the lists of the object identities at each location, the analysis of the captured 3-D model and the identification process may be different for each location. For example, identification agents for cluttered scenarios, such as applying scene segmentation to the captured depth images, may be used to estimate the list associated with the cart or basket based on the scene captured by the first scanner 100*h* and with the images of the bags 7 captured by the third scanner 100*j*, and while identification agents for singulated objects may be used for the images captured by the scanner 100*i* of the table 11 or conveyor belt 12.

The fusion of the lists for the different loci can be performed through cross-checking operations between the contents of the lists in accordance with temporal information, such as verifying the flow of goods from cart 8, across the table 11, to the bag 7.

Some aspects of embodiments of the present invention also relate to superficial goods identification. As noted above, some aspects of embodiments of the present invention may be applied to circumstances that can tolerate lower accuracy than checkout procedures. One example of such an application is the proposal of some marketing offers (e.g., when the system detects that the customer has put marshmallows in a cart, then offer the customer discounted chocolate and/or graham crackers). The consequences of misidentification in this case is not as severe as in the case of checkout, because, in the worst case, either a promotion is not offered or a non-pertinent promotion is offered. In these low accuracy scenarios, it is therefore possible to apply only a single weak classifier, such as an object identifier, in a cluttered scene. One example of a scenario encompasses the identification of the goods in a cluttered cart or basket 8 and only the objects 10 that are visible by on the top surface of the cart are identified and considered, as shown in FIG. 16.

In some embodiments, the 3-D scanning system 99 is mounted on the cart basket 8 or at specific locations in the store ("gates") and the estimated list 6 of goods that have been identified is used to trigger the suggestion of promotions to the customers. These promotions can be offered by showing a notification to the customer, such as on a display 450 installed on the cart or on the smartphone, smartwatch, or head-mounted display of the customer that is associated with the cart (e.g., checked in to the cart). In this scenario, the promotions can be targeted to specific customers by considering both their past and typical shopping behavior and their specific shopping "trajectory" during the current shopping experience, as well as accounting for the state of the store inventory, leading to an increased effectiveness of the suggested promotions.

As noted above, while various aspects of embodiments of the present invention have been described herein in the context of retail applications, embodiments of the present invention are not limited thereto.

For example, in some embodiments of the present invention, the system may be directly applied to the verification of packing lists of items in a warehouse picking process. For example, a customer may place an order with mail order or internet retailer to purchase several items. A warehouse picker (e.g., a human or a robot) may navigate the aisles and shelves of a warehouse to gather the items ordered by the customer in order to fill the order. Accordingly, in some embodiments of the present invention, the scanning systems 99 scan the carts and the objects collected by the pickers to ensure that the picked items match the items on the customer's order. Furthermore, object identification, when executed on a packed box, can be used to verify that the box contains the items ordered by the user (and not other items).

As another example, systems according to embodiments of the present invention may be applied in manufacturing settings, such as the assembly of kits of parts to be assembled into a device or to be added to another structure. For example, in the case of the assembly of a particular electronic device, a "kit" may include a housing, one or more internal logic boards, screws, electrical connectors, a display panel assembly, and the like. When a kit is incomplete or when one or more of the components is abnormal or defective, the user of the kit (e.g., a manufacturing technician) may be unable to complete the assembly process.

The process of gathering the items that make up a kit is sometimes referred to as "kitting," and may involve placing the items into a box or a tray. Accordingly, some embodiments of the present invention relate to scanning a kit to generate a list of items in the kit in order to verify that the kit includes all of the expected components. In some embodiments, defect detection is applied to the 3-D model or 3-D models captured during the scanning process in order to detect whether one or more of the components is defective or abnormal, such that the defective or abnormal component can be replaced. In some embodiments, the container, such as a tray, holding the kit of components is a singulation container in which each component of the kit has a corresponding bin.

In a manufacturing setting, scanning systems may be located at a location when the kitting is performed, such that errors in kitting can be corrected before the kits are transported to the manufacturing technicians. In some embodiments, the verification of the contents is further performed immediately prior to delivery to the manufacturing technician, such that the manufacturing technician does not waste time starting to assemble an incomplete kit or a kit having defective components.

Some aspects of embodiments of the present invention relate to surgical counting in a medical context. During a surgical procedure, various tools and implements such as clamps, needles, sutures, sponges, gauze, catheters, and the like may be inserted into a patient and generally must be removed prior to the end of the surgery (prior to closing the incision) in order to avoid having the items being retained by the patient. Accordingly, a "surgical count" is typically maintained by the surgical staff to track the movement of items in to and out of the patient and to ensure that the number of tools entering the patient equals the number of tools removed from the patient.

Accordingly, some aspects of embodiments of the present invention may be used to assist with a surgical count using one or more overhead scanning systems 99 having views of the operating room, including the operating table, the patient, and trays of unused and used tools. Aspects of embodiments of the present invention may relate to scanning a tray of items to be used during a surgical procedure, tracking the movement of the items in to the patient, and detecting the removal of the items from the patient.

Defect Detection

As discussed above, in some embodiments of the present invention, the analysis system 300 performs defect detection on the scanned objects to detect whether the scanned object has one or more defects or is non-defective (or "clean"). Some techniques for performing defect detection on a 3-D model are described in more detail below, although embodiments of the present invention are not limited thereto. In addition, in some embodiments of the present invention, localization of the defect is less important and may be omitted from the analysis (e.g., merely detecting whether or not a component is defective may be more relevant than detecting the particular nature of the defect).

According to some embodiments of the present invention, metadata associated with an object is retrieved based on the identification of the object (as described above). The metadata may include one or more defect detection models for detecting defects or abnormalities of the model, and the defect detection models may be used to determine whether the scanned object is defective (e.g., "abnormal") or non-defective (e.g., "clean"). Examples of defect detection models will be described in more detail with reference to comparing measurements of the captured 3-D model against expected measurement values, comparing the captured 3-D model to a reference 3-D model of a canonical instance of the object, and supplying the 3-D model to a trained defect detector (e.g., including a convolutional stage of a convolutional neural network and a classifier).

Once an object has been identified in operations 1310 and 1330, the 3-D model analysis module 350 of the analysis agent 300 analyzes the input 3-D model (and, in some instances, its frames), in the context of the retrieved data about the identified class, in order to provide some insights and analysis about the object itself.

Generally, the properties that can be inspected fall into two categories: variables and attributes. The term "variables," as used herein in the context of the analysis of the 3-D model, refers to measurable physical quantities, e.g., the size of the minimum bounding box containing the object itself, the volume occupied by the object, and the size of a shoe, and the like. The term "attributes," as used herein in the context of the analysis of the 3-D model, refers to aspects that are not necessarily numeric values, such as the presence or absence of pronounced wrinkles on a leather component or the presence or absence of stains on fabric components (e.g., in excess of some threshold tolerance). In other words, a variable may be characterized by a specific numeric value, which can be uniquely measured, whereas an attribute may relate to the presence or absence of a characteristic (e.g., a binary value) in accordance with a subjective or qualitative analysis (e.g., two different people may provide different inspection results for an "attribute" or a qualitative characteristic). In some embodiments of the present invention, rather than a binary characteristic, an attribute may take on a plurality of different values, each value corresponding to a different category (e.g., classifying different types of defects in the surface of a shoe as stains, wrinkles, tears, and holes) or values in a range (e.g., the "magnitude" of a surface stain may refer to how much the stain differs from the color of the surrounding material or the magnitude of a wrinkle may refer to its depth).

The measurement of "variables" in a 3-D model can be considered a classical machine vision problem, for which ad-hoc techniques as well as learning-based techniques can be applied in various embodiments of the present invention. In some embodiments of the present invention, measurements of characteristics such as size and volume are also used to characterize and identify the object. For example, in a retail environment such as a grocery store, a bunch of grapes may be automatically identified by the analysis system, but the analysis system may be unable to estimate the weight (or mass) of the grapes. On the other hand, measuring the volume of the bunch of grapes allows for the automatic estimation of the weight of the grapes, assuming that the grapes have a known, approximate density, which may be included in the metadata associated with the grapes. In other embodiments of the present invention, such as where multiple items of a same type (or class) are placed together in the scanning system (e.g., multiple cans of soup or multiple candy bars), the number of items may be automatically counted based on the estimated volume of the group and the known volume of a single instance of the class of items.

On the other hand, in the case of "attributes," some embodiments of the present invention apply a regression-based learning approaches to train models for automatically evaluating and assigning attributes to an object based on its model. In some such embodiments, a multitude of evaluations provided by subject matter experts may be used to develop a set of training data. One example of the evaluation of an attribute relates to detecting unacceptable wrinkles on leather shoes. In this case, various sets of shoes that present different types of wrinkles are presented to a set of human experts (e.g., trained inspectors for the particular manufacturing line where the analysis agent 300 will be used), and the human experts evaluate each single shoe to determine whether the wrinkling is acceptable or not. An average acceptability value can be computed based on the percentage of the experts that evaluated the degree of wrinkling to be acceptable, and the acceptability values for each shoe is taken as a label of whether or not such a shoe has unacceptable wrinkles. These labels can be associated with the scanned 3-D models of their corresponding shoes to generate a set of labeled training data, which can then be used to train an AI system based on, for example, a set of Convolutional Neural Networks in order to learn the aggregate shoe inspection knowledge of the human experts.

Variables and attributes of objects are generally also associated with a particular "location" on the object. For example, a length, a width, and a height of a shoe may corresponds to particular directions along the shoe (e.g., the length is along the direction from the heel to the toe, the width is along the direction perpendicular to the length and parallel to the sole of the shoe, and the height is perpendicular to both the length and the width). In addition, the locations of particular features of a shoe, such as the eyelets, logos or other designs on the surface of the shoe may be located at particular coordinates within the coordinate system of the shoe.

Similarly, a defect may be located in a specific location on the boundary or surface of an object. For example, wrinkles or stains may be located a substantially arbitrary portions of a shoe (e.g., a defect in the underlying leather can cause the defect to appear at any part of the shoe that is made of leather) and, therefore, in some embodiments of the present invention, the inference of defects is performed for a set of locations on the object, e.g., specific sets of points in or patches of the 3-D model of the objects to be inspected.

Figure 19:
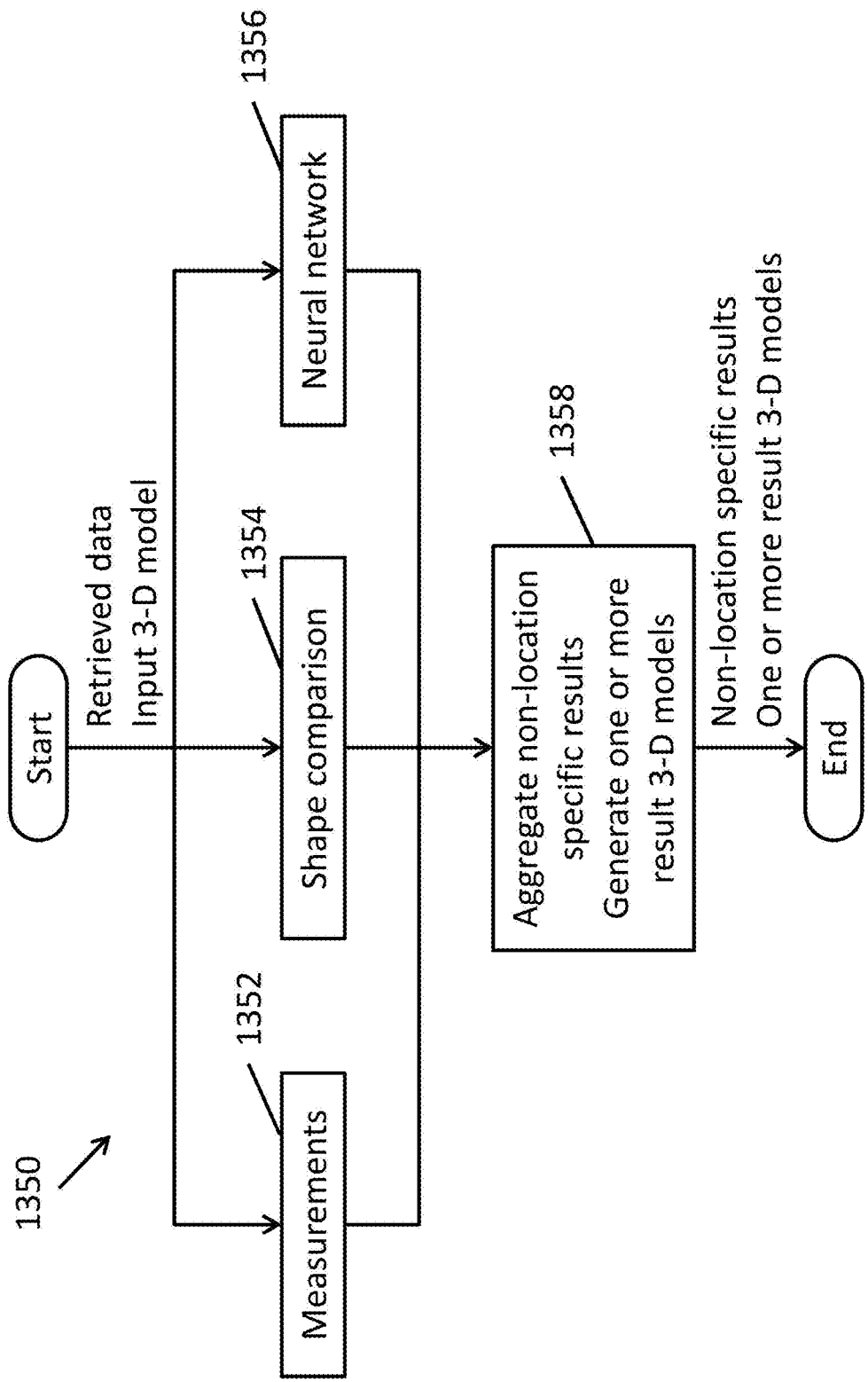
FIG. 19 is a flowchart of a method for detecting defects based on descriptors of locations of features of a target object according to one embodiment of the present invention.

FIG. 19 is a flowchart of a method for detecting defects based on descriptors of locations of features of a target object according to one embodiment of the present invention. In the embodiment shown in FIG. 19, three different types of analyses are performed on an input 3-D model of the object based on retrieved data. These operations may be performed as a component of analysis of the object in operation 1350 described above with respect to FIG. 9. These analyses include: measurements in operation 1352; shape comparison in operation 1354; and a neural network analysis in operation 1356. In some embodiments of the present invention, these analyses are performed in parallel. In operation 1358, the results of these analyses are aggregated, and location specific aspects of these analyses may be used to generate one or more result 3-D models for displaying the results of the analyses, as described in more detail below.

The measurement analyses of operation 1352 may include various physical measurements of variables and attributes of the object. As noted above, these measurements can be considered a classical machine vision problem, for which ad-hoc and explicit techniques as well as learning-based techniques can be applied in various embodiments of the present invention. For example, expected measurement values may be retrieved from the database and compared against measurements taken of the scanned 3-D model in accordance with predefined rules. One example of an operation that is performed in one embodiment of the present invention is the computation of a minimum bounding box containing the object and its comparison with the expected size/shape of the identified object (see the example shown in FIGS. 5A and 5B, where the minimum bounding box is used to measure the length, width, and height of a shoe and the values are compared to the expected values retrieved from the database). For example, a minimum bounding box for a three-dimensional model can be computed using the "rotating calipers" method that is known in the art. When the measured value differs from the expected value (e.g., by more than a threshold amount), then a defect is detected. As another example, the locations of particular portions of an object may be compared against expected locations of the object (e.g., the widest part of the shoe may be expected to be located at a particular fraction of the distance along the length of the shoe, where the particular fraction may be independent of the size of the shoe). As another example, the predefined rules may include one or more explicitly defined detectors (e.g., a trained convolutional neural network) configured to detect the presence of a particular shape in an image. Examples of particular shapes that can be detected with such detectors include wrinkles in a surface of a cloth such as leather and the presence of knots in a piece of wood. As a particular example, in the case of the wrinkles on a chair (or the stiches or a logo on a shoe), a trained classifier (e.g., a convolutional neural network) is trained to identify all the points in an acquired image (e.g., given an input image or an input 3-D model) that present that particular feature (e.g., wrinkles in a surface material). The classifier may also be used in conjunction with another stage that implements the predefined rules, such as a threshold (e.g., maximum) number of allowed wrinkles in a region, a maximum width of stitches in shoes, and a maximum area of a logo, in order to classify if the feature is within specification or not.

One example of defect detection according to some embodiments of the present invention is, in operation 1354, the comparison of the shape of the captured input 3-D model with respect to a canonical model of the identified object in order to detect abnormalities by finding differences between the surface of the captured input model and the canonical model. (This technique may be particularly applicable in the case of objects that have a rigid structure.) The locations and magnitudes of differences between the canonical model and the scanned input model can then be recorded on a result 3-D model, where the magnitude of the difference (e.g., the extent to which the shape or color at a location on the captured input 3-D model differs from the canonical 3-D model) can represent the magnitude of the defect.

Another example of defect detection according to some embodiments of the present invention relates to "tessellation" techniques. In some such embodiments, a set of 2-D renderings of local portions of the surface of the 3-D model is generated with rendering techniques exploiting color, geometry, or surface normals information. Each of the generated renderings, generally called patches, is compared against a set of known patches, which generally include a range of defective samples. This comparison can be done directly, by computing a descriptor for instance with a CNN and by applying a neural network classifier or indirectly, i.e., by training a CNN architecture to regress the presence of defect, either in a binary or in a continuous form.

According to some embodiments of the present invention, the defect detection relates to detecting "abnormal" or "outlier" instances of the objects from among the collection of objects. In more detail, in some embodiments of the present invention, a group of 3-D scans of a representative sample of objects (instances) of the same class is collected. For the sake of convenience, it will be assumed that each of these instances is substantially identical in the idea case (e.g., they are all shoes of the model and have the same size) but that the actual instances vary in size and shape due, for example, to variability in the materials, variability in the consistency of the tools used to shape the materials, differences in skill of humans working on the assembly line. and other variability in the processes for manufacturing the objects. Accordingly, under the assumption that the defect rate is relatively low (e.g., that most instances fall within a particular range), an "average" model can be computed from all of the "training" 3-D models of the representative sample of objects. For example, in one embodiment, the 3-D models of the representative samples are aligned (e.g., using iterative closest point). The aligned 3-D models can then be averaged. For example, for each point $p_1$ on a first model, a closest point $p_2$ of a second model is identified (e.g., by computing the distances to all points of the second model within a ball around point $p_1$). The first point $p_1$ and the second point $p_2$ will be referred to herein as "corresponding" points of the 3-D models. All of the corresponding points across all of the training 3-D models may be identified and, for each set of corresponding points, an average (e.g., a mean) is computed and the collection of average points may constitute the "average" 3-D model.

In some embodiments, outlier objects are removed from the training 3-D models. and differences between the models are calculated by summing the distances between the closest points between two different models. The "distances" include distance in three-dimensional space (e.g., for a point $p_1$ on a first model, the distance between point $p_1$ and a closest point $p_2$ of a second model), as well as the distance in color space (e.g., the distance between the color $p_1(R, G, B)$ of the first point $p_1$ and the color $p_2(R, G, B)$ of the second point $p_2$). Models having larger differences larger than a threshold (e.g., two standard deviations from the mean of the sample) may be referred to as "outlier" or "abnormal" instances. In some embodiments, the mean of the sample is used as the reference model.

In some embodiments of the present invention, generative models (such as Generative Adversarial Networks or GANs) may be used to detect abnormal objects. Generally, a generative model includes two components: a generator, which learns to generate objects from a training set (e.g., training input visual data such as training 3-D models), and a discriminator, which learns to distinguish between the generated samples and the actual samples in the training set. The two components are trained in an adversarial way—the generator tries to fool the discriminator and the discriminator tries to catch the samples from the generator. If the generative model is trained using only "normal" objects (e.g., if the training set contains only "normal" objects) and the trained generative model is given an unknown sample (e.g., input visual data such as an input 3-D model) as input to determine or predict whether the unknown sample is normal (e.g., non-defective) or abnormal (e.g., defective), then the trained generative model transforms the supplied input to generate a transformed output (e.g., output visual data such as an output 3-D model). Accordingly, the unknown input can be predicted as normal or abnormal by calculating a difference between the unknown sample and the transformed output (e.g., determining whether the difference satisfies a threshold). In some embodiments of the present invention, if there are sufficient abnormal (or defective) samples available for use in training, similar generative models are trained with both normal (e.g., non-defective) and abnormal (e.g., defective) these generative models can be used to classify the input objects in a manner similar to that described above for a generative model trained on a training set containing only "normal" objects. Furthermore, in some embodiments, generative models can be used to produce intermediate representations that can be used to classify "normal" versus "abnormal" samples. See, e.g., Goodfellow, Ian, et al. "Generative adversarial nets." *Advances in neural information processing systems.* 2014 and Hirose, Noriaki, et al. "GONet: A Semi-Supervised Deep Learning Approach For Traversability Estimation." arXiv preprint arXiv:1803.03254 (2018).

Figure 20:
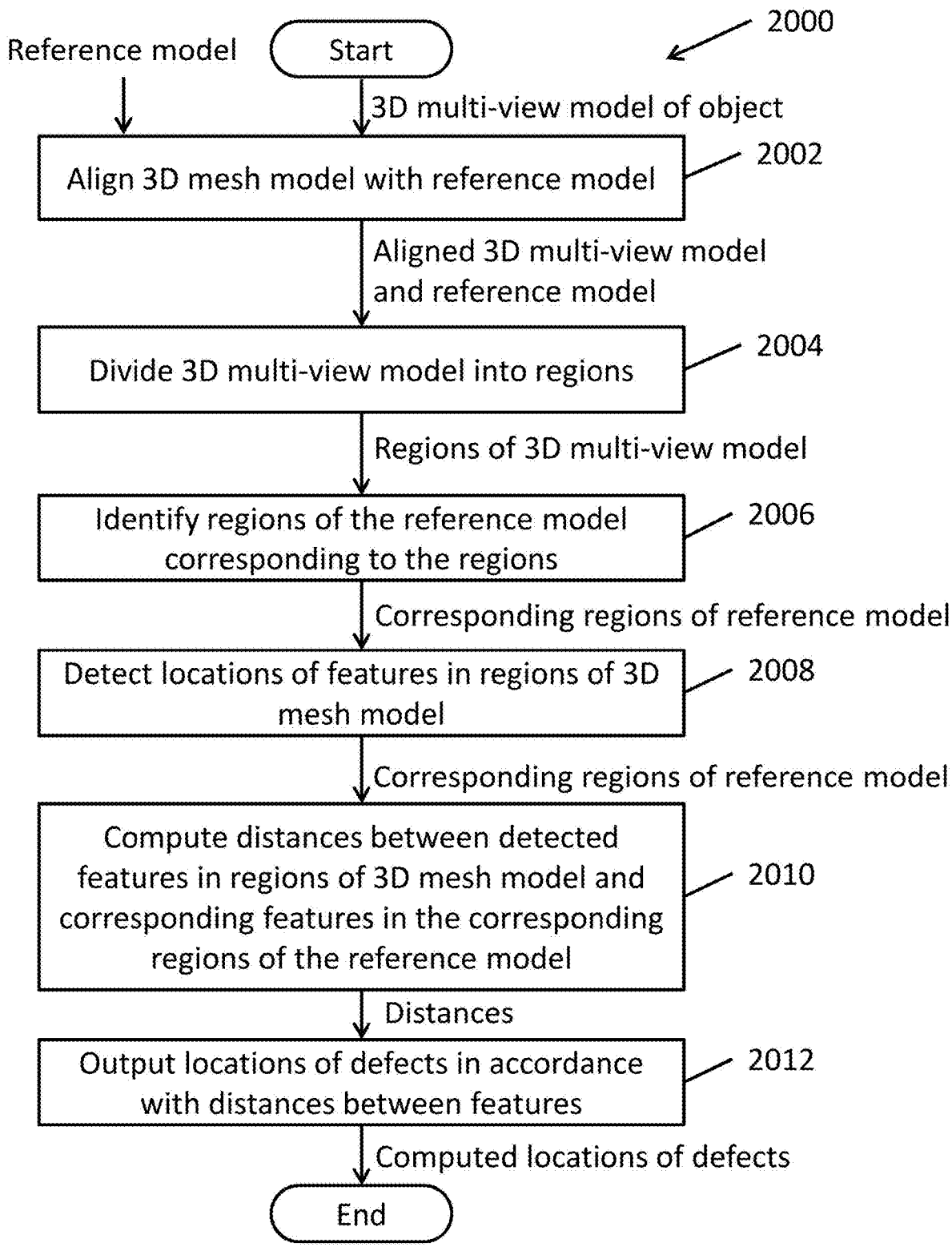
FIG. 20 is a flowchart of a method for performing defect detection according to one embodiment of the present invention.

FIG. 20 is a flowchart of a method 2000 for performing defect detection according to one embodiment of the present invention. In operation 2002, the 3-D model analysis module 350 aligns the input scanned 3-D multi-view model and a retrieved reference model (a reference 3-D model representing a canonical instance of the class of objects). In cases where the 3-D multi-view model is a 3-D mesh model or a 3-D point cloud, a technique such as iterative closest point (ICP) can be used to perform the alignment. Techniques for aligning models are also described in U.S. patent application Ser. No. 15/630,715 "Systems and methods for scanning three-dimensional objects," filed in the United States Patent and Trademark Office on Jun. 22, 2017, the entire disclosure of which is incorporated herein by reference. In embodiments where the 3-D multi-view model is a collection of 2-D images, the alignment may include identifying one or more poses with respect to the reference model that correspond to the views of the object depicted in the 2-D images based on matching shapes depicted in the 2-D images with shapes of the reference model and based on the relative poses of the cameras with respect to the object when the 2-D images were captured.

In operation 2004, the 3-D model analysis module 350 divides the 3-D multi-view model (e.g., the surface of the 3-D multi-view model) into regions. For example, in the case of a shoe, each region may correspond to a particular section of interest of the shoe, such as a region around a manufacturer's logo on the side of the shoe, a region encompassing the stitching along a seam at the heel of the shoe, and a region encompassing the instep of the shoe. In some embodiments, all of the regions, combined, encompass the entire visible surface of the model, but embodiments of the present invention are not limited thereto and the regions may correspond to regions of interest making up less than the entire shoe. As another example, in the case of a housing for an electronic device, the individual regions may correspond to holes and gaps in the housing to expose buttons or controls or for screws to pass through, undesired holes or blemishes on the surfaces of the housing, and abnormal burrs on the edges of the housing. As still another example, in the case of electronic connectors, the defects may relate to the size and shape of the connector, in order to ensure that the connector will correctly fit into the space allocated for it in the electronic device.

As more specific examples, in embodiments where the 3-D multi-view model is a 3-D mesh model, the region may be a portion of the surface of the 3-D mesh model (e.g., a subset of adjacent triangles from among all of the triangles of the 3-D mesh model). In embodiments where the 3-D multi-view model is a point cloud, the region may be a collection of adjacent points. In embodiments where the 3-D multi-view model is a collection of 2-D images, the region may correspond to the portions of each of the separate 2-D images that depict the particular region of the object (noting that the region generally will not appear in all of the 2-D images, and instead will only appear in a subset of the 2-D images).

In operation 2006, the 3-D model analysis module 350 identifies corresponding regions of the reference model. These regions may be pre-identified (e.g., stored with the reference model), in which case the identifying the corresponding regions in operation 2006 may include accessing the regions. In some embodiments, corresponding regions of the reference model are regions that have substantially similar features as their corresponding regions of the scanned 3-D multi-view model. The features may include particular color, texture, and shape detected in the scanned 3-D multi-view model. For example, a region may correspond to the toe box of a shoe, or a location at which a handle of a handbag is attached to the rest of the handbag. In some embodiments, one or more features of the region of the scanned 3-D multi-view model and the region of the reference model may have substantially the same locations (e.g., range of coordinates) within their corresponding regions. For example, the region containing the toe box of the shoe may include the eyelets of the laces closest to the shoe on one side of the region, the tip of the shoe on the other side of the region.

In embodiments of the present invention where the 3-D multi-view model is a 3-D mesh model and in embodiments of the present invention where the 3-D multi-view model is a point cloud, the region may be, respectively, a collection of adjacent triangles or a collection of adjacent points. In embodiments of the present invention where the 3-D multi-view model is a collection of 2-D images and where the reference model is a 3-D model, the corresponding regions of the reference model may be identified by rendering 2-D views of the reference model from the same relative poses as those of the camera(s) when capturing the 2-D images of the object to generate the 3-D multi-view model.

In operation 2008, the 3-D model analysis module 350 detects locations of features in the regions of the regions of the 3-D multi-view model. The features may be pre-defined by the operator as items of interest within the shape data (e.g., three dimensional coordinates) and texture data (e.g., surface color information) of the 3-D multi-view model and the reference model. In various embodiments, aspects of the features may relate to geometric shape, geometric dimensions and sizes, surface texture and color. One example of a feature is a logo on the side of a shoe. The logo may have a particular size, geometric shape, surface texture, and color (e.g., the logo may be a red cloth patch of a particular shape that is stitched onto the side of the shoe upper during manufacturing). The region containing the logo may be a defined by a portion of the shoe upper bounded above by the eyelets, below by the sole, and to the left and right by the toe box and heel of the shoe. The 3-D model analysis module 350 may detect the location of the logo within the region (e.g., a bounding box containing the logo and/or coordinates of the particular parts of the logo, such as points, corners, patterns of colors, or combinations of shapes such as alphabetic letters). Another example of a feature may relate to the shape of stitches between two pieces of cloth. In such a case, the features may be the locations of the stitches (e.g., the locations of the thread on the cloth within the region). Still another feature may be an undesired feature such as a cut, blemish, or scuff mark on the surface. According to one embodiment of the present invention, the features are detected using a convolutional neural network (CNN) that is trained to detect a particular set of features that are expected to be encountered in the context of the product (e.g., logos, blemishes, stitching, shapes of various parts of the object, and the like), which may slide a detection window across the region to classify various portions of the region as containing one or more features.

In operation 2010, the 3-D model analysis module 350 computes distances (or "difference metrics") between detected features in regions of 3-D multi-view model and corresponding features in the corresponding regions of the reference model. Referring back to the example of the location of a logo (as a feature of interest) on the side of the shoe, the location of the feature (e.g., the corners of the bounding box) in the region of the 3-D multi-view model is compared with the location of the feature (e.g., the corners of its bounding box) in the corresponding region of the reference model and a distance is computed in accordance with the locations of those features (e.g., as an L1 or Manhattan distance or as a mean squared error between the coordinates). As such, the defects can be detected and characterized in the extent or magnitude of the differences in geometric shape, geometric dimensions and sizes, surface texture and color from a known good (or "reference" sample) or other based on similarity to known defective samples. These features may correspond to different types or classes of defects, such as defects of blemished surfaces, defects of missing parts, defects of uneven stitching, and the like.

The defect detection may be made on a region-by-region basis of the scanned multi-view model and the reference model. For example, when comparing a scanned multi-view model of a shoe with a reference model of the shoe, the comparison may show the distance between the reference position of a logo on the side of the shoe with the actual position of the logo in the scanned model. As another example, the comparison may show the distance between the correct position of an eyelet of the shoe and the actual position of the eyelet.

In some instances, features may be missing entirely from the scanned model, such as if the logo was not applied to the shoe upper during manufacturing. Similarly, features may be detected in the regions of the scanned model that do not exist in the reference model, such as if the logo is applied to a region that should not contain the logo, or if there is a blemish in the region (e.g., scuff marks and other damage to the material). In these cases, in one embodiment, a large distance or difference metric is returned as the computed distance (e.g., a particular, large fixed value) to in order to indicate the complete absence of a feature that is present in the reference model 29 or presence of a feature that is absent from the reference model.

If the differences between the scanned model and the reference model exceed a threshold value, then the quality control system may flag the scanned object as falling outside of the quality control standards in operation 2012. For example, if the location of the logo deviates from the location of the logo in the reference model by more than the threshold distance (where the threshold distance corresponds to an acceptable tolerance level set by the manufacturer). For example, the output of the system may include an indication of the region or regions of the scanned 3-D multi-view model containing detected defects. In addition, the particular portions of the regions representing the detected defect may also be indicated as defective (rather than the entire region). In some embodiments, a defectiveness metric is also output, rather than merely a binary "defective" or "clean" indication. The defectiveness metric may be based on the computed distances, where a larger distance indicates a larger value in the defectiveness metric.

In more detail, in some embodiments of the present invention, a CNN may be trained to detect various types of defects, where the training set includes 3-D models of the objects where defects are to be detected (or various regions of the objects). In some embodiments of the present invention, the 3-D model is supplied as input to the CNN. In other embodiments of the present invention, 2-D renderings of the 3-D multi-view model from various angles are supplied as input to the CNN (e.g., renderings from sufficient angles to encompass the entire surface area of interest). (In embodiments where the 3-D multi-view model includes a plurality of 2-D images, the "2-D renderings" may merely be one or more of those 2-D images.) In still other embodiments of the present invention, the separate regions of the models (e.g., as described above with respect to FIG. 20 and operations 2004 and 2006) are supplied as the inputs to the CNN. The training set includes examples of clean (e.g., defect free objects) as well as examples of defective objects with labels of the types of defects present in those examples.

In some embodiments, the training set is generated by performing 3-D scans of actual defective and clean objects. In some embodiments, the training set also includes input data that is synthesized by modifying the 3-D scans of the actual defective and clean objects and/or by modifying a reference model. These modifications may include introducing blemishes and defects similar to what would be observed in practice. As a specific example, one of the scanned actual defective objects may be a shoe that is missing a grommet in one of its eyelets. However, in practice, any of the eyelets may be missing a grommet, and there may be multiple missing grommets. As such, additional training examples can be generated, where these training examples include every combination of the eyelets having a missing grommet.

Generally, the process of training a neural network also includes validating the trained neural network by supplying a validation set of inputs to the neural network and measuring the error rate of the trained neural network on the validation set. In some embodiments, if the validation error rate and a training error rate (e.g., the error rate of the neural network when given the training set as input) fail to satisfy a threshold, the system may generate additional training data different from the existing training examples using the techniques of modifying the 3-D models of the training data to introduce additional defects of different types. A final test set of data may be used to measure the performance of the trained neural network.

During operation, the trained CNN may be applied to extract a feature vector from a scan of an object under inspection. The feature vector may include color, texture, and shape detected in the scan of the object. The classifier may assign a classification to the object, where the classifications may include being defect-free (or "clean") or having one or more defects. Some examples of techniques for extracting feature vectors from 3-D models are described in "Systems and methods for automatically generating metadata for media documents," U.S. patent application Ser. No. 15/675,684, filed in the United States Patent and Trademark Office on Aug. 11, 2017, the entire disclosure of which is incorporate by reference herein.

As such, in some embodiments, a neural network is used in place of computing distances or a difference metric between the scanned 3-D multi-view model and the reference model by instead supplying the scanned 3-D multi-view model (or rendered 2-D views thereof or regions thereof) to the trained convolutional neural network, which outputs the locations of defects in the scanned 3-D multi-view model, as well as a classification of each defect as a particular type of defect from a plurality of different types of defects.

In some embodiments of the present invention, defects are detected using an anomaly detection or outlier detection algorithm. For example, the features in a feature vector of each of the objects may fall within a particular previously observed distribution (e.g., a Gaussian distribution). As such, while most features will have values within a particular range (e.g., a typical range), some objects will have features having values at the extremities of the distribution. In an anomaly detection system, objects having features of their feature vectors with values in the outlier portions of the distribution are detected as having defects in those particular features.

In some embodiments methods similar to multi-dimensional scaling (MDS) are used. Multi-dimensional scaling is a form of non-linear dimensionality reduction, and, in some embodiments, all or a portion of the 3-D surface of the scanned model of the object is converted (e.g., mapped) onto a two-dimensional (2-D) representation. In this mapping, the geodesic distances among the 3-D surface points (that may include surface defects) are substantially maintained in the 2-D representation. Representing all, or a portion, of the 3-D surface using a 2-D encoding allows the use of conventional convolutional neural network (CNN) techniques that are designed to be performed on 2-D images. Because the 2-D representation substantially maintains the 3-D distances between the points, the defects that are categorized by actual real-world sizes can also be detected.

As noted above, aspects of embodiments of the present invention include two general categories of defects that may occur in manufactured objects. The first category of defects or "attributes" includes defects that can be detected by analyzing the appearance of the surface, without metric (e.g., numeric) specifications. More precisely, these defects are such that they can be directly detected on the basis of a learned descriptor vector. These may include, for example: the presence of wrinkles, puckers, bumps or dents on a surface that is expected to be flat; two joining parts that are out of alignment; the presence of a gap where two surfaces are supposed to be touching each other. These defects can be reliably detected by a system trained (e.g., a trained neural network) with enough examples of defective and non-defective units.

The second category of defects or "variables" includes defects that are defined based on a specific measurement of a characteristic of the object or of its surfaces, such as the maximum width of a zipper line, the maximum number of wrinkles in a portion of the surface, or the length or width tolerance for a part.

In various embodiments of the present invention, these two categories are addressed using different technological approaches, as discussed in more detail below. It should be clear that the boundary between these two categories is not well defined, and some types of defects can be detected by both systems (and thus could be detected with either one of the systems described in the following).

Figure 21:
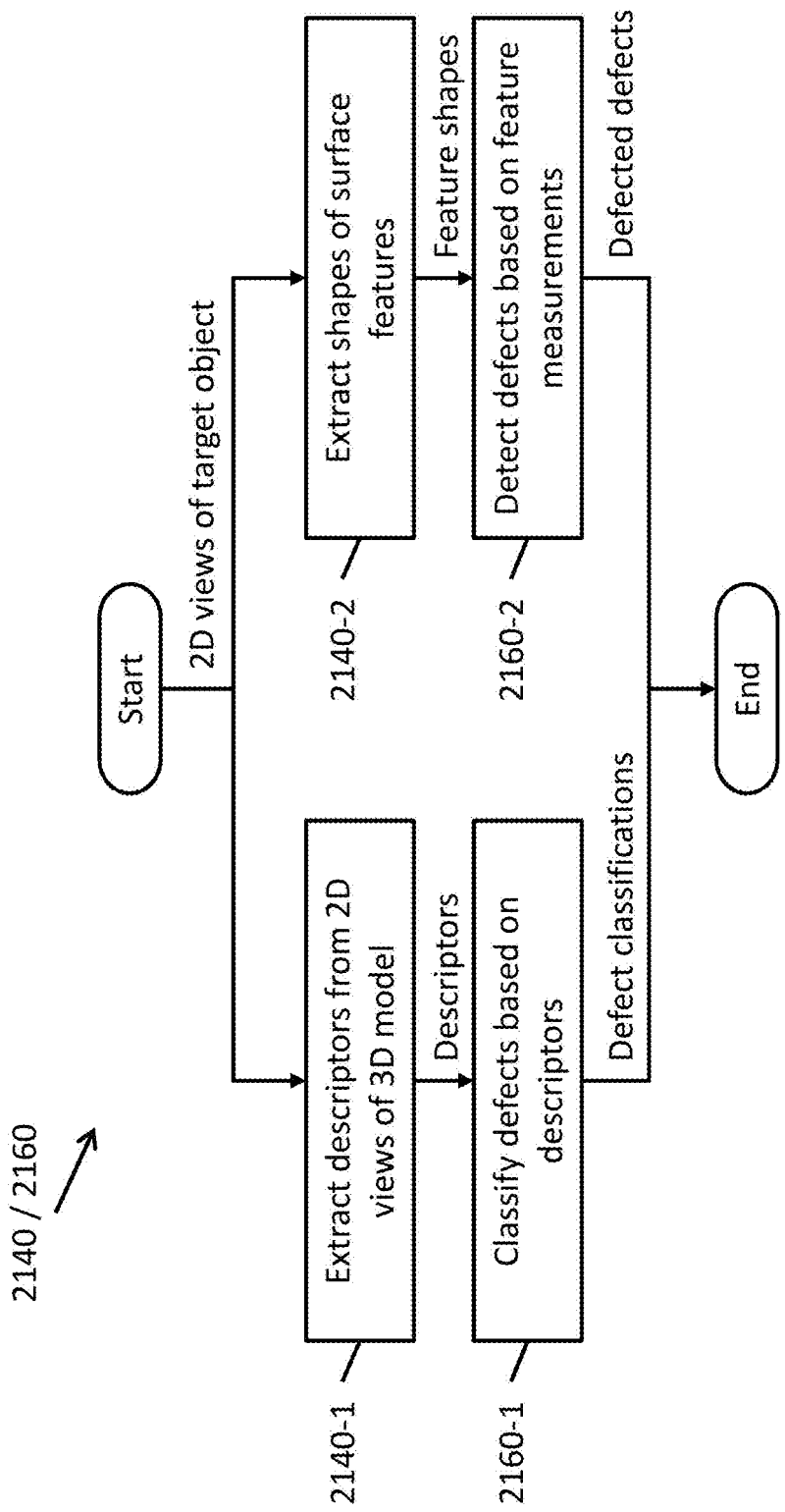
FIG. 21 is a flowchart illustrating a descriptor extraction stage and a defect detection stage according to one embodiment of the present invention.

Accordingly, FIG. 21 is a flowchart illustrating a descriptor extraction stage 2140 and a defect detection stage 2160 according to one embodiment of the present invention. In particular, the 2-D views of the target object that were generated by the 3-D model generator 200 and the view generation module 312 can be supplied to detect defects using the first category techniques of extracting descriptors from the 2-D views of the 3-D model in operation 2140-1 and classifying defects based on the descriptors in operation 2160-1 or using the second category techniques of extracting the shapes of regions corresponding to surface features in operation 2140-2 and detecting defects based on measurements of the shapes of the features in operation 2160-2.

Category 1 Defect Detection

Defects in category 1 can be detected using a trained classifier that takes in as input the 2-D views of the 3-D model of a surface or of a surface part, and produces a binary output indicating the presence of a defect. In some embodiments of the present invention, the classifier produces a vector of numbers, where each number corresponds to a different possible defect class and the number represents, for example, the posterior probability distribution that the input data contains an instance of the corresponding defect class. In some embodiments, this classifier is implemented as the cascade of a convolutional network (e.g., a network of convolutional layers) and of a fully connected network, applied to a multi-view representation of the surface. Note that this is just one possible implementation; other types of statistical classifiers could be employed for this task.

A convolutional neural network having substantially similar architecture to that shown in FIG. 11 may be used according to one embodiment of the present invention. According to some embodiments of the present invention, a convolutional neural network (CNN) is used to process the synthesized 2-D views 16 (see FIG. 7) to generate the defect classification of the object. Generally, a deep CNN processes an image by passing the input image data (e.g., a synthesized 2-D view) through a cascade of layers. These layers can be grouped into multiple stages. The deep convolutional neural network shown in FIG. 11 includes two stages, a first stage $CNN_1$ made up of N layers (or sub-processes) and a second stage $CNN_2$ made up of M layers. In one embodiment, each of the N layers of the first stage CNN1 includes a bank of linear convolution layers, followed by a point non-linearity layer and a non-linear data reduction layer. In contrast, each of the M layers of the second stage $CNN_2$ is a fully connected layer. The output p of the second stage is a class-assignment probability distribution. For example, if the CNN is trained to assign input images to one of k different classes, then the output of the second stage $CNN_2$ is an output vector p that includes k different values, each value representing the probability (or "confidence") that the input image should be assigned the corresponding defect class (e.g., containing a tear, a wrinkle, discoloration or marring of fabric, missing component, etc.).

The computational module that produces a descriptor vector from a 3-D surface is characterized by a number of parameters. In this case, the parameters may include the number of layers in the first stage $CNN_1$ and the second stage $CNN_2$, the coefficients of the filters, etc. Proper parameter assignment helps to produce a descriptor vector that can effectively characterize the relevant and discriminative features enabling accurate defect detection. A machine learning system such as a CNN "learns" some of these parameters from the analysis of properly labeled input "training" data.

The parameters of the system are typically learned by processing a large number of input data vectors, where the real ("ground truth") class label of each input data vector is known. For example, the system could be presented with a number of 3-D scans of non-defective items, as well as of defective items. The system could also be informed of which 3-D scan corresponds to a defective or non-defective item, and possibly of the defect type. Optionally, the system could be provided with the location of a defect. For example, given a 3-D point cloud representation of the object surface, the points corresponding to a defective area can be marked with an appropriate label. The supplied 3-D training data may be processed by the shape to appearance converter 250 to generate 2-D views (in some embodiments, with depth channels) to be supplied as input to train one or more convolutional neural networks 310.

Training a classifier generally involves the use of enough labeled training data for all considered classes. For example, the training set for training a defect detection system according to some embodiments of the present invention contains a large number of non-defective items as well as a large number of defective items for each one of the considered defect classes. If too few samples are presented to the system, the classifier may learn the appearance of the specific samples, but might not correctly generalize to samples that look different from the training samples (a phenomenon called "overfitting"). In other words, during training, the classifier needs to observe enough samples for it to form an internal model of the general appearance of all samples in each class, rather than just the specific appearance of the samples used for training.

The parameters of the neural network (e.g., the weights of the connections between the layers) can be learned from the training data using standard processes for training neural network such as backpropagation and gradient descent (see, e.g., LeCun, Y., & Bengio, Y. (1995). Convolutional networks for images, speech, and time series. The handbook of brain theory and neural networks, 3361(10), 1995.). In addition, the training process may be initialized using parameters from a pre-trained general-purpose image classification neural network (see, e.g., Chatfield, K., Simonyan, K., Vedaldi, A., & Zisserman, A. (2014). Return of the devil in the details: Delving deep into convolutional nets. arXiv preprint arXiv:1405.3531.).

In order to train the system, one also needs to define a "cost" function that assigns, for each input training data vector, a number that depends on the output produced by the system and the "ground truth" class label of the input data vector. The cost function should penalize incorrect results produced by the system. Appropriate techniques (e.g., stochastic gradient descent) can be used to optimize the parameters of the network over the whole training data set, by minimizing a cumulative value encompassing all individual costs. Note that changing the cost function results in a different set of network parameters.

Figure 22:
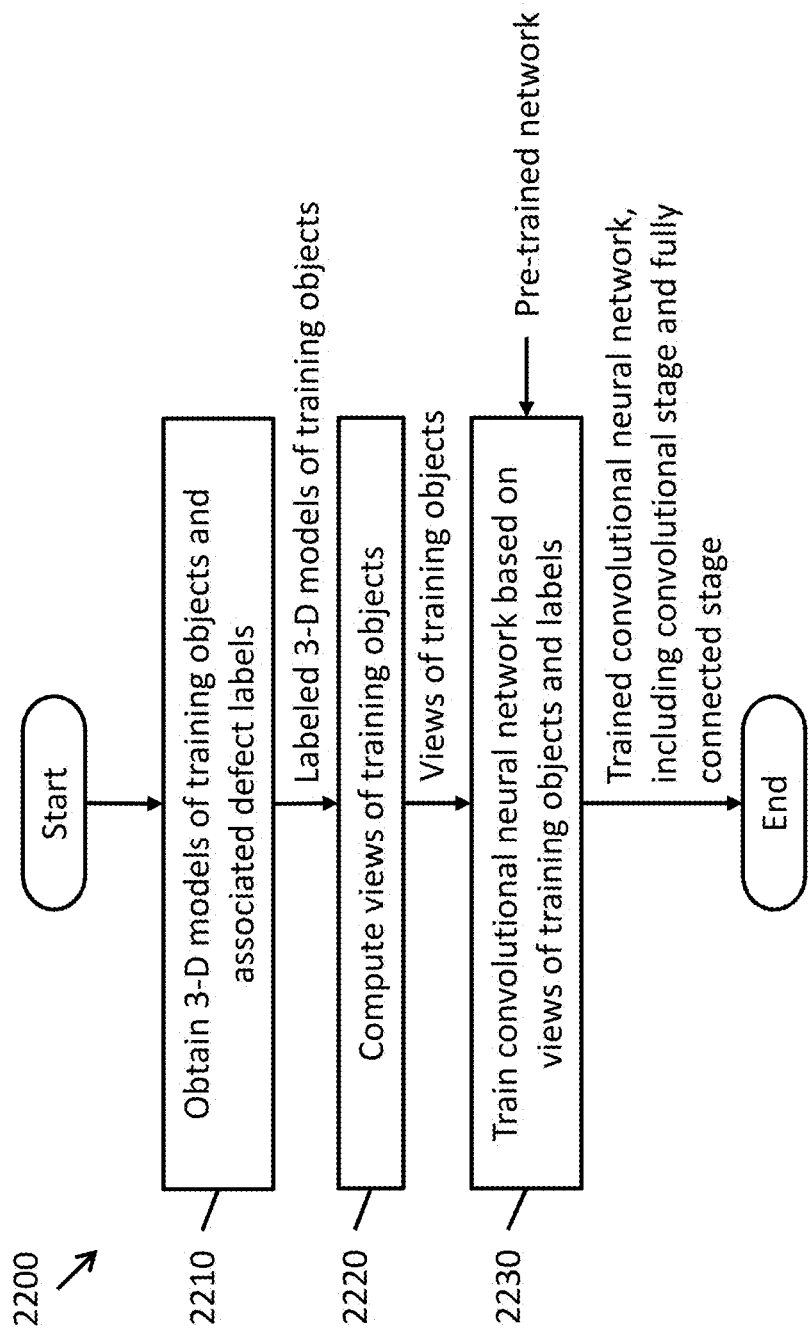
FIG. 22 is a flowchart of a method for training a convolutional neural network according to one embodiment of the present invention.

FIG. 22 is a flowchart of a method for training a convolutional neural network according to one embodiment of the present invention. In operation 2210, a training system obtains three-dimensional models of the training objects and corresponding labels. This may include, for example, receiving 3-D scans of actual defective and non-defective objects from the intended environment in which the defect detection system will be applied. The corresponding defect labels may be manually entered by a human using, for example, a graphical user interface, to indicate which parts of the 3-D models of the training objects correspond to defects, as well as the class or classification of the defect (e.g., a tear, a wrinkle, too many folds, and the like), where the number of classes may correspond to the length k of the output vector p. In operation 2220, the training system uses the shape to appearance converter 200 to convert the received 3-D models 14d and 14c of the training objects into views 16d and 16c of the training objects. The labels of defects may also be transformed during this operation to continue to refer to particular portions of the views 16d and 16c of the training objects. For example, a tear in the fabric of a defective training object may be labeled in the 3-D model as a portion of the surface of the 3-D model. This tear is similarly labeled in the generated views of the defective object that depict the tear (and the tear would not be labeled in generated views of the defective object that do not depict the tear).

In operation 2230, the training system trains a convolutional neural network based on the views and the labels. In some embodiments, a pre-trained network or pre-training parameters may be supplied as a starting point for the network (e.g., rather than beginning the training from a convolutional neural network configured with a set of random weights). As a result of the training process in operation 2230, the training system produces a trained neural network 310, which may have a convolutional stage $CNN_1$ and a fully connected stage $CNN_2$, as shown in FIG. 11. As noted above, each of the k entries of the output vector p represents the probability that the input image exhibits the corresponding one of the k classes of defects.

As noted above, embodiments of the present invention may be implemented on suitable general purpose computing platforms, such as general purpose computer processors and application specific computer processors. For example, graphical processing units (GPUs) and other vector processors (e.g., single instruction multiple data or SIMD instruction sets of general purpose processors or a Google® Tensor Processing Unit (TPU)) are often well suited to performing the training and operation of neural networks.

Training a CNN is a time-consuming operation, and requires a vast amount of training data. It is common practice to start from a CNN previously trained on a (typically large) data set (pre-training), then re-train it using a different (typically smaller) set with data sampled from the specific application of interest, where the re-training starts from the parameter vector obtained in the prior optimization (this operation is called fine-tuning Chatfield, K., Simonyan, K., Vedaldi, A., & Zisserman, A. (2014). Return of the devil in the details: Delving deep into convolutional nets. arXiv preprint arXiv:1405.3531.). The data set used for pre-training and for fine-tuning may be labeled using the same object taxonomy, or even using different object taxonomies (transfer learning).

Accordingly, the parts based approach and patch based approach described above can reduce the training time by reducing the number of possible classes that need to be detected. For example, in the case of a car seat or a chair, the types of defects that may appear on the front side of a seat back may be significantly different from the defects that are to be detected on the back side of the seat back. In particular, the back side of a seat back may be a mostly smooth surface of a single material, and therefore the types of defects may be limited to tears, wrinkles, and scuff marks on the material. On the other hand, the front side of a seat back may include complex stitching and different materials than the seat back, which results in particular expected contours. Because the types of defects found the front side and back side of a seat back are different, it is generally easier to train two separate convolutional neural networks for detecting a smaller number of defect classes (e.g., $k_{back}$ and $k_{front}$) than to train a single convolutional neural network for detecting the sum of those numbers of defect classes (e.g., $k_{back}+k_{front}$). Accordingly, in some embodiments, different convolutional neural networks 310 are trained to detect defects in different parts of the object, and, in some embodiments, different convolutional neural networks 310 are trained to detect different classes or types of defects. These embodiments allow the resulting convolutional neural networks to be fine-tuned to detect particular types of defects and/or to detect defects in particular parts.

Therefore, in some embodiments of the present invention, a separate convolutional neural network is trained for each part of the object to be analyzed. In some embodiments, a separate convolutional neural network may also be trained each separate defect to be detected.

As shown in FIG. 11, the values computed by the first stage $CNN_1$ (the convolutional stage) and supplied to the second stage $CNN_2$ (the fully connected stage) are referred to herein as a descriptor (or feature vector) f. The descriptor may be a vector of data having a fixed size (e.g., 4,096 entries) which condenses or summarizes the main characteristics of the input image. As such, the first stage $CNN_1$ may be used as a feature extraction stage of the analysis agent 300.

In some embodiments the views may be supplied to the first stage $CNN_1$ directly, such as in the case of single rendered patches of the 3-D model or single views of a side of the object. FIG. 13 is a schematic diagram of a max-pooling neural network according to one embodiment of the present invention. As shown in FIG. 13, the architecture of a classifier 310 described above with respect to FIG. 11 can be applied to classifying multi-view shape representations of 3-D objects based on n different 2-D views of the object. These n different 2-D views may include circumstances where the virtual camera is moved to different poses with respect to the 3-D model of the target object, circumstances where the pose of the virtual camera and the 3-D model is kept constant and the virtual illumination source is modified (e.g., location), and combinations thereof (e.g., where the rendering is performed multiple times with different illumination for each camera pose).

For example, the first stage $CNN_1$ can be applied independently to each of the n 2-D views used to represent the 3-D shape, thereby computing a set of n feature vectors f(1), f(2), . . . , f(n) (one for each of the 2-D views). In the max pooling stage, a pooled vector F is generated from the n feature vectors, where the i-th entry $F_i$ of the pooled feature vector is equal to the maximum of the i-th entries of the n feature vectors (e.g., $F_i=\max(f_i(1), f_i(2), \ldots, f_i(n))$ for all indices i in the length of the feature vector, such as for entries 1 through 4,096 in the example above). Aspects of this technique are described in more detail in, for example, Su, H., Maji, S., Kalogerakis, E., & Learned-Miller, E. (2015). Multi-view convolutional neural networks for 3-D shape recognition. In Proceedings of the IEEE International Conference on Computer Vision (pp. 945-953). In some embodiments, the n separate feature vectors are combined using, for example, max pooling (see, e.g., Boureau, Y. L., Ponce, J., & LeCun, Y. (2010). A theoretical analysis of feature pooling in visual recognition. In Proceedings of the 27th international conference on machine learning (ICML-10) (pp. 111-118).).

Some aspects of embodiments of the present invention are directed to the use of max-pooling to mitigate some of the pose invariance issues described above. In some embodiments of the present invention, the selection of particular poses of the virtual cameras, e.g., the selection of which particular 2-D views to render, results in a descriptor F having properties that are invariant. For example, considering a configuration where all the virtual cameras are located on a sphere (e.g., all arranged at poses that are at the same distance from the center of the 3-D model or a particular point p on the ground plane, and all having optical axes that intersect at the center of the 3-D model or at the particular point p on the ground plane). Another example of an arrangement with similar properties includes all of the virtual cameras located at the same elevation above the ground plane of the 3-D model, oriented toward the 3-D model (e.g., having optical axes intersecting with the center of the 3-D model), and at the same distance from the 3-D model, in which case any rotation of the object around a vertical axis (e.g., perpendicular to the ground plane) extending through the center of the 3-D model will result in essentially the same vector or descriptor F (assuming that the cameras are placed at closely spaced locations).

Performing Defect Detection Using the Trained CNN

Given a trained convolutional neural network, including convolutional stage $CNN_1$ and fully connected stage $CNN_2$, in some embodiments, the views of the target object computed in operation 2220 are supplied to the convolutional stage $CNN_1$ of the convolutional neural network 310 in operation 2140-1 to compute descriptors f or pooled descriptors F. The views may be among the various types of views described above, including single views or multi-views of the entire object, single views or multi-views of a separate part of the object, and single views or multi-views (e.g., with different illumination) of single patches. The resulting descriptors are then supplied in operation 460-1 as input to the fully connected stage $CNN_2$ to generate one or more defect classifications (e.g., using the fully connected stage $CNN_2$ in a forward propagation mode). The resulting output is a set of defect classes.

As discussed above, multiple convolutional neural networks 310 may be trained to detect different types of defects and/or to detect defects in particular parts (or segments) of the entire object. Therefore, all of these convolutional neural networks 310 may be used when computing descriptors and detecting defects in the captured image data of the target object.

In some embodiments of the present invention in which the input images are defined in segments, it is useful to apply a convolutional neural network that can classify a defect and identify the location of the defect in the input in one shot. Because the network accepts and processes a rather large and semantically identifiable segment of an object under test, it can reason globally for that segment and preserve the contextual information about the defect. For instance, if a wrinkle appears symmetrically in a segment of a product, that may be considered acceptable, whereas if the same shape wrinkle appeared on only one side of the segment under test, it should be flagged as defect. Examples of convolutional neural networks that can classify a defect and identify the location of the defect in the input in one shot as described in, for example, Redmon, Joseph, et al. "You only look once: Unified, real-time object detection." *Proceedings of the IEEE conference on computer vision and pattern recognition*. 2016. and Liu, Wei, et al. "SSD: Single shot multibox detector." *European conference on computer vision*. Springer, Cham, 2016.

Computing Distances Between Descriptors

Another approach to defect detection in the face of limited access to defective examples for training is to declare as "defective" an object that, under an appropriate metric, has appearance that is substantially different from a properly aligned non-defective model object. Therefore, in some embodiments of the present invention, in operation 2160-1, the discrepancy between a target object and a reference object surface is measured by the distance between their descriptors f or F (the descriptors computed in operation 2140-1 as described above with respect to the outputs of the first stage $CNN_1$ of the convolutional neural network 310). Descriptor vectors represent a succinct description of the relevant content of the surface. If the distance of the descriptor vectors of a model to the descriptor vector of the sample surface exceeds a threshold, then the unit can be deemed to be defective. This approach is very simple and can be considered an instance of "one-class classifier" (see, e.g., Manevitz, L. M., & Yousef, M. (2001). One-class SVMs for document classification. Journal of Machine Learning Research, 2(Dec.), 139-154.).

In some embodiments, a similarity metric is defined to measure the distance between any two given descriptors (vectors) F and $F_{ds}(m)$. Some simple examples of similarity metrics are a Euclidean vector distance and a Mahalanobis vector distance. In other embodiments of the present invention a similarity metric is learned using a metric learning algorithm (see, e.g., Boureau, Y. L., Ponce, J., & LeCun, Y. (2010). A theoretical analysis of feature pooling in visual recognition. In Proceedings of the 27th international conference on machine learning (ICML-10) (pp. 111-118).). A metric learning algorithm may learn a linear or non-linear transformation of feature vector space that minimizes the average distance between vector pairs belonging to the same class (as measured from examples in the training data) and maximizes the average distance between vector pairs belonging to different classes.

In some cases, non-defective samples of the same object model may have different appearances. For example, in the case of a leather handbag, non-defective folds on the leather surface may occur at different locations. Therefore, in some embodiments, multiple representative non-defective units are acquired and their corresponding descriptors are stored. When performing the defect detection operation 2160-1 on a target object, the 3-D model analysis module 350 computes distances between the descriptor of the target unit and the descriptors of each of the stored non-defective units. In some embodiments, the smallest such distance is used to decide whether the target object is defective or not, where the target object is determined to be non-defective if the distance is less than a threshold distance and determined to be defective if the distance is greater than the threshold distance.

A similar approach can be used to take any available defective samples into consideration. The ability to access multiple defective samples allows the defect detection system to better determine whether a new sample should be considered defective or not. Given the available set of non-defective and of defective part surfaces (as represented via their descriptors), in some embodiments, the 3-D model analysis module 350 computes the distance between the descriptor of the target object under consideration and the descriptor of each such non-defective and defective samples. The 3-D model analysis module 350 uses the resulting set of distances to determine the presence of a defect. For example, in some embodiments, the 3-D model analysis module 350 determines in operation 2160-1 that the target object is non-defective if its descriptor is closest to that of a non-defective sample, and determines the target object to exhibit a particular defect if its descriptor is closest to a sample with the same defect type. This can be considered as an instance of a nearest neighbor classifier Bishop, C. M. (2006). Pattern recognition and Machine Learning, 128, 1-58. Possible variations of this method include a k-nearest neighbor strategy, whereby the k closest neighbors (in descriptor space) in the cumulative set of stored samples are computed for a reasonable value of k (e.g., k=3). The target object is then labeled as defective or non-defective depending on the number of defective and non-defective samples in the set of k closest neighbors. It is also important to note that, from the descriptor distance of a target object and the closest sample (or samples) in the data set, it is possible to derive a measure of "confidence" of classification. For example, classification of a target object whose descriptor has comparable distance to the closest non-defective and to the closest defective samples in the data set could be considered to be difficult to classify, and thus receive a low confidence score. On the other hand, if a unit is very close in descriptor space to a non-defective sample, and far from any available defective sample, it could be classified as non-defective with high confidence score.

The quality of the resulting classification depends on the ability of the descriptors (computed as described above) to convey discriminative information about the surfaces. In some embodiments, the network used to compute the descriptors is tuned based on the available samples. This can be achieved, for example, using a "Siamese network" trained with a contrastive loss (see, e.g., Chopra, S., Hadsell, R., and LeCun, Y. (2005, June). Learning a similarity metric discriminatively, with application to face verification. In Computer Vision and Pattern Recognition, 2005. CVPR 2005. IEEE Computer Society Conference on (Vol. 1, pp. 539-546). IEEE.) Contrastive loss encourages descriptors of objects within the same class (defective or non-defective) to have small Euclidean distance, and penalizes descriptors of objects from different classes with similar Euclidean distance. A similar effect can be obtained using known methods of "metric learning" (see, e.g., Weinberger, K. Q., Blitzer, J., & Saul, L. (2006). Distance metric learning for large margin nearest neighbor classification. Advances in neural information processing systems, 18, 1473.).

According to some embodiment of the present invention, an "anomaly detection" approach may be used to detect defects. Such approaches may be useful when defects are relatively rare and most of the training data corresponds to a wide range of non-defective samples. According to one embodiment of the present invention, descriptors are computed for every sample of the training data of non-defective samples. Assuming that each entry of the descriptors falls within a normal (or Gaussian) distribution and that all of the non-defective samples lies within some distance (e.g., two standard deviations) of the mean of the distribution, descriptors that fall outside of the distance are considered to be anomalous or defective.

Category 2 Defect Detection

In some embodiments, category 2 defects are detected through a two-step process. Referring to FIG. 21, the first step 2140-2 includes the automatic identification of specific "features" in the surface of the target object. For example, for a leather bag, features of interest could be the seams connecting two panels, or each individual leather fold. For a car seat, features of interest could include a zipper line, a wrinkle on a leather panel, or a noticeable pucker at a seam. These features are not, by themselves, indicative of a defect. Instead, the presence of a defect can be inferred from specific spatial measurements of the detected features, as performed in operation 2160-2. For example, the manufacturer may determine that a unit is defective if it has more than, say, five wrinkles on a side panel, or if a zipper line deviates by more than 1 cm from a straight line. These types of measurements can be performed once the features have been segmented out of the captured image data (e.g., depth images) in operation 2140-2.

Figure 23:
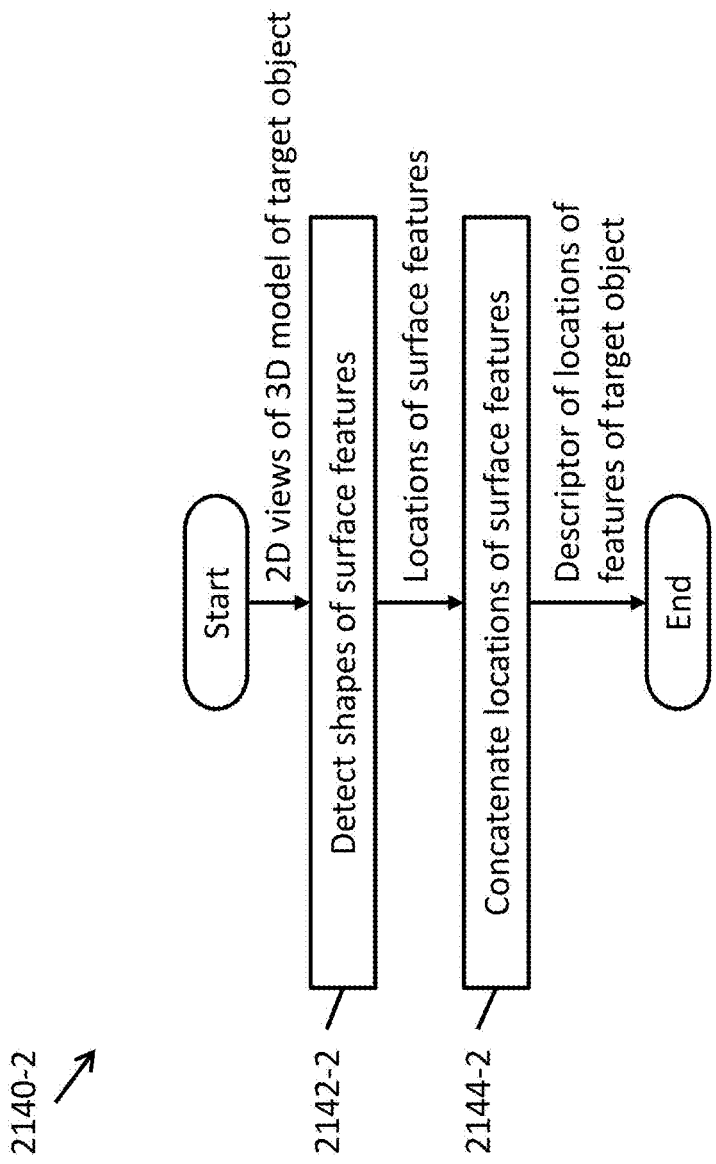
FIG. 23 is a flowchart of a method for generating descriptors of locations of features of a target object according to one embodiment of the present invention.

FIG. 23 is a flowchart of a method for generating descriptors of locations of features of a target object according to one embodiment of the present invention. In some embodiments of the present invention, feature detection and segmentation of operation 2140-2 is performed using a convolutional neural network that is trained to identify the locations of labeled surface features (e.g., wrinkles, zipper lines, and folds) in operation 2142-2. According to some embodiments of the present invention, a feature detecting convolutional neural network is trained using a large number of samples containing the features of interest, where these features have been correctly labeled (e.g., by hand). In some circumstances, this means that each surface element (e.g., points in the acquired point cloud, or triangular facets in a mesh) are assigned a tag indicating whether they correspond to a feature, and if so, an identifier (ID) corresponding to the feature. Hand labeling of a surface can be accomplished using software with a suitable user interface. In some embodiments, in operation 2144-2, the locations of the surface features are combined (e.g., concatenated) to form a descriptor of the locations of the features of the target object. The feature detecting convolutional neural network is trained to label the regions of the two-dimensions that correspond to particular trained features of the surface of the 3-D model (e.g., seams, wrinkles, stitches, patches, tears, folds, and the like).

Figure 24:
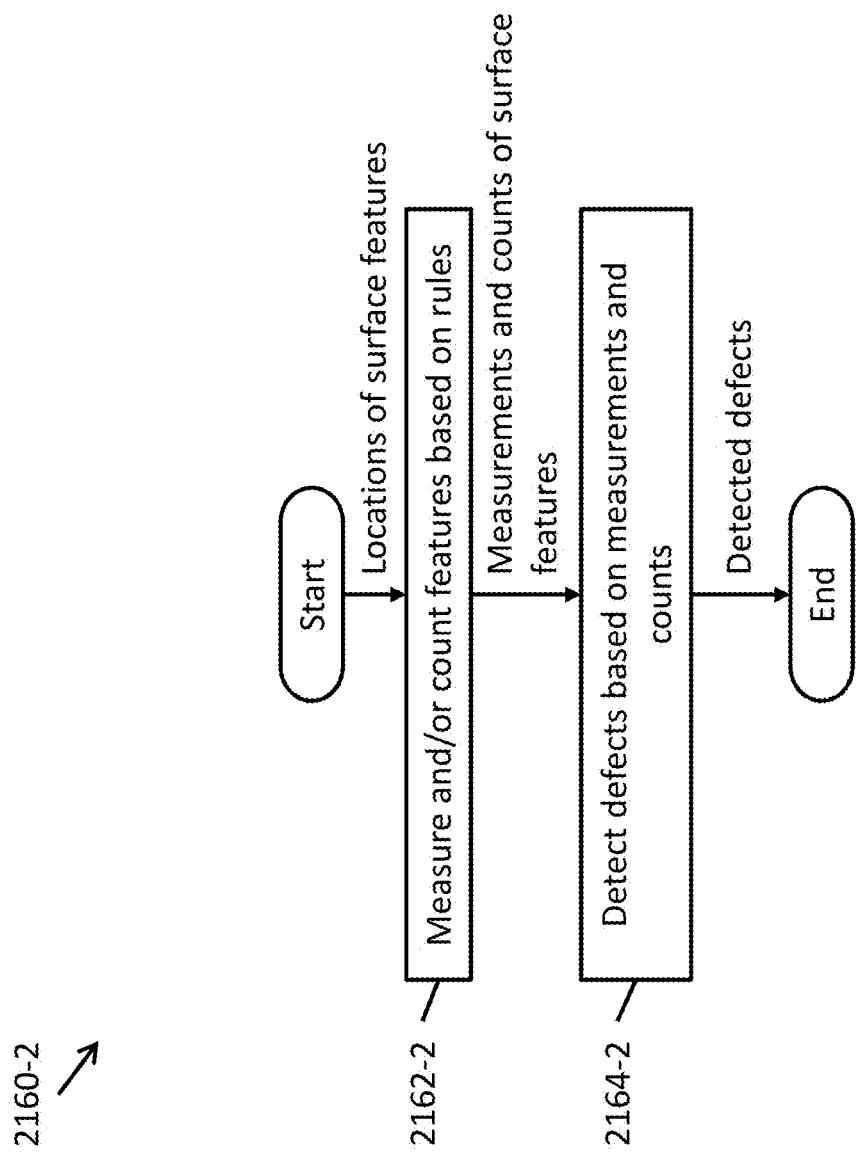
FIG. 24 is a flowchart of a method for detecting defects based on descriptors of locations of features of a target object according to one embodiment of the present invention.

FIG. 24 is a flowchart of a method for detecting defects based on descriptors of locations of features of a target object according to one embodiment of the present invention. In some embodiments of the present invention, explicit rules may be supplied by the user for determining, in operation 2160-2, whether a particular defect exists in the target object by measuring and/or counting, in operation 2162-2, the locations of the features identified in operation 2140-2. As noted above, in some embodiments, defects are detected in operation 2164-2 by comparing the measurements and/or counts with threshold levels, such as by counting the number of wrinkles detected in a part (e.g., a side panel) and comparing the counted number to a threshold number of wrinkles that are within tolerance thresholds. When the 3-D model analysis module 350 determines that the counting and/or measurement is within the tolerance thresholds, then the object (or part thereof) is labeled as being non-defective, and when the counting and/or measurement is outside of a tolerance threshold, then the 3-D model analysis module 350 labels the object (or part thereof) as being defective (e.g., assigns a defect classification corresponding to the measurement or count). The measurements may also relate to the size of objects (e.g., the length of stitching) and ensuring that the measured stitching is within an expected range (e.g., about 5 cm). The depth measurements may also be used to perform measurements. For example, wrinkles having a depth greater than 0.5 mm may be determined to indicate a defect while wrinkles having a smaller depth may be determined to be non-defective.

Referring back to FIG. 21, the defects detected through the category 1 process of operations 2140-1 and 2160-1 and the defects detected through the category 2 process of operations 2140-2 and 2160-2 can be combined and displayed to a user, e.g., on a display panel of a user interface device (e.g., a tablet computer, a desktop computer, or other terminal) to highlight the locations of defects, as described in more detail below.

In some embodiments of the present invention, multiple analyses are performed on the captured input 3-D model. For example, the measurements and tessellation based analyses may both be performed. As another example, both the comparison with the canonical model and the tessellation technique may both be performed on the input 3-D model. Generally speaking, any combination of analyses of the 3-D model may be performed in series or in parallel (or combinations thereof) to analyze characteristics of the scanned object based on its captured 3-D model.

Examples of systems and methods for performing defect detection are described in more detail in U.S. patent application Ser. No. 15/678,075, "METHOD AND SYSTEM FOR SIMULTANEOUS 3D SCANNING AND CAPTURING BRDF WITH HAND-HELD SCANNER," filed in the United States Patent and Trademark Office on Aug. 15, 2017; U.S. patent application Ser. No. 15/866,217, "SYSTEMS AND METHODS FOR DEFECT DETECTION," filed in the United States Patent and Trademark Office on Jan. 9, 2018; and U.S. patent application Ser. No. 15/974,595, "SYSTEMS AND METHODS FOR INSPECTION AND DEFECT DETECTION USING 3-D SCANNING," filed in the United States Patent and Trademark Office on May 8, 2018, the entire disclosures of which are incorporated by reference herein.

The analysis agent 300 generates analysis results for the scanned query object, which, in various embodiments of the present invention, include one or more of the various variables and attributes described above. These variables and attributes may include: retrieved metadata about expected characteristics of the class of the object; physical measurements of the object (e.g., dimensions, locations of surface features of the object); and one or more result 3-D models that depict the locations of detected defects (e.g., each 3-D model may depict a different type of defect or a 3-D model may depict multiple different types of defects).

While the present invention has been described in connection with certain exemplary embodiments, it is to be understood that the invention is not limited to the disclosed embodiments, but, on the contrary, is intended to cover various modifications and equivalent arrangements included within the spirit and scope of the appended claims, and equivalents thereof.

What is claimed is:

1. An object identification and tracking system comprising:
   a three-dimensional (3-D) scanning system configured to capture one or more 3-D models of one or more objects in a scene, the one or more 3-D models comprising color and geometry information of the one or more objects; and
   an analysis agent comprising a processor and memory, the memory storing instructions that, when executed by the processor, cause the processor to:
      receive the one or more 3-D models from the 3-D scanning system;
      compute one or more descriptors of the one or more 3-D models, each descriptor corresponding to a fixed-length feature vector; and
      retrieve metadata from a database, the instructions to retrieve the metadata comprising instructions that, when executed by the processor, cause the processor to search the database for one or more entries that are nearest-neighbors of the one or more descriptors, the metadata identifying the one or more objects based on the one or more descriptors.

2. The system of claim 1, wherein the 3-D scanning system comprises one or more 3-D scanners, and each 3-D scanner comprising:
   a time-of-flight depth camera;
   a structured light depth camera; or
   a stereo depth camera comprising:
      at least two infrared cameras;
      an infrared projector; and
      a color camera.

3. The system of claim 1, wherein the 3-D scanning system is mounted on a basket containing the one or more objects.

4. The system of claim 3, wherein additions and removals of objects to and from the basket are computed frequently based on low level visual information acquired by the 3-D scanning system and stored as images.

5. The system of claim 1, wherein the memory of the analysis agent further stores instructions that, when executed by the processor of the analysis agent, causes the processor to compute each of the one or more descriptors using a forward evaluation of a convolutional neural network.

6. The system of claim 5, wherein each of the one or more descriptors is computed by:
   rendering a plurality of 2-D views of a 3-D model of the one or more 3-D models;
   computing a plurality of feature vectors, each of the feature vectors corresponding to one of the 2-D views, by supplying each of the 2-D views of the 3-D model to the convolutional neural network; and
   pooling the feature vectors to generate a descriptor of the one or more descriptors, the descriptor corresponding to one of the one or more objects.

7. The system of claim 6, wherein at least one of the one or more 3-D models comprises at least two objects, and wherein the memory of the analysis agent further stores instructions that, when executed by the processor, cause the processor to:
  segment the at least one 3-D model into a plurality of segments; and
  compute a descriptor for each of the segments.

8. The system of claim 1, wherein the metadata comprises one or more defect detection models, and
  wherein the memory further stores instructions that, when executed by the processor, cause the processor to:
    supply the one or more 3-D models to the one or more defect detection models; and
    classify the one or more 3-D models as being abnormal or clean.

9. The system of claim 1, wherein the one or more objects are located in a basket, the basket comprising a divider separating the basket into a plurality of bins,
  wherein the 3-D scanning system is configured to scan the plurality of bins, and
  wherein the analysis agent is configured to identify at most one object in each of the bins.

10. The system of claim 1, further comprising a check-in system configured to associate an identity of a customer with a basket comprising the one or more objects.

11. The system of claim 10, wherein the check-in system comprises:
  a badge reader;
  a biometric identification system;
  a Bluetooth transceiver;
  a WiFi transceiver;
  a radio frequency identification (RFID) transceiver; or
  a near field communication (NFC) transceiver.

12. The system of claim 10, wherein the metadata associated with the one or more objects are matched to one or more marketing promotions, and
  wherein the customer is notified of the one or more marketing promotions in response to detecting the one or more objects in the basket.

13. The system of claim 1, wherein the one or more objects are components of a manufacturing kit, and
  wherein the memory of the analysis agent further stores instructions that, when executed by the processor, cause the processor to:
    retrieve a list of expected components of the manufacturing kit;
    compare the metadata identifying the one or more objects to the list of expected components; and
    detect differences between the list of expected components and the metadata of the one or more objects.

14. The system of claim 1, wherein the one or more objects are components of an order to be shipped, and
  wherein the memory of the analysis agent further stores instructions that, when executed by the processor, cause the processor to:
    retrieve a shipping manifest comprising a list of one or more items expected to be included in the order to be shipped;
    compare the metadata identifying the one or more objects to the list of one or more items of the shipping manifest; and
    detect differences between the list of expected components and the metadata of the one or more objects.

15. The system of claim 14, wherein the memory of the analysis agent further stores instructions that, when executed by the processor, cause the processor to generate a notification in response to detecting at least one difference between the list of expected components and the metadata of the one or more objects.

16. The system of claim 1, wherein the retrieved metadata comprises one or more keys, and
  wherein the memory of the analysis agent further stores instructions that, when executed by the processor, cause the processor to query a database using the one or more keys associated with the retrieved metadata identifying the one or more objects.

17. A retail checkout system comprising:
  a first three-dimensional (3-D) scanning system configured to scan color and geometry of one or more goods in a shopping basket to generate one or more first 3-D models;
  a second 3-D scanning system configured to scan color and geometry of one or more goods in a shopping bag to generate one or more second 3-D models;
  a first analysis agent comprising a first processor and first memory, the first memory storing instructions that, when executed by the first processor, cause the first processor to
    receive the one or more first 3-D models from the first 3-D scanning system;
    compute one or more first descriptors of the one or more first 3-D models; and
    identify the one or more goods in the shopping basket based on the one or more first descriptors of the one or more first 3-D models;
  a second analysis agent comprising a second processor and second memory, the second memory storing instructions that, when executed by the second processor, cause the second processor to:
    receive the one or more second 3-D models from the second 3-D scanning system;
    compute one or more second descriptors of the one or more second 3-D models; and
    identify the one or more goods in the shopping bag based on the one or more second descriptors of the one or more second 3-D models; and
  a check-out controller system comprising a third processor and a third memory, the third memory storing instructions that, when executed by the third processor, cause the third processor to monitor movement of the one or more goods from the shopping basket into the shopping bag.

18. A method for identifying and tracking objects, the method comprising:
  capturing one or more 3-D models of one or more objects in a scene using a three-dimensional (3-D) scanning system, the one or more 3-D models comprising color and geometry information of the one or more objects; and
  computing, by an analysis agent, one or more descriptors of the one or more 3-D models, each descriptor corresponding to a fixed-length feature vector; and
  retrieving metadata from a database, the retrieving the metadata comprising searching the database for one or more entries that are nearest-neighbors of the one or more descriptors, the metadata identifying the one or more objects based on the one or more descriptors.

19. The method of claim 18, wherein the 3-D scanning system comprises one or more 3-D scanners, and each 3-D scanner comprising:
  a time-of-flight depth camera;
  a structured light depth camera; or
  a stereo depth camera comprising:

at least two infrared cameras;
an infrared projector; and
a color camera.

20. The method of claim 18, wherein the 3-D scanning system is mounted on a basket containing the one or more objects.

21. The method of claim 20, wherein additions and removals of objects to and from the basket are computed frequently based on low level visual information acquired by the 3-D scanning system and stored as images.

22. The method of claim 18, further comprising computing each of the one or more descriptors using a forward evaluation of a convolutional neural network.

23. The method of claim 22, wherein each of the one or more descriptors is computed by:
rendering a plurality of 2-D views of a 3-D model of the one or more 3-D models;
computing a plurality of feature vectors, each of the feature vectors corresponding to one of the 2-D views, by supplying each of the 2-D views of the 3-D model to the convolutional neural network; and
pooling the feature vectors to generate a descriptor of the one or more descriptors, the descriptor corresponding to one of the one or more objects.

24. The method of claim 23, wherein at least one of the one or more 3-D models comprises at least two objects, and
wherein the method further comprises:
segmenting the at least one 3-D model into a plurality of segments; and
computing a descriptor for each of the segments.

25. The method of claim 18, wherein the metadata comprises one or more defect detection models, and
wherein the method further comprises:
supplying the one or more 3-D models to the one or more defect detection models; and
classifying the one or more 3-D models as being abnormal or clean.

26. The method of claim 18, wherein the one or more objects are located in a basket, the basket comprising a divider separating the basket into a plurality of bins,
wherein the 3-D scanning system is configured to scan the plurality of bins, and
wherein the analysis agent is configured to identify at most one object in each of the bins.

27. The method of claim 18, further comprising associating an identity of a customer with a basket comprising the one or more objects using a check-in system.

28. The method of claim 27, wherein the check-in system comprises:
a badge reader;
a biometric identification system;
a Bluetooth transceiver;
a WiFi transceiver;
a radio frequency identification (RFID) transceiver; or
a near field communication (NFC) transceiver.

29. The method of claim 27, wherein the metadata associated with the one or more objects are matched to one or more marketing promotions, and
wherein the customer is notified of the one or more marketing promotions in response to detecting the one or more objects in the basket.

30. The method of claim 18, wherein the one or more objects are components of a manufacturing kit, and
wherein the method further comprises:
retrieving a list of expected components of the manufacturing kit;
comparing the metadata identifying the one or more objects to the list of expected components; and
detecting differences between the list of expected components and the metadata of the one or more objects.

31. The method of claim 18, wherein the one or more objects are components of an order to be shipped, and
wherein the method further comprises:
retrieving a shipping manifest comprising a list of one or more items expected to be included in the order to be shipped;
comparing the metadata identifying the one or more objects to the list of one or more items of the shipping manifest; and
detecting differences between the list of expected components and the metadata of the one or more objects.

32. The method of claim 31, further comprising generating a notification in response to detecting at least one difference between the list of expected components and the metadata of the one or more objects.

33. The method of claim 18, wherein the retrieved metadata comprises one or more keys, and
wherein the method further comprises querying a database using the one or more keys associated with the retrieved metadata identifying the one or more objects.

34. The system of claim 1, wherein the instructions stored in the memory to retrieve the metadata further comprise instructions that, when executed by the processor, cause the processor to:
identify the metadata from the database based on at least one of the one or more entries that are the nearest-neighbors of the one or more descriptors.

35. The system of claim 34, wherein the instructions stored in the memory to retrieve the metadata further comprise instructions that, when executed by the processor, cause the processor to identify the metadata from the one or more entries that are the nearest-neighbors of the one or more descriptors by:
identifying data that appears in a majority of the metadata associated with the one or more entries.

36. The method of claim 18, wherein the retrieving the metadata further comprises identifying the metadata from the database based on at least one of the one or more entries that are the nearest-neighbors of the one or more descriptors.

37. The method of claim 36, wherein the identifying the metadata from the one or more entries that are the nearest-neighbors of the one or more descriptors comprises:
identifying data that appears in a majority of the metadata associated with the one or more entries.

* * * * *